(12) United States Patent
Williams et al.

(10) Patent No.: US 12,164,507 B2
(45) Date of Patent: *Dec. 10, 2024

(54) ASSIGNING A SINGLE NEW ENTIGEN TO A WORD SET

(71) Applicant: entigenlogic LLC, Schaumburg, IL (US)

(72) Inventors: Frank John Williams, Rossmoor, CA (US); David Ralph Lazzara, Huntington Beach, CA (US); Donald Joseph Wurzel, Savannah, GA (US); Paige Kristen Thompson, Huntington Beach, CA (US); Stephen Emerson Sundberg, Chicago, IL (US); Stephen Chen, Wheaton, IL (US); Karl Olaf Knutson, Palatine, IL (US); Jessy Thomas, Palatine, IL (US); David Michael Corns, II, Elgin, IL (US); Andrew Chu, St. Charles, IL (US); Eric Andrew Faurie, Brookfield, IL (US); Theodore Mazurkiewicz, Lake Zurich, IL (US); Gary W. Grube, Barrington Hills, IL (US)

(73) Assignee: entigenlogic LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,781

(22) Filed: Apr. 10, 2023

(65) Prior Publication Data

US 2023/0252019 A1 Aug. 10, 2023

Related U.S. Application Data

(63) Continuation of application No. 17/193,035, filed on Mar. 5, 2021, now Pat. No. 11,650,979, which is a
(Continued)

(51) Int. Cl.
*G06F 17/00* (2019.01)
*G06F 16/23* (2019.01)
(Continued)

(52) U.S. Cl.
CPC .... *G06F 16/2379* (2019.01); *G06F 16/24522* (2019.01); *G06F 16/24575* (2019.01); *G06F 16/248* (2019.01)

(58) Field of Classification Search
CPC ........... G06F 16/2379; G06F 16/24522; G06F 16/24575; G06F 16/248; G06F 16/3325; G06F 16/3329
See application file for complete search history.

(56) References Cited

U.S. PATENT DOCUMENTS 6,175,834 B1 1/2001 Cai
6,598,039 B1 * 7/2003 Livowsky ............. G06F 16/335
(Continued)

OTHER PUBLICATIONS

Shirimai Prabhumoye et al., Automated Query Analysis Techniques for Semantic based Question Answering System, 2014 International Conference on Recent Trends in Information Technology, pp. 1-6, DOI: 10.1109/ICRTIT.2014.6996128, Dec. 2014.

*Primary Examiner* — Greta L Robinson
(74) *Attorney, Agent, or Firm* — Gary W. Grube

(57) ABSTRACT

A method executed by a computing device includes determining whether a set of words are included in a word set. When the set of words are in the word set, the method further includes determining a set of identigens for each word of the word set to produce sets of identigens, where a set of identigens of the sets of identigens represents one or more different meanings of a word of the word set. The method further includes interpreting, using identigen pairing rules, the sets of identigens to produce an entigen set. The method further includes assigning a single new entigen to represent
(Continued)

the entigen set, where the single new entigen represents a most likely meaning interpretation of the word set.

18 Claims, 54 Drawing Sheets

Related U.S. Application Data continuation of application No. 16/455,492, filed on Jun. 27, 2019, now Pat. No. 10,942,919.

(60) Provisional application No. 62/691,703, filed on Jun. 29, 2018.

(51) Int. Cl.
*G06F 16/2452* (2019.01)
*G06F 16/2457* (2019.01)
*G06F 16/248* (2019.01)

(56) References Cited

U.S. PATENT DOCUMENTS

| | | | |
|---|---|---|---|
| 8,751,466 | B1 | 6/2014 | Tsay |
| 10,108,600 | B2 | 10/2018 | Williams |
| 10,740,556 | B2 | 8/2020 | Williams |
| 11,321,530 | B2 | 5/2022 | Williams |
| 11,423,221 | B2 * | 8/2022 | Williams ................. G06N 5/02 |
| 11,650,979 | B2 * | 5/2023 | Williams ............ G06F 16/3329 |
| | | | 707/773 |
| 2003/0097251 | A1 | 5/2003 | Yamada |
| 2008/0208569 | A1 | 8/2008 | Simpson |
| 2009/0089126 | A1 | 4/2009 | Odubiyi |
| 2013/0086067 | A1 | 4/2013 | Khoussainova |
| 2015/0269175 | A1 | 9/2015 | Espenshade |
| 2016/0147979 | A1 | 5/2016 | Kato |
| 2017/0206797 | A1 | 7/2017 | Solomon |
| 2017/0308583 | A1 | 10/2017 | Husain |
| 2017/0371861 | A1 | 12/2017 | Barborak et al. |
| 2018/0150525 | A1 | 5/2018 | Daniel |
| 2019/0065576 | A1 | 2/2019 | Peng |

\* cited by examiner synonym words table 570

| textual words 572 | identigen 538 | | entigens 520 |
|---|---|---|---|
| | meaning ID 538 | instance ID 540 | |
| car | 50 | 001 | e1000 |
| automobile | | 002 | |
| auto | | 003 | |
| bil (Swedish) | | 004 | |
| carro (Spanish) | | 005 | |
| bil (Danish) | | 006 | |

FIG. 7C polysemous words table 576

| textual words 572 | identigen 518 | | entigens 520 |
|---|---|---|---|
| | meaning ID 538 | instance ID 540 | |
| duck (bird) | 116937 | 001 | e2000 |
| duck (fabric) | 116938 | 001 | e2001 |
| duck (to submerge) | 112195 | 056 | e2002 |
| duck (to elude) | 010654 | 051 | e2003 |

FIG. 7D words table 580

| textual words 572 | identigen (IDN) 518 | | | entigens (ENI) 520 |
|---|---|---|---|---|
| | meaning ID 538 | instance ID 540 | type ID 542 | |
| pilot (flyer) | 150 | 001 | itenym (item) | e717 |
| pilot (to fly) | 291 | 001 | actenym (action) | e4320 |
| Tom (person) | 457 | 001 | itenym (item) | e61 |
| Tom (male animal) | 648 | 001 | itenym (item) | e930 |
| tall (attribute - height) | 823 | 001 | attrenym (attribute) | e90 |
| tall (attribute - unlikely) | 399 | 001 | attrenym (attribute) | e729 |

⇒ apply rules to identigens of word strings to validate

| pilot (to fly) | Tom (male an) | IDN 291.001 | IDN 648.001 | ✗ |
| pilot (flyer) | Tom (male an) | IDN 150.001 | IDN 648.001 | ✗ |
| pilot (to fly) | Tom (person) | IDN 291.001 | IDN 457.001 | ✗ |
| pilot (flyer) | Tom (person) | IDN 150.001 | IDN 457.001 | ✓ |

| tall (attribute - height) | Tom (male an) | IDN 823.001 | IDN 648.001 | ✓ |
| tall (attribute - unlikely) | Tom (male an) | IDN 399.001 | IDN 648.001 | ✗ |
| tall (attribute - height) | Tom (person) | IDN 823.001 | IDN 457.001 | ✓ |
| tall (attribute - unlikely) | Tom (person) | IDN 399.001 | IDN 457.001 | ✗ |

⇒ list valid groupings groupings table 584

| grouping ID 586 | word strings 588 | identigens (IDN) 518 | | | entigens (ENI) 520 | | |
|---|---|---|---|---|---|---|---|
| 3001 | pilot Tom | IDN 150.001 | IDN 457.001 | | e717 | e61 | |
| 3040 | tall Tom | IDN 823.001 | IDN 648.001 | | e90 | e930 | |
| 3041 | tall Tom | IDN 823.001 | IDN 457.001 | | e90 | e61 | |
| 3070 | tall pilot Tom | IDN 823.001 | IDN 150.001 | IDN 457.001 | e90 | e717 | e61 |

FIG. 7E groupings table 620

| grouping (GRP) ID 586 | word strings 588 | IF string 622 | | THEN string 624 | |
|---|---|---|---|---|---|
| | | IDN string 626 | ENI 628 | IDN string 626 | ENI 628 |
| 5493 | If someone has a tumor, then someone is sick. | someone has<br>tumor has | 12aa<br>06aa | someone sick | 12js |
| 5494 | If someone is sick, then someone is possibly sad. | someone sick | 12js | someone sad | 12ja | new knowledge inference 630

| 5495 | If someone has a tumor, then someone is possibly sad. | someone has<br>tumor has | 12aa<br>06aa | someone sad<br>possibly sad | 12ja<br>05b |

FIG. 8B

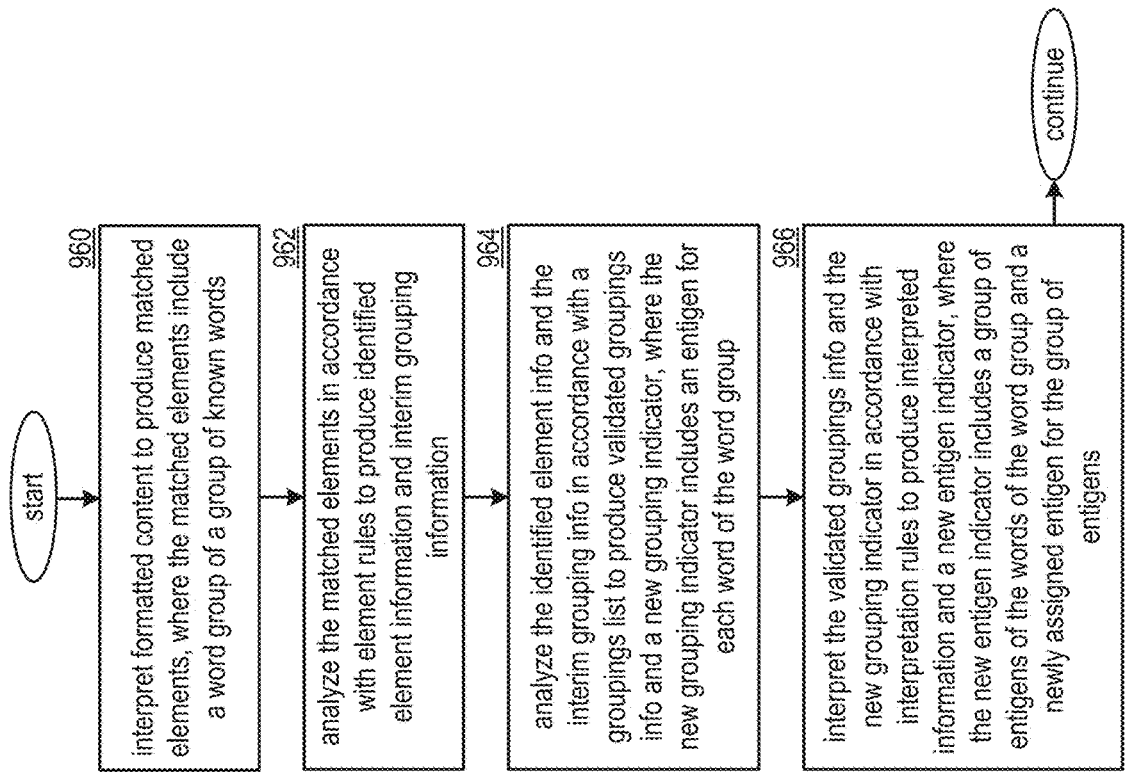

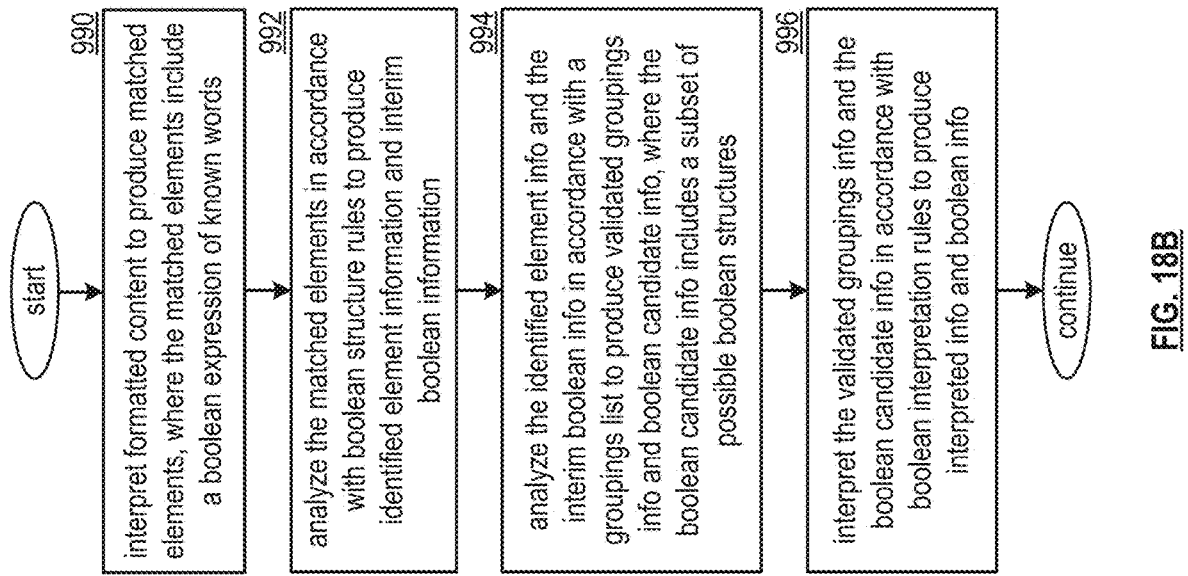

ASSIGNING A SINGLE NEW ENTIGEN TO A WORD SET

CROSS REFERENCE TO RELATED PATENTS

The present U.S. Utility patent application claims priority pursuant to 35 U.S.C. § 120 as a continuation of U.S. Utility application Ser. No. 17/193,035, entitled "ASSIGNING A NEW ENTIGEN TO A WORD GROUP," filed Mar. 5, 2021, allowed, which claims priority pursuant to 35 U.S.C. § 120 as a continuation of U.S. Utility application Ser. No. 16/455,492, entitled "GENERATING FURTHER KNOWLEDGE TO PROCESS QUERY," filed Jun. 27, 2019, issued as U.S. Pat. No. 10,942,919 on Mar. 9, 2021, which claims priority pursuant to 35 U.S.C. § 119(e) to U.S. Provisional Application No. 62/691,703, entitled "VERIFYING KNOWLEDGE EXTRACTION FROM CONTENT," filed Jun. 29, 2018, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates to computing systems and more particularly to generating data representations of data and analyzing the data utilizing the data representations.

Description of Related Art

It is known that data is stored in information systems, such as files containing text. It is often difficult to produce useful information from this stored data due to many factors. The factors include the volume of available data, accuracy of the data, and variances in how text is interpreted to express knowledge. For example, many languages and regional dialects utilize the same or similar words to represent different concepts.

Computers are known to utilize pattern recognition techniques and apply statistical reasoning to process text to express an interpretation in an attempt to overcome ambiguities inherent in words. One pattern recognition technique includes matching a word pattern of a query to a word pattern of the stored data to find an explicit textual answer. Another pattern recognition technique classifies words into major grammatical types such as functional words, nouns, adjectives, verbs and adverbs. Grammar based techniques then utilize these grammatical types to study how words should be distributed within a string of words to form a properly constructed grammatical sentence where each word is forced to support a grammatical operation without necessarily identifying what the word is actually trying to describe.

BRIEF DESCRIPTION OF THE SEVERAL VIEWS OF THE DRAWING(S)

FIG. 7C is a diagram of an embodiment of a synonym words table within a computing system in accordance with the present invention;

FIG. 7D is a diagram of an embodiment of a polysemous words table within a computing system in accordance with the present invention;

FIG. 7E is a diagram of an embodiment of transforming words into groupings within a computing system in accordance with the present invention;

FIG. 8B is a diagram of an embodiment of a groupings table within a computing system in accordance with the present invention;

FIG. 17B is a logic diagram of an embodiment of a method for facilitating subsequent rapid phrase detection within a computing system in accordance with the present invention;

FIG. 18B is a logic diagram of an embodiment of a method for representing a Boolean expression within a computing system in accordance with the present invention.

DETAILED DESCRIPTION OF THE INVENTION

Figure 1:
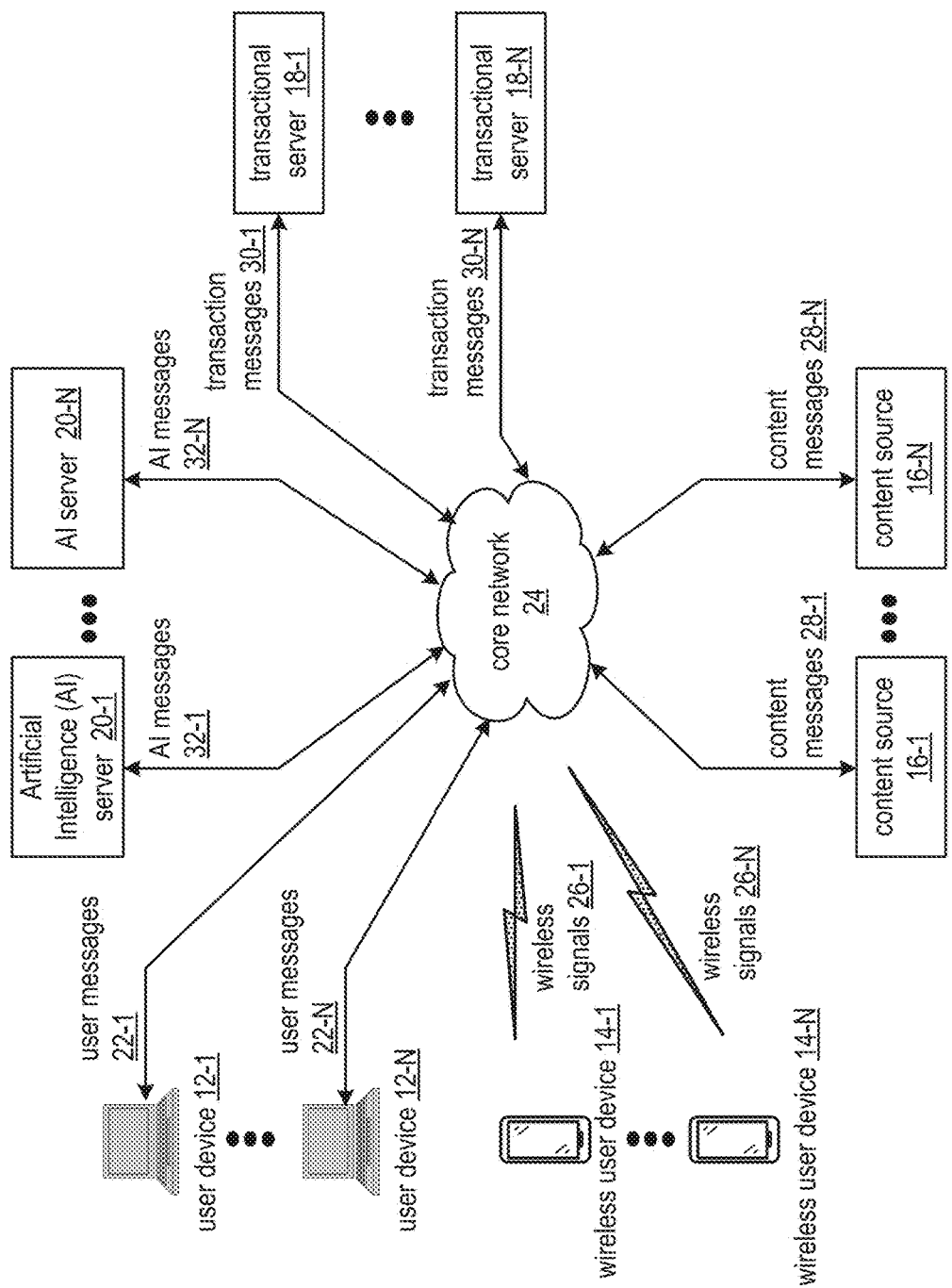
FIG. 1 is a schematic block diagram of an embodiment of a computing system in accordance with the present invention.

FIG. 1 is a schematic block diagram of an embodiment of a computing system 10 that includes a plurality of user devices 12-1 through 12-N, a plurality of wireless user devices 14-1 through 14-N, a plurality of content sources 16-1 through 16-N, a plurality of transactional servers 18-1 through 18-N, a plurality of artificial intelligence (AI) servers 20-1 through 20-N, and a core network 24. The core network 24 includes at least one of the Internet, a public radio access network (RAN), and any private network. Hereafter, the computing system 10 may be interchangeably referred to as a data network, a data communication network, a system, a communication system, and a data communication system. Hereafter, the user device and the wireless user device may be interchangeably referred to as user devices, and each of the transactional servers and the AI servers may be interchangeably referred to as servers.

Each user device, wireless user device, transactional server, and AI server includes a computing device that includes a computing core. In general, a computing device is any electronic device that can communicate data, process data, and/or store data. A further generality of a computing device is that it includes one or more of a central processing unit (CPU), a memory system, a sensor (e.g., internal or external), user input/output interfaces, peripheral device interfaces, communication elements, and an interconnecting bus structure.

As further specific examples, each of the computing devices may be a portable computing device and/or a fixed computing device. A portable computing device may be an embedded controller, a smart sensor, a smart pill, a social networking device, a gaming device, a cell phone, a smart phone, a robot, a personal digital assistant, a digital music player, a digital video player, a laptop computer, a handheld computer, a tablet, a video game controller, an engine controller, a vehicular controller, an aircraft controller, a maritime vessel controller, and/or any other portable device that includes a computing core. A fixed computing device may be security camera, a sensor device, a household appliance, a machine, a robot, an embedded controller, a personal computer (PC), a computer server, a cable set-top box, a satellite receiver, a television set, a printer, a fax machine, home entertainment equipment, a camera controller, a video game console, a critical infrastructure controller, and/or any type of home or office computing equipment that includes a computing core. An embodiment of the various servers is discussed in greater detail with reference to FIG. 2. An embodiment of the various devices is discussed in greater detail with reference to FIG. 3.

Each of the content sources 16-1 through 16-N includes any source of content, where the content includes one or more of data files, a data stream, a tech stream, a text file, an audio stream, an audio file, a video stream, a video file, etc. Examples of the content sources include a weather service, a multi-language online dictionary, a fact server, a big data storage system, the Internet, social media systems, an email server, a news server, a schedule server, a traffic monitor, a security camera system, audio monitoring equipment, an information server, a service provider, a data aggregator, and airline traffic server, a shipping and logistics server, a banking server, a financial transaction server, etc. Alternatively, or in addition to, one or more of the various user devices may provide content. For example, a wireless user device may provide content (e.g., issued as a content message) when the wireless user device is able to capture data (e.g., text input, sensor input, etc.).

Generally, an embodiment of this invention presents solutions where the computing system 10 supports the generation and utilization of knowledge extracted from content. For example, the AI servers 20-1 through 20-N ingest content from the content sources 16-1 through 16-N by receiving, via the core network 24 content messages 28-1 through 28-N as AI messages 32-1 through 32-N, extract the knowledge from the ingested content, and interact with the various user devices to utilize the extracted knowledge by facilitating the issuing, via the core network 24, user messages 22-1 through 22-N to the user devices 12-1 through 12-N and wireless signals 26-1 through 26-N to the wireless user devices 14-1 through 14-N.

Each content message 28-1 through 28-N includes a content request (e.g., requesting content related to a topic, content type, content timing, one or more domains, etc.) or a content response, where the content response includes real-time or static content such as one or more of dictionary information, facts, non-facts, weather information, sensor data, news information, blog information, social media content, user daily activity schedules, traffic conditions, community event schedules, school schedules, user schedules airline records, shipping records, logistics records, banking records, census information, global financial history information, etc. Each AI message 32-1 through 32-N includes one or more of content messages, user messages (e.g., a query request, a query response that includes an answer to a query request), and transaction messages (e.g., transaction information, requests and responses related to transactions). Each user message 22-1 through 22-N includes one or more of a query request, a query response, a trigger request, a trigger response, a content collection, control information, software information, configuration information, security information, routing information, addressing information, presence information, analytics information, protocol information, all types of media, sensor data, statistical data, user data, error messages, etc.

When utilizing a wireless signal capability of the core network 24, each of the wireless user devices 14-1 through 14-N encodes/decodes data and/or information messages (e.g., user messages such as user messages 22-1 through 22-N) in accordance with one or more wireless standards for local wireless data signals (e.g., Wi-Fi, Bluetooth, ZigBee) and/or for wide area wireless data signals (e.g., 2G, 3G, 4G, 5G, satellite, point-to-point, etc.) to produce wireless signals 26-1 through 26-N. Having encoded/decoded the data and/or information messages, the wireless user devices 14-1 through 14-N and/receive the wireless signals to/from the wireless capability of the core network 24.

As another example of the generation and utilization of knowledge, the transactional servers 18-1 through 18-N communicate, via the core network 24, transaction messages 30-1 through 30-N as further AI messages 32-1 through 32-N to facilitate ingesting of transactional type content (e.g., real-time crypto currency transaction information) and to facilitate handling of utilization of the knowledge by one or more of the transactional servers (e.g., for a transactional function) in addition to the utilization of the knowledge by the various user devices. Each transaction message 30-1 through 30-N includes one or more of a query request, a query response, a trigger request, a trigger response, a content message, and transactional information, where the transactional information may include one or more of consumer purchasing history, crypto currency ledgers, stock market trade information, other investment transaction information, etc.

In another specific example of operation of the generation and utilization of knowledge extracted from the content, the user device 12-1 issues a user message 22-1 to the AI server 20-1, where the user message 22-1 includes a query request and where the query request includes a question related to a first domain of knowledge. The issuing includes generating the user message 22-1 based on the query request (e.g., the question), selecting the AI server 20-1 based on the first domain of knowledge, and sending, via the core network 24, the user message 22-1 as a further AI message 32-1 to the AI server 20-1. Having received the AI message 32-1, the AI server 20-1 analyzes the question within the first domain, generates further knowledge, generates a preliminary answer, generates a quality level indicator of the preliminary answer, and determines to gather further content when the quality level indicator is below a minimum quality threshold level.

When gathering the further content, the AI server 20-1 issues, via the core network 24, a still further AI message 32-1 as a further content message 28-1 to the content source 16-1, where the content message 28-1 includes a content request for more content associated with the first domain of knowledge and in particular the question. Alternatively, or in addition to, the AI server 20-1 issues the content request to another AI server to facilitate a response within a domain associated with the other AI server. Further alternatively, or in addition to, the AI server 20-1 issues the content request to one or more of the various user devices to facilitate a response from a subject matter expert.

Having received the content message 28-1, the contents or 16-1 issues, via the core network 24, a still further content message 28-1 to the AI server 20-1 as a yet further AI message 32-1, where the still further content message 28-1 includes requested content. The AI server 20-1 processes the received content to generate further knowledge. Having generated the further knowledge, the AI server 20-1 reanalyzes the question, generates still further knowledge, generates another preliminary answer, generates another quality level indicator of the other preliminary answer, and determines to issue a query response to the user device 12-1 when the quality level indicator is above the minimum quality threshold level. When issuing the query response, the AI server 20-1 generates an AI message 32-1 that includes another user message 22-1, where the other user message 22-1 includes the other preliminary answer as a query response including the answer to the question. Having generated the AI message 32-1, the AI server 20-1 sends, via the core network 24, the AI message 32-1 as the user message 22-1 to the user device 12-1 thus providing the answer to the original question of the query request.

Figure 2:
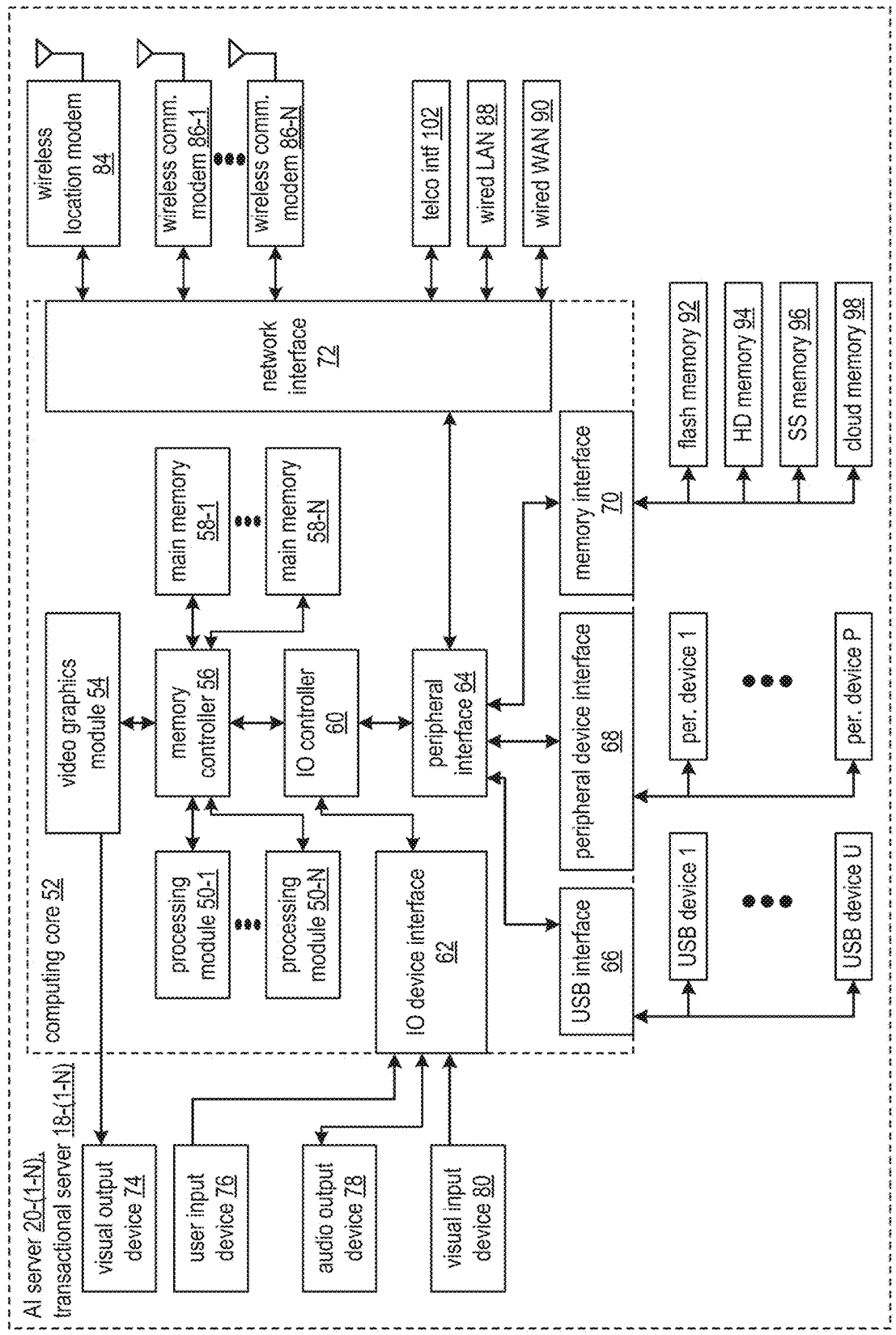
FIG. 2 is a schematic block diagram of an embodiment of various servers of a computing system in accordance with the present invention.

FIG. 2 is a schematic block diagram of an embodiment of the AI servers 20-1 through 20-N and the transactional servers 18-1 through 18-N of the computing system 10 of FIG. 1. The servers include a computing core 52, one or more visual output devices 74 (e.g., video graphics display, touchscreen, LED, etc.), one or more user input devices 76 (e.g., keypad, keyboard, touchscreen, voice to text, a push button, a microphone, a card reader, a door position switch, a biometric input device, etc.), one or more audio output devices 78 (e.g., speaker(s), headphone jack, a motor, etc.), and one or more visual input devices 80 (e.g., a still image camera, a video camera, photocell, etc.).

The servers further include one or more universal serial bus (USB) devices (USB devices 1-U), one or more peripheral devices (e.g., peripheral devices 1-P), one or more memory devices (e.g., one or more flash memory devices 92, one or more hard drive (HD) memories 94, and one or more solid state (SS) memory devices 96, and/or cloud memory 98). The servers further include one or more wireless location modems 84 (e.g., global positioning satellite (GPS), Wi-Fi, angle of arrival, time difference of arrival, signal strength, dedicated wireless location, etc.), one or more wireless communication modems 86-1 through 86-N (e.g., a cellular network transceiver, a wireless data network transceiver, a Wi-Fi transceiver, a Bluetooth transceiver, a 315 MHz transceiver, a zig bee transceiver, a 60 GHz transceiver, etc.), a telco interface 102 (e.g., to interface to a public switched telephone network), and a wired local area network (LAN) 88 (e.g., optical, electrical), and a wired wide area network (WAN) 90 (e.g., optical, electrical).

The computing core 52 includes a video graphics module 54, one or more processing modules 50-1 through 50-N (e.g., which may include one or more secure co-processors), a memory controller 56 and one or more main memories 58-1 through 58-N (e.g., RAM serving as local memory). The computing core 52 further includes one or more input/output (I/O) device interfaces 62, an input/output (I/O) controller 60, a peripheral interface 64, one or more USB interfaces 66, one or more network interfaces 72, one or more memory interfaces 70, and/or one or more peripheral device interfaces 68.

The processing modules may be a single processing device or a plurality of processing devices where the processing device may further be referred to as one or more of a "processing circuit", a "processor", and/or a "processing unit". Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network).

Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

Each of the interfaces 62, 66, 68, 70, and 72 includes a combination of hardware (e.g., connectors, wiring, etc.) and may further include operational instructions stored on memory (e.g., driver software) that are executed by one or more of the processing modules 50-1 through 50-N and/or a processing circuit within the interface. Each of the interfaces couples to one or more components of the servers. For example, one of the IO device interfaces 62 couples to an audio output device 78. As another example, one of the memory interfaces 70 couples to flash memory 92 and another one of the memory interfaces 70 couples to cloud memory 98 (e.g., an on-line storage system and/or on-line backup system). In other embodiments, the servers may include more or less devices and modules than shown in this example embodiment of the servers.

Figure 3:
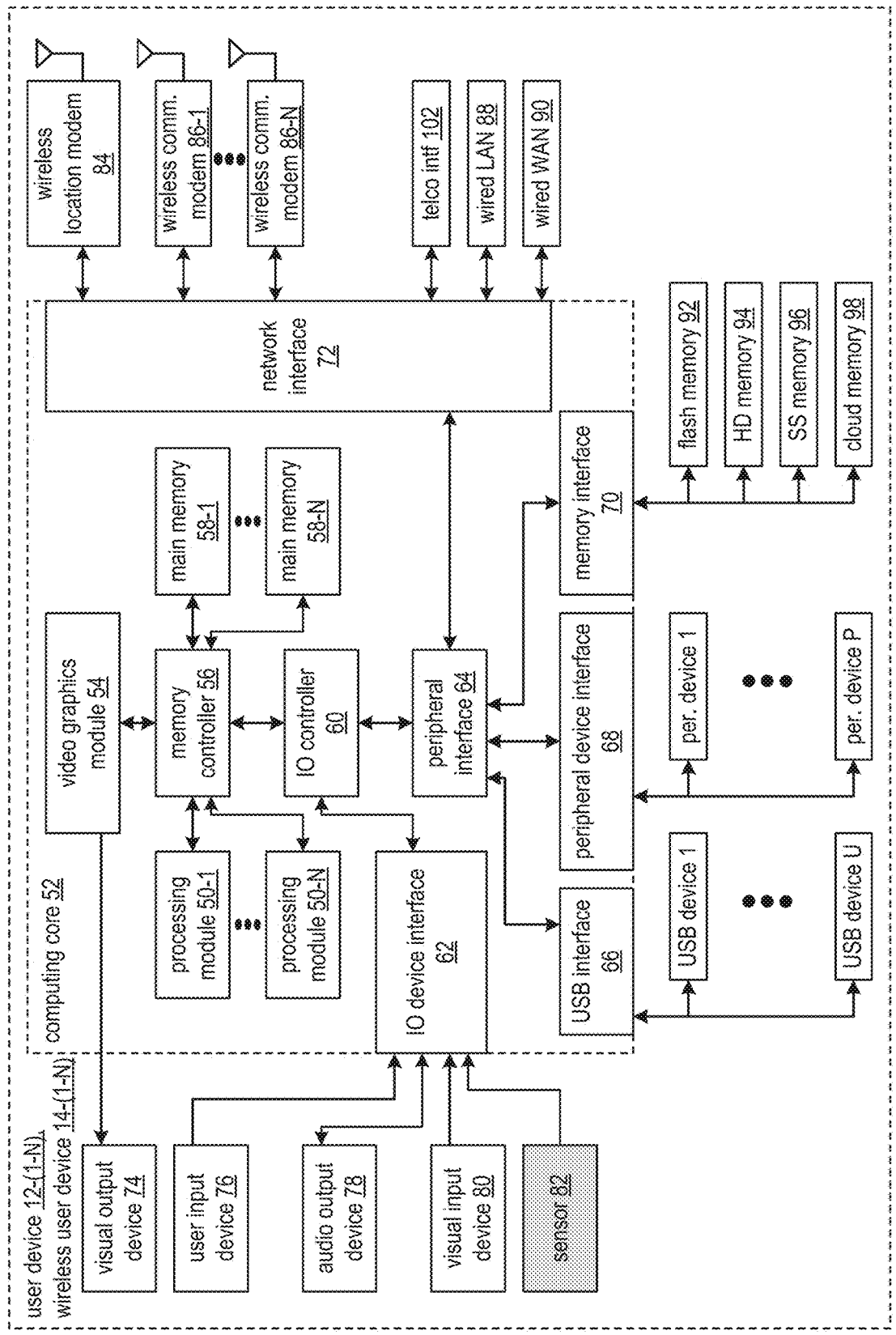
FIG. 3 is a schematic block diagram of an embodiment of various devices of a computing system in accordance with the present invention.

FIG. 3 is a schematic block diagram of an embodiment of the various devices of the computing system 10 of FIG. 1, including the user devices 12-1 through 12-N and the wireless user devices 14-1 through 14-N. The various devices include the visual output device 74 of FIG. 2, the user input device 76 of FIG. 2, the audio output device 78 of FIG. 2, the visual input device 80 of FIG. 2, and one or more sensors 82.

The sensor may be implemented internally and/or externally to the device. Example sensors includes a still camera, a video camera, servo motors associated with a camera, a position detector, a smoke detector, a gas detector, a motion sensor, an accelerometer, velocity detector, a compass, a gyro, a temperature sensor, a pressure sensor, an altitude sensor, a humidity detector, a moisture detector, an imaging sensor, and a biometric sensor. Further examples of the sensor include an infrared sensor, an audio sensor, an ultrasonic sensor, a proximity detector, a magnetic field detector, a biomaterial detector, a radiation detector, a weight detector, a density detector, a chemical analysis detector, a fluid flow volume sensor, a DNA reader, a wind speed sensor, a wind direction sensor, and an object detection sensor.

Further examples of the sensor include an object identifier sensor, a motion recognition detector, a battery level detector, a room temperature sensor, a sound detector, a smoke detector, an intrusion detector, a motion detector, a door position sensor, a window position sensor, and a sunlight detector. Still further sensor examples include medical category sensors including: a pulse rate monitor, a heart rhythm monitor, a breathing detector, a blood pressure monitor, a blood glucose level detector, blood type, an electrocardiogram sensor, a body mass detector, an imaging sensor, a microphone, body temperature, etc.

The various devices further include the computing core 52 of FIG. 2, the one or more universal serial bus (USB) devices (USB devices 1-U) of FIG. 2, the one or more peripheral devices (e.g., peripheral devices 1-P) of FIG. 2, and the one or more memories of FIG. 2 (e.g., flash memories 92, HD memories 94, SS memories 96, and/or cloud memories 98). The various devices further include the one or more wireless location modems 84 of FIG. 2, the one or more wireless communication modems 86-1 through 86-N of FIG. 2, the telco interface 102 of FIG. 2, the wired local area network (LAN) 88 of FIG. 2, and the wired wide area network (WAN) 90 of FIG. 2. In other embodiments, the various devices may include more or less internal devices and modules than shown in this example embodiment of the various devices.

Figure 4A:
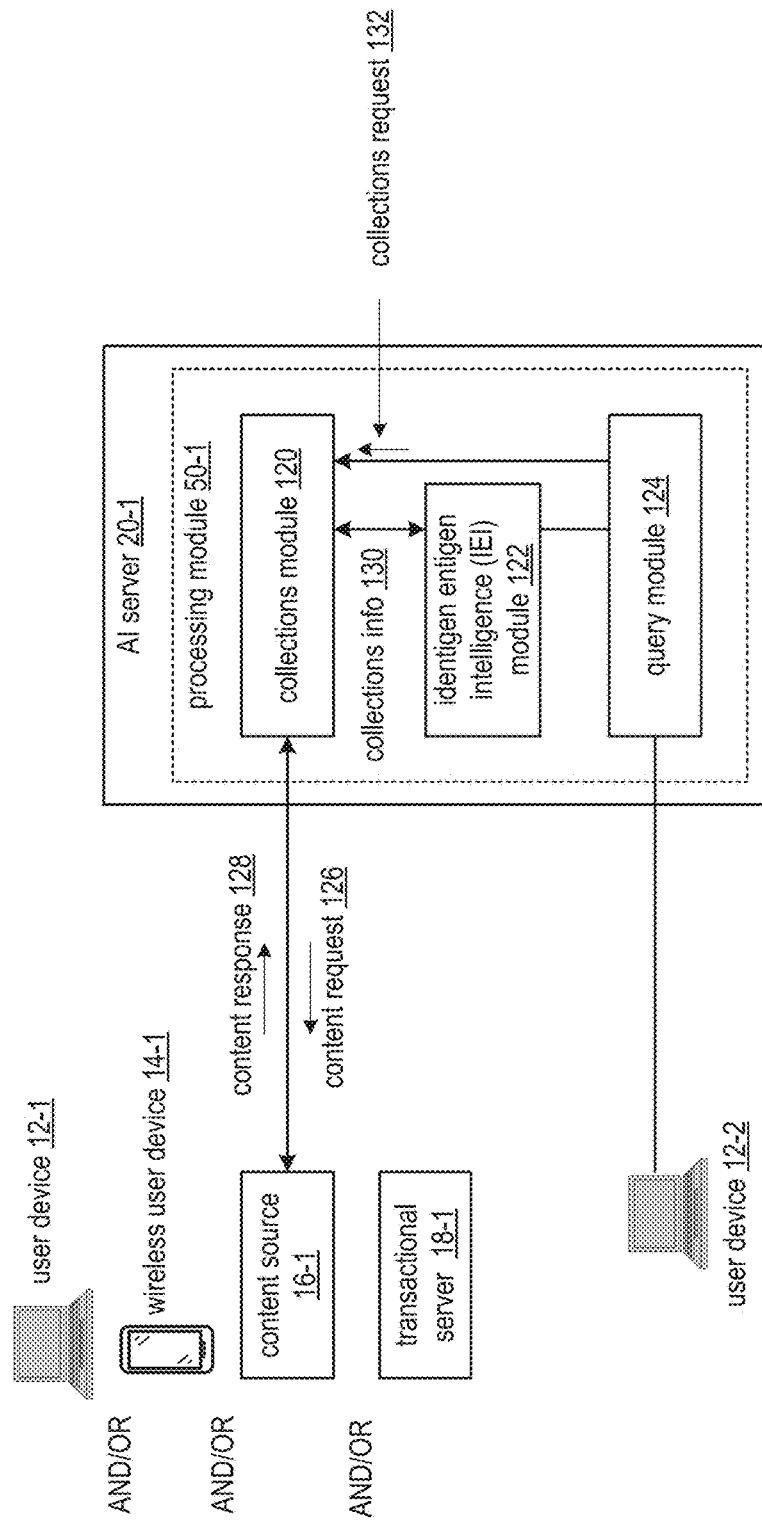
FIGS. 4A and 4B are schematic block diagrams of another embodiment of a computing system in accordance with the present invention.
Figure 4B:
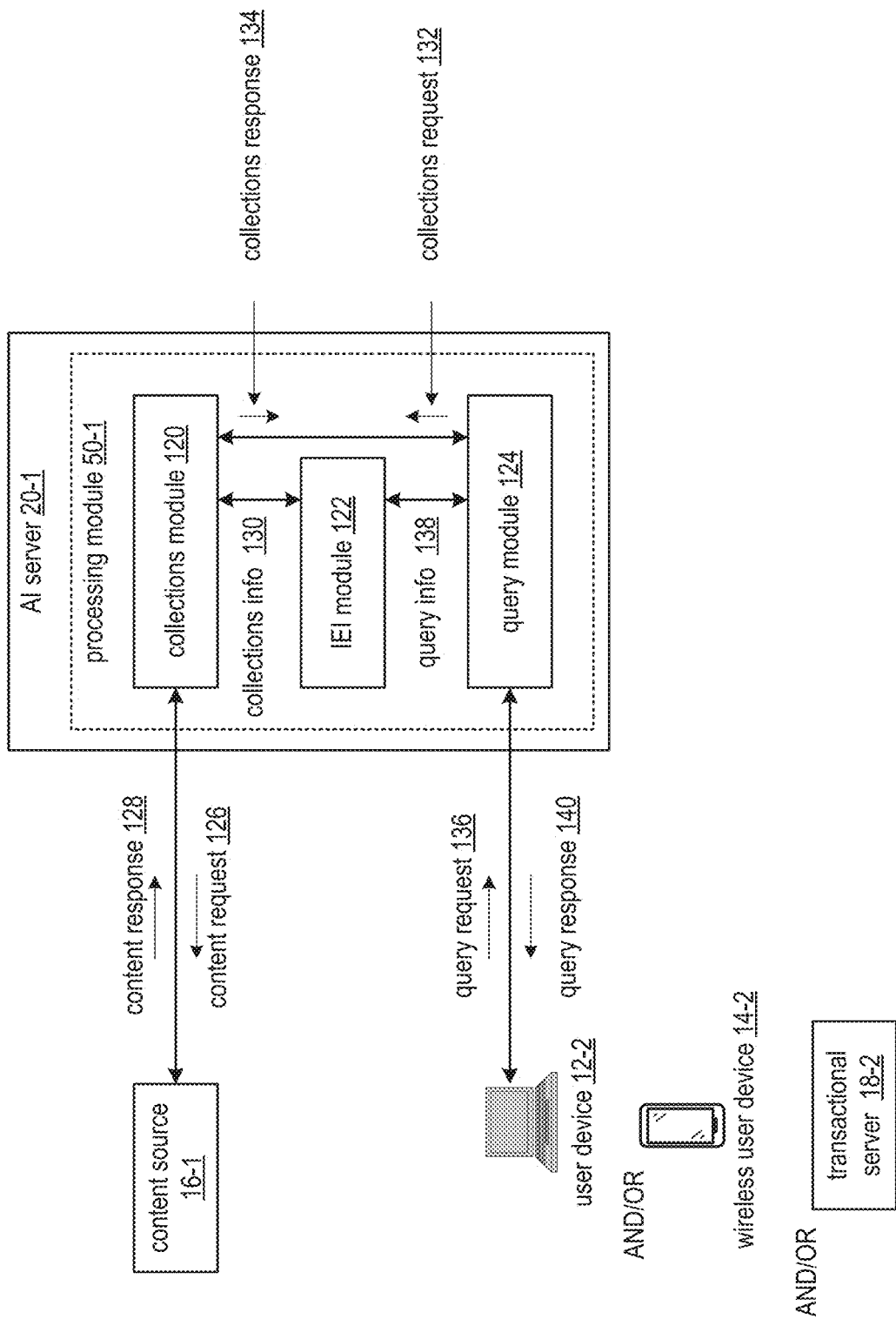

FIGS. 4A and 4B are schematic block diagrams of another embodiment of a computing system that includes one or more of the user device 12-1 of FIG. 1, the wireless user device 14-1 of FIG. 1, the content source 16-1 of FIG. 1, the transactional server 18-1 of FIG. 1, the user device 12-2 of FIG. 1, and the AI server 20-1 of FIG. 1. The AI server 20-1 includes the processing module 50-1 (e.g., associated with the servers) of FIG. 2, where the processing module 50-1 includes a collections module 120, an identigen entigen intelligence (IEI) module 122, and a query module 124. Alternatively, the collections module 120, the IEI module 122, and the query module 124 may be implemented by the processing module 50-1 (e.g., associated with the various user devices) of FIG. 3. The computing system functions to interpret content to produce a response to a query.

FIG. 4A illustrates an example of the interpreting of the content to produce the response to the query where the collections module 120 interprets (e.g., based on an interpretation approach such as rules) at least one of a collections request 132 from the query module 124 and a collections request within collections information 130 from the IEI module 122 to produce content request information (e.g., potential sources, content descriptors of desired content). Alternatively, or in addition to, the collections module 120 may facilitate gathering further content based on a plurality of collection requests from a plurality of devices of the computing system 10 of FIG. 1.

The collections request 132 is utilized to facilitate collection of content, where the content may be received in a real-time fashion once or at desired intervals, or in a static fashion from previous discrete time frames. For instance, the query module 124 issues the collections request 132 to facilitate collection of content as a background activity to support a long-term query (e.g., how many domestic airline flights over the next seven days include travelers between the age of 18 and 35 years old). The collections request 132 may include one or more of a requester identifier (ID), a content type (e.g., language, dialect, media type, topic, etc.), a content source indicator, security credentials (e.g., an authorization level, a password, a user ID, parameters utilized for encryption, etc.), a desired content quality level, trigger information (e.g., parameters under which to collect content based on a pre-event, an event (i.e., content quality level reaches a threshold to cause the trigger, trueness), or a timeframe), a desired format, and a desired timing associated with the content.

Having interpreted the collections request 132, the collections module 120 selects a source of content based on the content request information. The selecting includes one or more of identifying one or more potential sources based on the content request information, selecting the source of content from the potential sources utilizing a selection approach (e.g., favorable history, a favorable security level, favorable accessibility, favorable cost, favorable performance, etc.). For example, the collections module 120 selects the content source 16-1 when the content source 16-1 is known to provide a favorable content quality level for a domain associated with the collections request 132.

Having selected the source of content, the collections module 120 issues a content request 126 to the selected source of content. The issuing includes generating the content request 126 based on the content request information for the selected source of content and sending the content request 126 to the selected source of content. The content request 126 may include one or more of a content type indicator, a requester ID, security credentials for content access, and any other information associated with the collections request 132. For example, the collections module 120 sends the content request 126, via the core network 24 of FIG. 1, to the content source 16-1. Alternatively, or in addition to, the collections module 120 may send a similar content request 126 to one or more of the user device 12-1, the wireless user device 14-1, and the transactional server 18-1 to facilitate collecting of further content.

In response to the content request 126, the collections module 120 receives one or more content responses 128. The content response 128 includes one or more of content associated with the content source, a content source identifier, security credential processing information, and any other information pertaining to the desired content. Having received the content response 128, the collections module 120 interprets the received content response 128 to produce collections information 130, where the collections information 130 further includes a collections response from the collections module 120 to the IEI module 122.

The collections response includes one or more of transformed content (e.g., completed sentences and paragraphs), timing information associated with the content, a content source ID, and a content quality level. Having generated the collections response of the collections information 130, the collections module 120 sends the collections information 130 to the IEI module 122. Having received the collections information 130 from the collections module 120, the IEI module 122 interprets the further content of the content response to generate further knowledge, where the further knowledge is stored in a memory associated with the IEI module 122 to facilitate subsequent answering of questions posed in received queries.

FIG. 4B further illustrates the example of the interpreting of the content to produce the response to the query where, the query module 124 interprets a received query request 136 from a requester to produce an interpretation of the query request. For example, the query module 124 receives the query request 136 from the user device 12-2, and/or from one or more of the wireless user device 14-2 and the transactional server 18-2. The query request 136 includes one or more of an identifier (ID) associated with the request (e.g., requester ID, ID of an entity to send a response to), a question, question constraints (e.g., within a timeframe, within a geographic area, within a domain of knowledge, etc.), and content associated with the question (e.g., which may be analyzed for new knowledge itself).

The interpreting of the query request 136 includes determining whether to issue a request to the IEI module 122 (e.g., a question, perhaps with content) and/or to issue a request to the collections module 120 (e.g., for further background content). For example, the query module 124 produces the interpretation of the query request to indicate to send the request directly to the IEI module 122 when the question is associated with a simple non-time varying function answer (e.g., question: "how many hydrogen atoms does a molecule of water have?").

Having interpreted the query request 136, the query module 124 issues at least one of an IEI request as query information 138 to the IEI module 122 (e.g., when receiving a simple new query request) and a collections request 132 to the collections module 120 (e.g., based on two or more query requests 136 requiring more substantive content gathering). The IEI request of the query information 138 includes one or more of an identifier (ID) of the query module 124, an ID of the requester (e.g., the user device 12-2), a question (e.g., with regards to content for analysis, with regards to knowledge minded by the AI server from general content), one or more constraints (e.g., assumptions, restrictions, etc.) associated with the question, content for analysis of the question, and timing information (e.g., a date range for relevance of the question).

Having received the query information 138 that includes the IEI request from the query module 124, the IEI module 122 determines whether a satisfactory response can be generated based on currently available knowledge, including that of the query request 136. The determining includes indicating that the satisfactory response cannot be generated when an estimated quality level of an answer falls below a minimum quality threshold level. When the satisfactory response cannot be generated, the IEI module 122 facilitates collecting more content. The facilitating includes issuing a collections request to the collections module 120 of the AI server 20-1 and/or to another server or user device, and interpreting a subsequent collections response 134 of collections information 130 that includes further content to produce further knowledge to enable a more favorable answer.

When the IEI module 122 indicates that the satisfactory response can be generated, the IEI module 122 issues an IEI response as query information 138 to the query module 124. The IEI response includes one or more of one or more answers, timing relevance of the one or more answers, an estimated quality level of each answer, and one or more assumptions associated with the answer. The issuing includes generating the IEI response based on the collections response 134 of the collections information 130 and the IEI request, and sending the IEI response as the query information 138 to the query module 124. Alternatively, or in addition to, at least some of the further content collected by the collections module 120 is utilized to generate a collections response 134 issued by the collections module 120 to the query module 124. The collections response 134 includes one or more of further content, a content availability indicator (e.g., when, where, required credentials, etc.), a content freshness indicator (e.g., timestamps, predicted time availability), content source identifiers, and a content quality level.

Having received the query information 138 from the IEI module 122, the query module 124 issues a query response 140 to the requester based on the IEI response and/or the collections response 134 directly from the collections module 120, where the collection module 120 generates the collections response 134 based on collected content and the collections request 132. The query response 140 includes one or more of an answer, answer timing, an answer quality level, and answer assumptions.

Figure 4C:
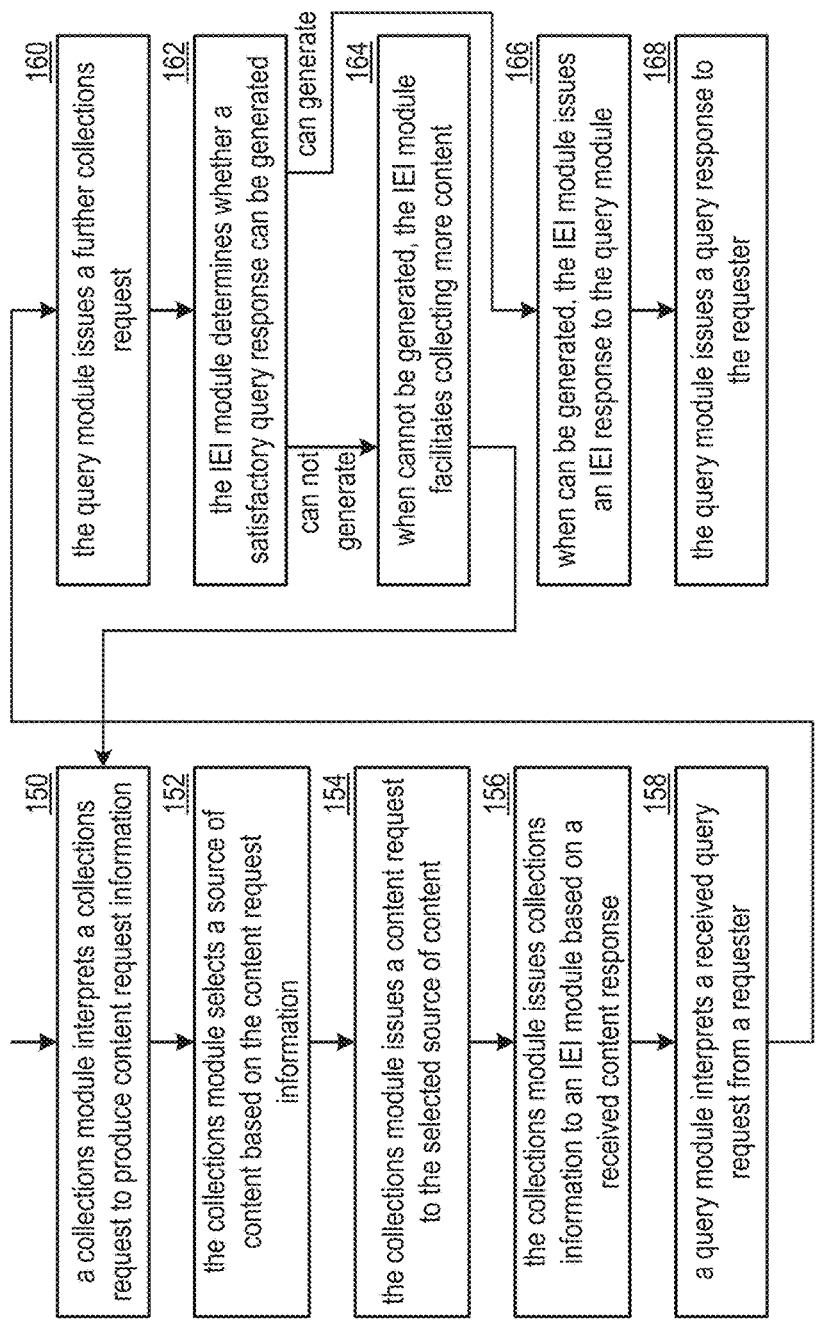
FIG. 4C is a logic diagram of an embodiment of a method for interpreting content to produce a response to a query within a computing system in accordance with the present invention.

FIG. 4C is a logic diagram of an embodiment of a method for interpreting content to produce a response to a query within a computing system. In particular, a method is presented for use in conjunction with one or more functions and features described in conjunction with FIGS. 1-3, 4A-4B, and also FIG. 4C. The method includes step 150 where a collections module of a processing module of one or more computing devices (e.g., of one or more servers) interprets a collections request to produce content request information. The interpreting may include one or more of identifying a desired content source, identifying a content type, identifying a content domain, and identifying content timing requirements.

The method continues at step 152 where the collections module selects a source of content based on the content request information. For example, the collections module identifies one or more potential sources based on the content request information and selects the source of content from the potential sources utilizing a selection approach (e.g., based on one or more of favorable history, a favorable security level, favorable accessibility, favorable cost, favorable performance, etc.). The method continues at step 154 where the collections module issues a content request to the selected source of content. The issuing includes generating a content request based on the content request information for the selected source of content and sending the content request to the selected source of content.

The method continues at step 156 where the collections module issues collections information to an identigen entigen intelligence (IEI) module based on a received content response, where the IEI module extracts further knowledge from newly obtained content from the one or more received content responses. For example, the collections module generates the collections information based on newly obtained content from the one or more received content responses of the selected source of content.

The method continues at step 158 where a query module interprets a received query request from a requester to produce an interpretation of the query request. The interpreting may include determining whether to issue a request to the IEI module (e.g., a question) or to issue a request to the collections module to gather further background content. The method continues at step 160 where the query module issues a further collections request. For example, when receiving a new query request, the query module generates a request for the IEI module. As another example, when receiving a plurality of query requests for similar questions, the query module generates a request for the collections module to gather further background content.

The method continues at step 162 where the IEI module determines whether a satisfactory query response can be generated when receiving the request from the query module. For example, the IEI module indicates that the satisfactory query response cannot be generated when an estimated quality level of an answer is below a minimum answer quality threshold level. The method branches to step 166 when the IEI module determines that the satisfactory query response can be generated. The method continues to step 164 when the IEI module determines that the satisfactory query response cannot be generated. When the satisfactory query response cannot be generated, the method continues at step 164 where the IEI module facilitates collecting more content. The method loops back to step 150.

When the satisfactory query response can be generated, the method continues at step 166 where the IEI module issues an IEI response to the query module. The issuing includes generating the IEI response based on the collections response and the IEI request, and sending the IEI response to the query module. The method continues at step 168 where the query module issues a query response to the requester. For example, the query module generates the query response based on the IEI response and/or a collections response from the collections module and sends the query response to the requester, where the collections module generates the collections response based on collected content and the collections request.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5A:
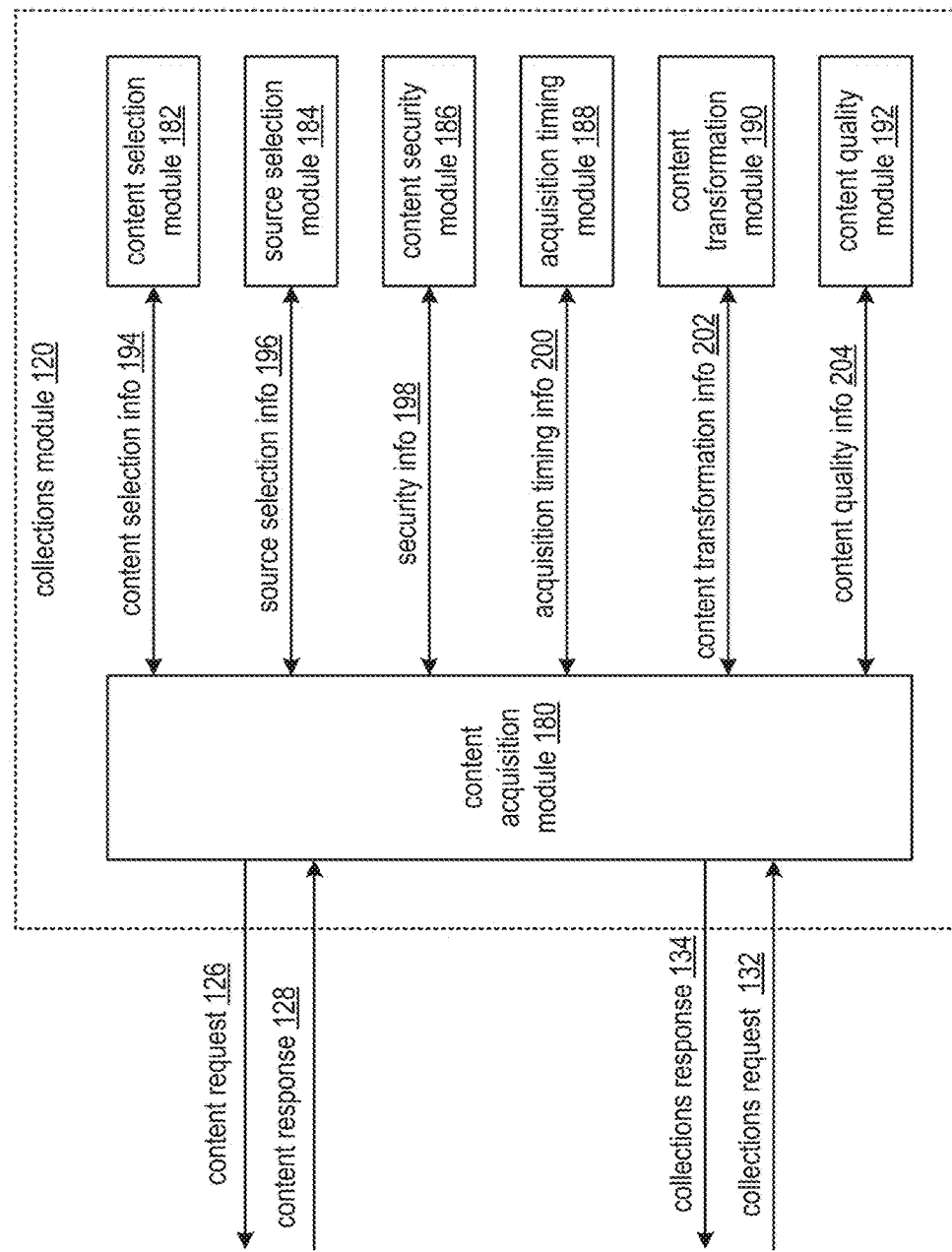
FIG. 5A is a schematic block diagram of an embodiment of a collections module of a computing system in accordance with the present invention.

FIG. 5A is a schematic block diagram of an embodiment of the collections module 120 of FIG. 4A that includes a content acquisition module 180, a content selection module 182, a source selection module 184, a content security module 186, an acquisition timing module 188, a content transformation module 190, and a content quality module 192. Generally, an embodiment of this invention presents solutions where the collections module 120 supports collecting content.

In an example of operation of the collecting of the content, the content acquisition module 180 receives a collections request 132 from a requester. The content acquisition module 180 obtains content selection information 194 based on the collections request 132. The content selection information 194 includes one or more of content requirements, a desired content type indicator, a desired content source identifier, a content type indicator, a candidate source identifier (ID), and a content profile (e.g., a template of typical parameters of the content). For example, the content acquisition module 180 receives the content selection information 194 from the content selection module 182, where the content selection module 182 generates the content selection information 194 based on a content selection information request from the content acquisition module 180 and where the content acquisition module 180 generates the content selection information request based on the collections request 132.

The content acquisition module 180 obtains source selection information 196 based on the collections request 132. The source selection information 196 includes one or more of candidate source identifiers, a content profile, selected sources, source priority levels, and recommended source access timing. For example, the content acquisition module 180 receives the source selection information 196 from the source selection module 184, where the source selection module 184 generates the source selection information 196 based on a source selection information request from the content acquisition module 180 and where the content acquisition module 180 generates the source selection information request based on the collections request 132.

The content acquisition module 180 obtains acquisition timing information 200 based on the collections request 132. The acquisition timing information 200 includes one or more of recommended source access timing, confirmed source access timing, source access testing results, estimated velocity of content update's, content precious, timestamps, predicted time availability, required content acquisition triggers, content acquisition trigger detection indicators, and a duplicative indicator with a pending content request. For example, the content acquisition module 180 receives the acquisition timing information 200 from the acquisition timing module 188, where the acquisition timing module 188 generates the acquisition timing information 200 based on an acquisition timing information request from the content acquisition module 180 and where the content acquisition module 180 generates the acquisition timing information request based on the collections request 132.

Having obtained the content selection information 194, the source selection information 196, and the acquisition timing information 200, the content acquisition module 180 issues a content request 126 to a content source utilizing security information 198 from the content security module 186, where the content acquisition module 180 generates the content request 126 in accordance with the content selection information 194, the source selection information 196, and the acquisition timing information 200. The security information 198 includes one or more of source priority requirements, requester security information, available security procedures, and security credentials for trust and/or encryption. For example, the content acquisition module 180 generates the content request 126 to request a particular content type in accordance with the content selection information 194 and to include security parameters of the security information 198, initiates sending of the content request 126 in accordance with the acquisition timing information 200, and sends the content request 126 to a particular targeted content source in accordance with the source selection information 196.

In response to receiving a content response 128, the content acquisition module 180 determines the quality level of received content extracted from the content response 128. For example, the content acquisition module 180 receives content quality information 204 from the content quality module 192, where the content quality module 192 generates the quality level of the received content based on receiving a content quality request from the content acquisition module 180 and where the content acquisition module 180 generates the content quality request based on content extracted from the content response 128. The content quality information includes one or more of a content reliability threshold range, a content accuracy threshold range, a desired content quality level, a predicted content quality level, and a predicted level of trust.

When the quality level is below a minimum desired quality threshold level, the content acquisition module 180 facilitates acquisition of further content. The facilitating includes issuing another content request 126 to a same content source and/or to another content source to receive and interpret further received content. When the quality level is above the minimum desired quality threshold level, the content acquisition module 180 issues a collections response 134 to the requester. The issuing includes processing the content in accordance with a transformation approach to produce transformed content, generating the collections response 134 to include the transformed content, and sending the collections response 134 to the requester. The processing of the content to produce the transformed content includes receiving content transformation information 202 from the content transformation module 190, where the content transformation module 190 transforms the content in accordance with the transformation approach to produce the transformed content. The content transformation information includes a desired format, available formats, recommended formatting, the received content, transformation instructions, and the transformed content.

Figure 5B:
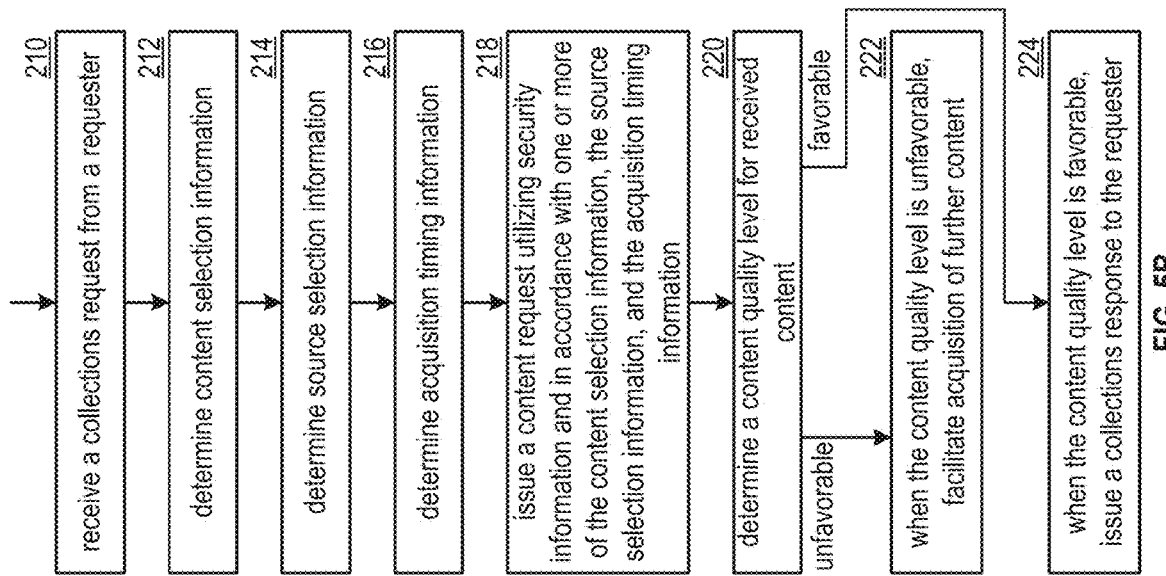
FIG. 5B is a logic diagram of an embodiment of a method for obtaining content within a computing system in accordance with the present invention.

FIG. 5B is a logic diagram of an embodiment of a method for obtaining content within a computing system. In particular, a method is presented for use in conjunction with one or more functions and features described in conjunction with FIGS. 1-3, 4A-4C, 5A, and also FIG. 5B. The method includes step 210 where a processing module of one or more processing modules of one or more computing devices of the computing system receives a collections request from the requester. The method continues at step 212 where the processing module determines content selection information. The determining includes interpreting the collections request to identify requirements of the content.

The method continues at step 214 where the processing module determines source selection information. The determining includes interpreting the collections request to identify and select one or more sources for the content to be collected. The method continues at step 216 where the processing module determines acquisition timing information. The determining includes interpreting the collections request to identify timing requirements for the acquisition of the content from the one or more sources. The method continues at step 218 where the processing module issues a content request utilizing security information and in accordance with one or more of the content selection information, the source selection information, and the acquisition timing information. For example, the processing module issues the content request to the one or more sources for the content in accordance with the content requirements, where the sending of the request is in accordance with the acquisition timing information.

The method continues at step 220 where the processing module determines a content quality level for received content area the determining includes receiving the content from the one or more sources, obtaining content quality information for the received content based on a quality analysis of the received content. The method branches to step 224 when the content quality level is favorable and the method continues to step 222 when the quality level is unfavorable. For example, the processing module determines that the content quality level is favorable when the content quality level is equal to or above a minimum quality threshold level and determines that the content quality level is unfavorable when the content quality level is less than the minimum quality threshold level.

When the content quality level is unfavorable, the method continues at step 222 where the processing module facilitates acquisition and further content. For example, the processing module issues further content requests and receives further content for analysis. When the content quality level is favorable, the method continues at step 224 where the processing module issues a collections response to the requester. The issuing includes generating the collections response and sending the collections response to the requester. The generating of the collections response may include transforming the received content into transformed content in accordance with a transformation approach (e.g., reformatting, interpreting absolute meaning and translating into another language in accordance with the absolute meaning, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5C:
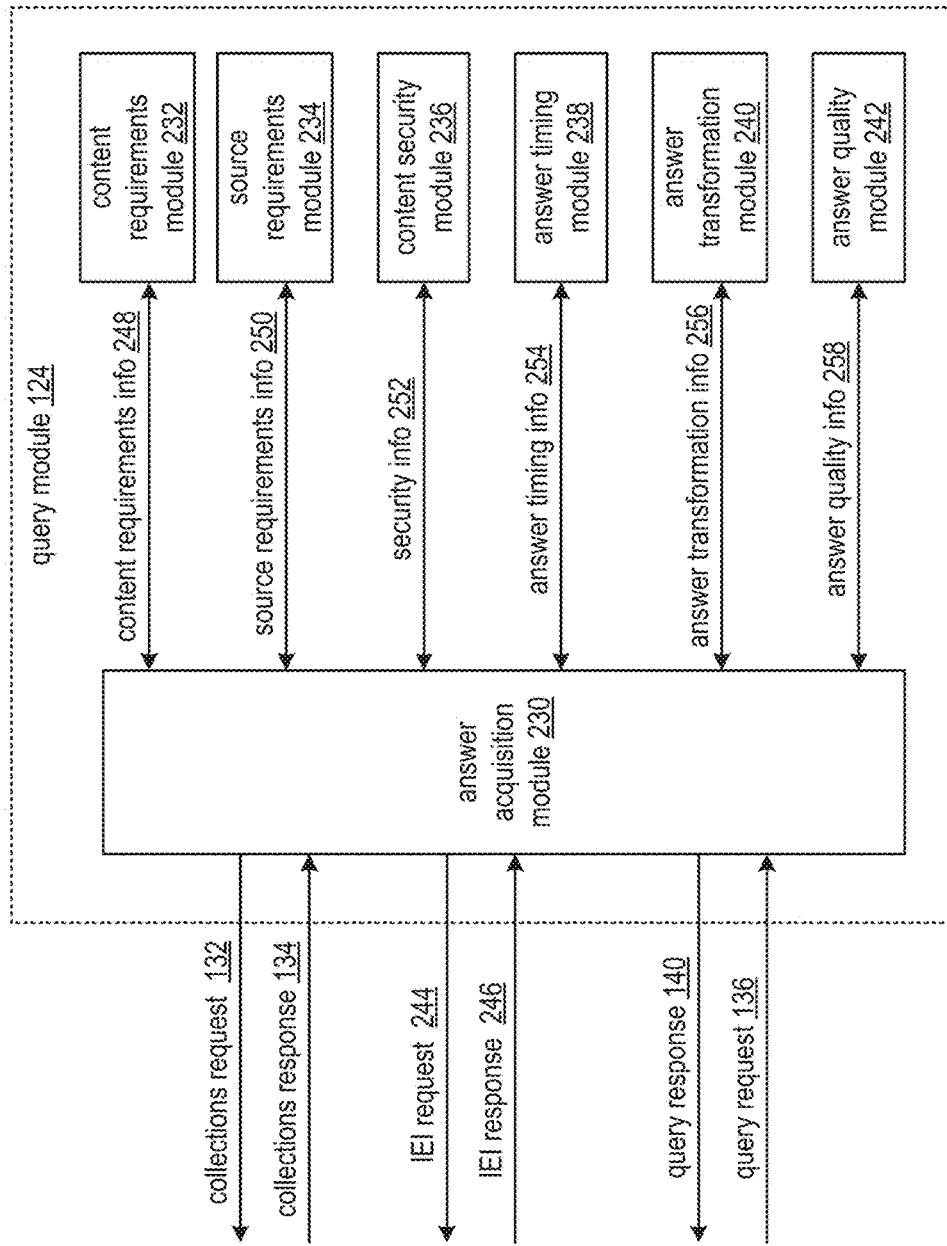
FIG. 5C is a schematic block diagram of an embodiment of a query module of a computing system in accordance with the present invention.

FIG. 5C is a schematic block diagram of an embodiment of the query module 124 of FIG. 4A that includes an answer acquisition module 230, a content requirements module 232 a source requirements module 234, a content security module 236, an answer timing module 238, an answer transformation module 240, and an answer quality module 242. Generally, an embodiment of this invention presents solutions where the query module 124 supports responding to a query.

In an example of operation of the responding to the query, the answer acquisition module 230 receives a query request 136 from a requester. The answer acquisition module 230 obtains content requirements information 248 based on the query request 136. The content requirements information 248 includes one or more of content parameters, a desired content type, a desired content source if any, a content type if any, candidate source identifiers, a content profile, and a question of the query request 136. For example, the answer acquisition module 230 receives the content requirements information 248 from the content requirements module 232, where the content requirements module 232 generates the content requirements information 248 based on a content requirements information request from the answer acquisition module 230 and where the answer acquisition module 230 generates the content requirements information request based on the query request 136.

The answer acquisition module 230 obtains source requirements information 250 based on the query request 136. The source requirements information 250 includes one or more of candidate source identifiers, a content profile, a desired source parameter, recommended source parameters, source priority levels, and recommended source access timing. For example, the answer acquisition module 230 receives the source requirements information 250 from the source requirements module 234, where the source requirements module 234 generates the source requirements information 250 based on a source requirements information request from the answer acquisition module 230 and where the answer acquisition module 230 generates the source requirements information request based on the query request 136.

The answer acquisition module 230 obtains answer timing information 254 based on the query request 136. The answer timing information 254 includes one or more of requested answer timing, confirmed answer timing, source access testing results, estimated velocity of content updates, content freshness, timestamps, predicted time available, requested content acquisition trigger, and a content acquisition trigger detected indicator. For example, the answer acquisition module 230 receives the answer timing information 254 from the answer timing module 238, where the answer timing module 238 generates the answer timing information 254 based on an answer timing information request from the answer acquisition module 230 and where the answer acquisition module 230 generates the answer timing information request based on the query request 136.

Having obtained the content requirements information 248, the source requirements information 250, and the answer timing information 254, the answer acquisition module 230 determines whether to issue an IEI request 244 and/or a collections request 132 based on one or more of the content requirements information 248, the source requirements information 250, and the answer timing information 254. For example, the answer acquisition module 230 selects the IEI request 244 when an immediate answer to a simple query request 136 is required and is expected to have a favorable quality level. As another example, the answer acquisition module 230 selects the collections request 132 when a longer-term answer is required as indicated by the answer timing information to before and/or when the query request 136 has an unfavorable quality level.

When issuing the IEI request 244, the answer acquisition module 230 generates the IEI request 244 in accordance with security information 252 received from the content security module 236 and based on one or more of the content requirements information 248, the source requirements information 250, and the answer timing information 254. Having generated the IEI request 244, the answer acquisition module 230 sends the IEI request 244 to at least one IEI module.

When issuing the collections request 132, the answer acquisition module 230 generates the collections request 132 in accordance with the security information 252 received from the content security module 236 and based on one or more of the content requirements information 248, the source requirements information 250, and the answer timing information 254. Having generated the collections request 132, the answer acquisition module 230 sends the collections request 132 to at least one collections module. Alternatively, the answer acquisition module 230 facilitate sending of the collections request 132 to one or more various user devices (e.g., to access a subject matter expert).

The answer acquisition module 230 determines a quality level of a received answer extracted from a collections response 134 and/or an IEI response 246. For example, the answer acquisition module 230 extracts the quality level of the received answer from answer quality information 258 received from the answer quality module 242 in response to an answer quality request from the answer acquisition module 230. When the quality level is unfavorable, the answer acquisition module 230 facilitates obtaining a further answer. The facilitation includes issuing at least one of a further IEI request 244 and a further collections request 132 to generate a further answer for further quality testing. When the quality level is favorable, the answer acquisition module 230 issues a query response 140 to the requester. The issuing includes generating the query response 140 based on answer transformation information 256 received from the answer transformation module 240, where the answer transformation module 240 generates the answer transformation information 256 to include a transformed answer based on receiving the answer from the answer acquisition module 230. The answer transformation information 250 6A further include the question, a desired format of the answer, available formats, recommended formatting, received IEI responses, transformation instructions, and transformed IEI responses into an answer.

Figure 5D:
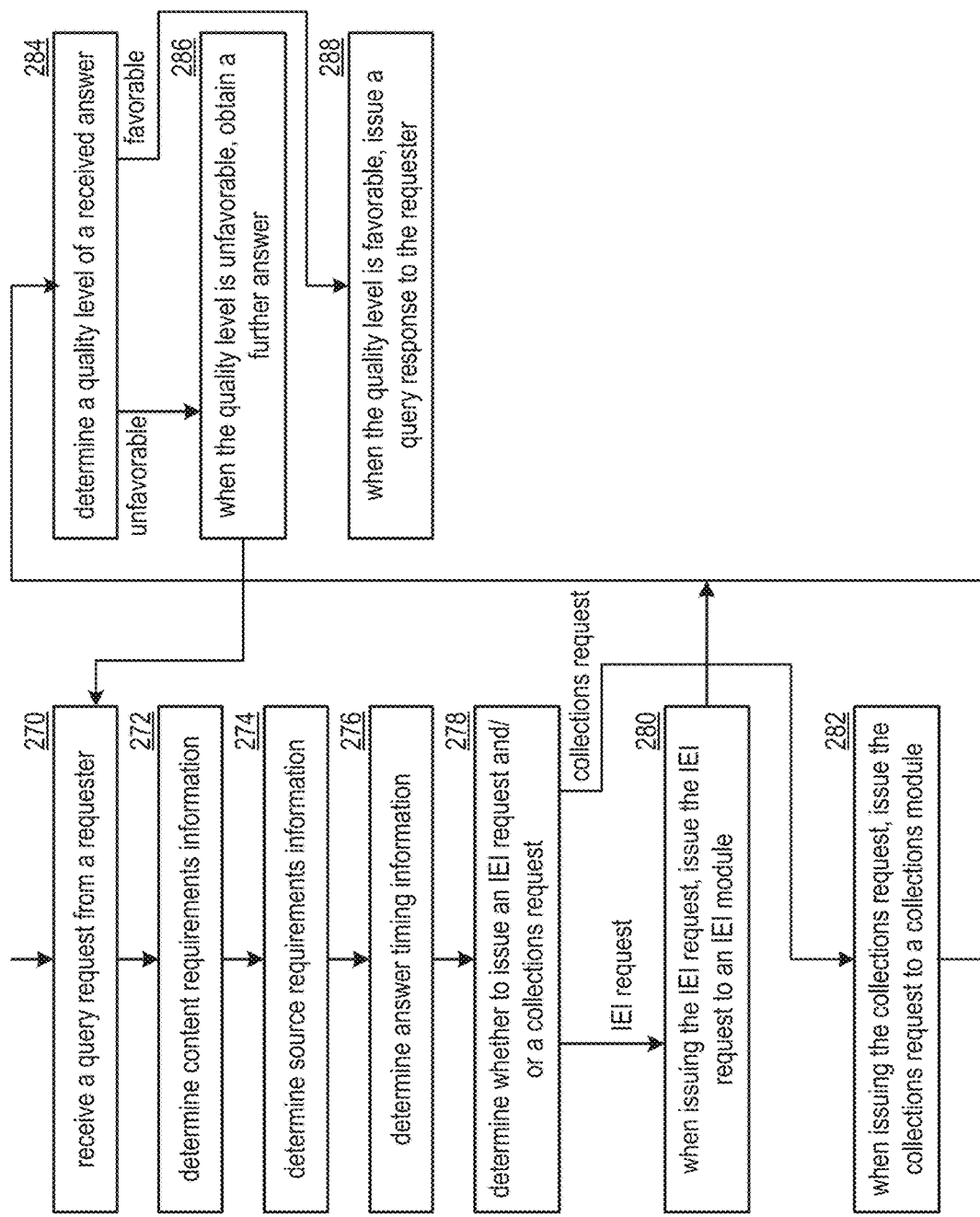
FIG. 5D is a logic diagram of an embodiment of a method for providing a response to a query within a computing system in accordance with the present invention.

FIG. 5D is a logic diagram of an embodiment of a method for providing a response to a query within a computing system. In particular, a method is presented for use in conjunction with one or more functions and features described in conjunction with FIGS. 1-3, 4A-4C, 5C, and also FIG. 5D. The method includes step 270 where a processing module of one or more processing modules of one or more computing devices of the computing system receives a query request (e.g., a question) from a requester. The method continues at step 272 where the processing module determines content requirements information. The determining includes interpreting the query request to produce the content requirements. The method continues at step 274 where the processing module determines source requirements information. The determining includes interpreting the query request to produce the source requirements. The method continues at step 276 where the processing module determines answer timing information. The determining includes interpreting the query request to produce the answer timing information.

The method continues at step 278 the processing module determines whether to issue an IEI request and/or a collections request. For example, the determining includes selecting the IEI request when the answer timing information indicates that a simple one-time answer is appropriate. As another example, the processing module selects the collections request when the answer timing information indicates that the answer is associated with a series of events over an event time frame.

When issuing the IEI request, the method continues at step 280 where the processing module issues the IEI request to an IEI module. The issuing includes generating the IEI request in accordance with security information and based on one or more of the content requirements information, the source requirements information, and the answer timing information.

When issuing the collections request, the method continues at step 282 where the processing module issues the collections request to a collections module. The issuing includes generating the collections request in accordance with the security information and based on one or more of the content requirements information, the source requirements information, and the answer timing information. Alternatively, the processing module issues both the IEI request and the collections request when a satisfactory partial answer may be provided based on a corresponding IEI response and a further more generalized and specific answer may be provided based on a corresponding collections response and associated further IEI response.

The method continues at step 284 where the processing module determines a quality level of a received answer. The determining includes extracting the answer from the collections response and/or the IEI response and interpreting the answer in accordance with one or more of the content requirements information, the source requirements information, the answer timing information, and the query request to produce the quality level. The method branches to step 288 when the quality level is favorable and the method continues to step 286 when the quality level is unfavorable. For example, the processing module indicates that the quality level is favorable when the quality level is equal to or greater than a minimum answer quality threshold level. As another example, the processing module indicates that the quality level is unfavorable when the quality level is less than the minimum answer quality threshold level.

When the quality level is unfavorable, the method continues at step 286 where the processing module obtains a further answer. The obtaining includes at least one of issuing a further IEI request and a further collections request to facilitate obtaining of a further answer for further answer quality level testing as the method loops back to step 270. When the quality level is favorable, the method continues at step 288 where the processing module issues a query response to the requester. The issuing includes transforming the answer into a transformed answer in accordance with an answer transformation approach (e.g., formatting, further interpretations of the virtual question in light of the answer and further knowledge) and sending the transformed answer to the requester as the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 5E:
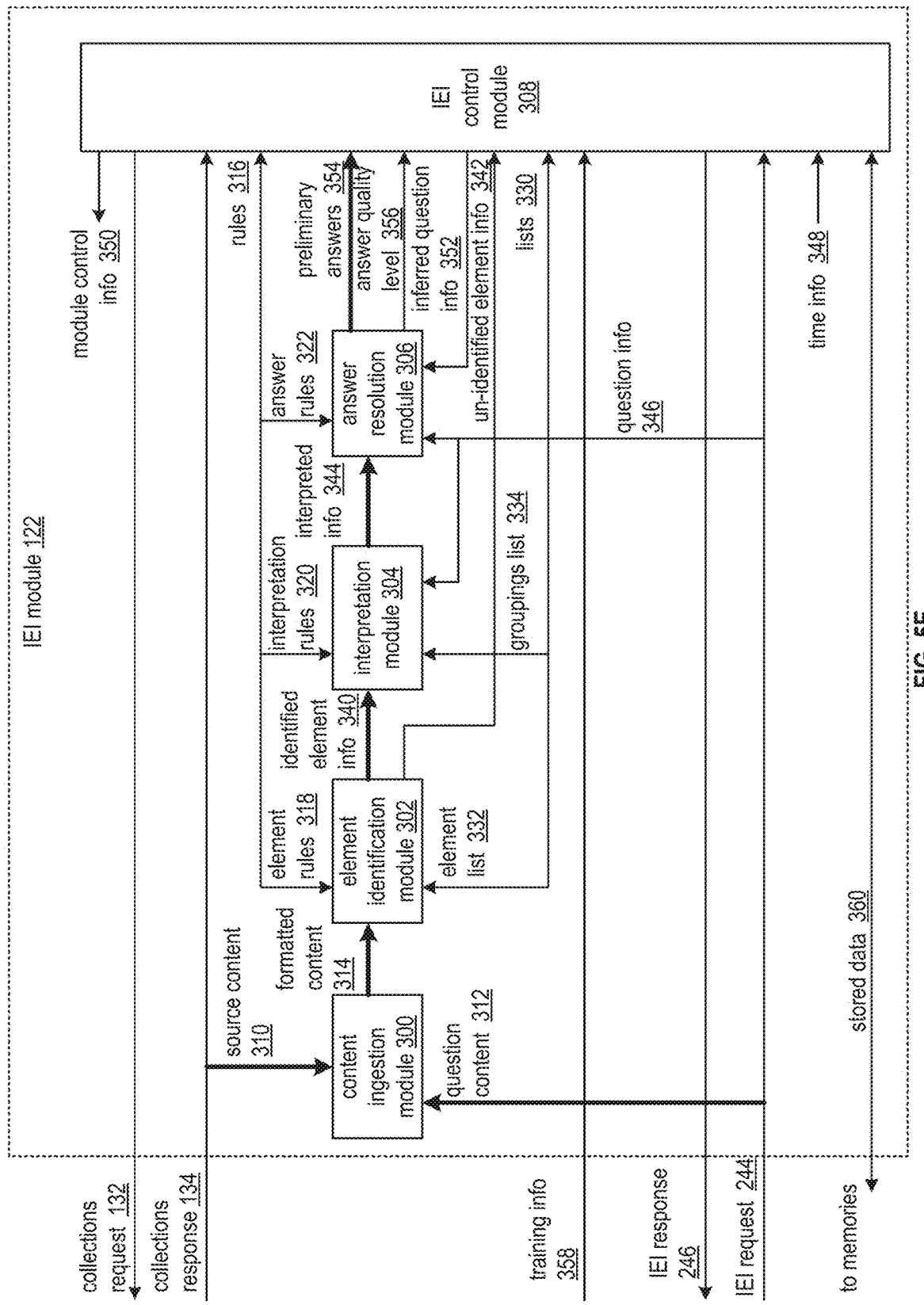
FIG. 5E is a schematic block diagram of an embodiment of an identigen entigen intelligence (IEI) module of a computing system in accordance with the present invention.

FIG. 5E is a schematic block diagram of an embodiment of the identigen entigen intelligence (IEI) module 122 of FIG. 4A that includes a content ingestion module 300, an element identification module 302, and interpretation module 304, and answer resolution module 306, and an IEI control module 308. Generally, an embodiment of this invention presents solutions where the IEI module 122 supports interpreting content to produce knowledge that may be utilized to answer questions.

In an example of operation of the producing and utilizing of the knowledge, the content ingestion module 300 generates formatted content 314 based on question content 312 and/or source content 310, where the IEI module 122 receives an IEI request 244 that includes the question content 312 and the IEI module 122 receives a collections response 134 that includes the source content 310. The source content 310 includes content from a source extracted from the collections response 134. The question content 312 includes content extracted from the IEI request 244 (e.g., content paired with a question). The content ingestion module 300 generates the formatted content 314 in accordance with a formatting approach (e.g., creating proper sentences from words of the content). The formatted content 314 includes modified content that is compatible with subsequent element identification (e.g., complete sentences, combinations of words and interpreted sounds and/or inflection cues with temporal associations of words).

The element identification module 302 processes the formatted content 314 based on element rules 318 and an element list 332 to produce identified element information 340. Rules 316 includes the element rules 318 (e.g., match, partial match, language translation, etc.). Lists 330 includes the element list 332 (e.g., element ID, element context ID, element usage ID, words, characters, symbols etc.). The IEI control module 308 may provide the rules 316 and the lists 330 by accessing stored data 360 from a memory associated with the IEI module 122. Generally, an embodiment of this invention presents solutions where the stored data 360 may further include one or more of a descriptive dictionary, categories, representations of element sets, element list, sequence data, pending questions, pending request, recognized elements, unrecognized elements, errors, etc.

The identified element information 340 includes one or more of identifiers of elements identified in the formatted content 314, may include ordering and/or sequencing and grouping information. For example, the element identification module 302 compares elements of the formatted content 314 to known elements of the element list 332 to produce identifiers of the known elements as the identified element information 340 in accordance with the element rules 318. Alternatively, the element identification module 302 outputs un-identified element information 342 to the IEI control module 308, where the un-identified element information 342 includes temporary identifiers for elements not identifiable from the formatted content 314 when compared to the element list 332.

The interpretation module 304 processes the identified element information 340 in accordance with interpretation rules 320 (e.g., potentially valid permutations of various combinations of identified elements), question information 346 (e.g., a question extracted from the IEI request to hundred 44 which may be paired with content associated with the question), and a groupings list 334 (e.g., representations of associated groups of representations of things, a set of element identifiers, valid element usage IDs in accordance with similar, an element context, permutations of sets of identifiers for possible interpretations of a sentence or other) to produce interpreted information 344. The interpreted information 344 includes potentially valid interpretations of combinations of identified elements. Generally, an embodiment of this invention presents solutions where the interpretation module 304 supports producing the interpreted information 344 by considering permutations of the identified element information 340 in accordance with the interpretation rules 320 and the groupings list 334.

The answer resolution module 306 processes the interpreted information 344 based on answer rules 322 (e.g., guidance to extract a desired answer), the question information 346, and inferred question information 352 (e.g., posed by the IEI control module or analysis of general collections of content or refinement of a stated question from a request) to produce preliminary answers 354 and an answer quality level 356. The answer generally lies in the interpreted information 344 as both new content received and knowledge based on groupings list 334 generated based on previously received content. The preliminary answers 354 includes an answer to a stated or inferred question that subject further refinement. The answer quality level 356 includes a determination of a quality level of the preliminary answers 354 based on the answer rules 322. The inferred question information 352 may further be associated with time information 348, where the time information includes one or more of current real-time, a time reference associated with entity submitting a request, and a time reference of a collections response.

When the IEI control module 308 determines that the answer quality level 356 is below an answer quality threshold level, the IEI control module 308 facilitates collecting of further content (e.g., by issuing a collections request 132 and receiving corresponding collections responses 134 for analysis). When the answer quality level 356 compares favorably to the answer quality threshold level, the IEI control module 308 issues an IEI response 246 based on the preliminary answers 354. When receiving training information 358, the IEI control module 308 facilitates updating of one or more of the lists 330 and the rules 316 and stores the updated list 330 and the updated rules 316 in the memories as updated stored data 360.

Figure 5F:
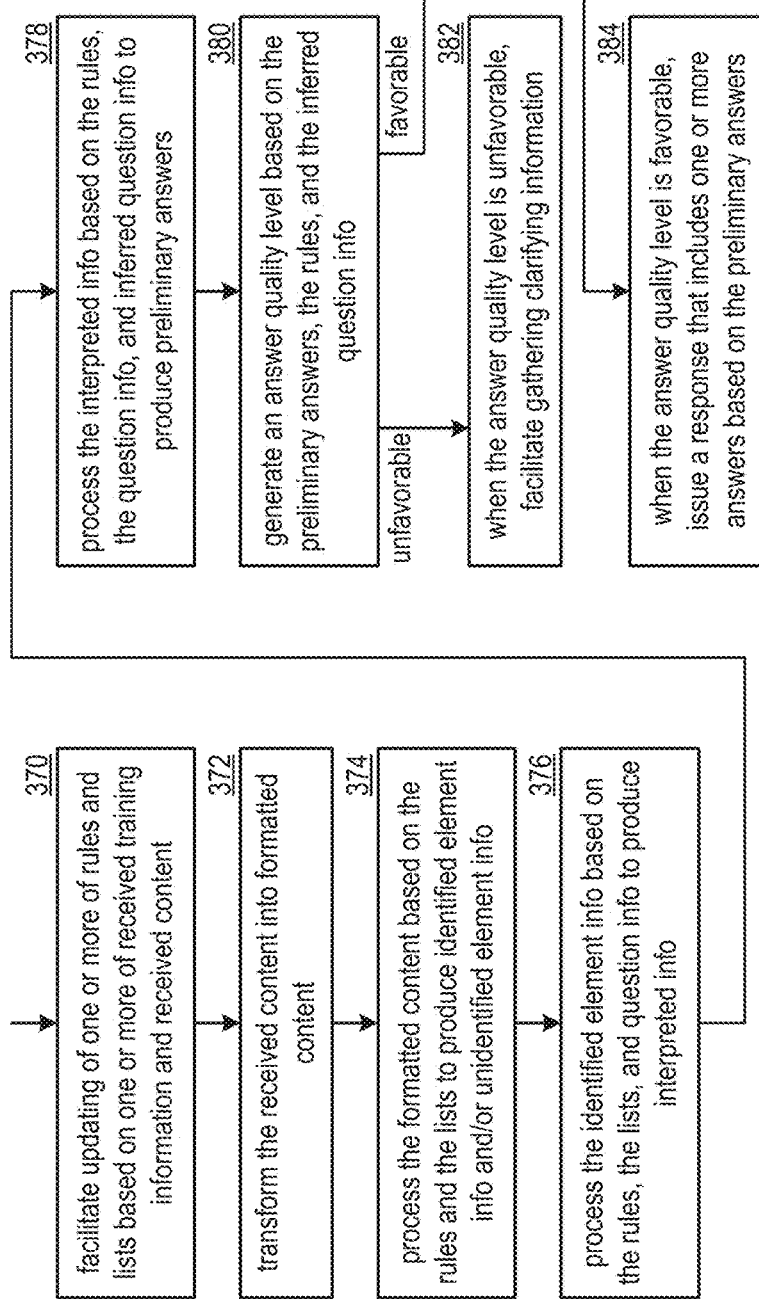
FIG. 5F is a logic diagram of an embodiment of a method for analyzing content within a computing system in accordance with the present invention.

FIG. 5F is a logic diagram of an embodiment of a method for analyzing content within a computing system. In particular, a method is presented for use in conjunction with one or more functions and features described in conjunction with FIGS. 1-3, 4A-4C, 5E, and also FIG. 5F. The method includes step 370 where a processing module of one or more processing modules of one or more computing devices of the computing system facilitates updating of one or more rules and lists based on one or more of received training information and received content. For example, the processing module updates rules with received rules to produce updated rules and updates element lists with received elements to produce updated element lists. As another example, the processing module interprets the received content to identify a new word for at least temporary inclusion in the updated element list.

The method continues at step 372 where the processing module transforms at least some of the received content into formatted content. For example, the processing module processes the received content in accordance with a transformation approach to produce the formatted content, where the formatted content supports compatibility with subsequent element identification (e.g., typical sentence structures of groups of words).

The method continues at step 374 where the processing module processes the formatted content based on the rules and the lists to produce identified element information and/or an identified element information. For example, the processing module compares the formatted content to element lists to identify a match producing identifiers for identified elements or new identifiers for unidentified elements when there is no match.

The method continues at step 376 with a processing module processes the identified element information based on rules, the lists, and question information to produce interpreted information. For example, the processing module compares the identified element information to associated groups of representations of things to generate potentially valid interpretations of combinations of identified elements.

The method continues at step 378 where the processing module processes the interpreted information based on the rules, the question information, and inferred question information to produce preliminary answers. For example, the processing module matches the interpreted information to one or more answers (e.g., embedded knowledge based on a fact base built from previously received content) with highest correctness likelihood levels that is subject to further refinement.

The method continues at step 380 where the processing module generates an answer quality level based on the preliminary answers, the rules, and the inferred question information. For example, the processing module predicts the answer correctness likelihood level based on the rules, the inferred question information, and the question information. The method branches to step 384 when the answer quality level is favorable and the method continues to step 382 when the answer quality level is unfavorable. For example, the generating of the answer quality level further includes the processing module indicating that the answer quality level is favorable when the answer quality level is greater than or equal to a minimum answer quality threshold level. As another example, the generating of the answer quality level further includes the processing module indicating that the answer quality level is unfavorable when the answer quality level is less than the minimum answer quality threshold level.

When the answer quality level is unfavorable, the method continues at step 382 where the processing module facilitates gathering clarifying information. For example, the processing module issues a collections request to facilitate receiving further content and or request question clarification from a question requester. When the answer quality level is favorable, the method continues at step 384 where the processing module issues a response that includes one or more answers based on the preliminary answers and/or further updated preliminary answers based on gathering further content. For example, the processing module generates a response that includes one or more answers and the answer quality level and issues the response to the requester.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6A:
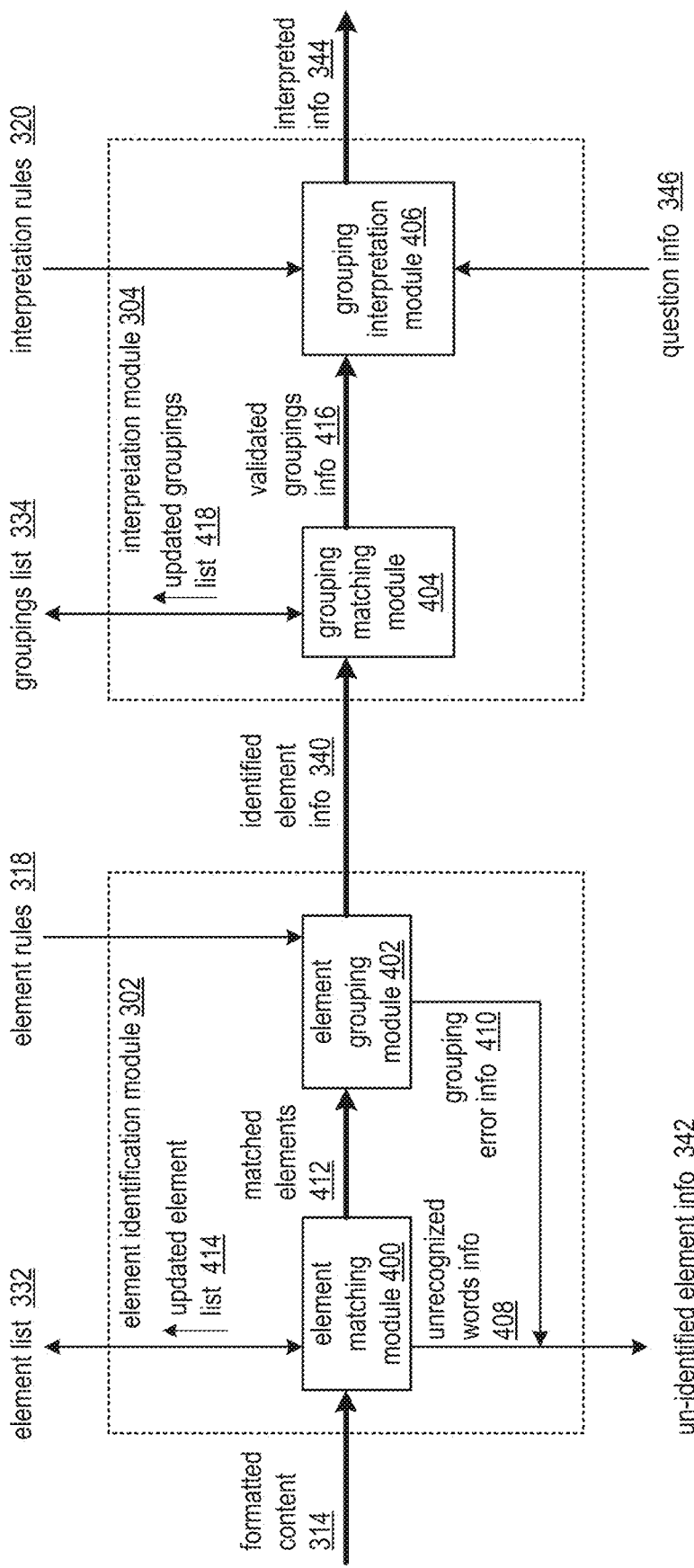
FIG. 6A is a schematic block diagram of an embodiment of an element identification module and an interpretation module of a computing system in accordance with the present invention.

FIG. 6A is a schematic block diagram of an embodiment of the element identification module 302 of FIG. 5A and the interpretation module 304 of FIG. 5A. The element identification module 302 includes an element matching module 400 and an element grouping module 402. The interpretation module 304 includes a grouping matching module 404 and a grouping interpretation module 406. Generally, an embodiment of this invention presents solutions where the element identification module 302 supports identifying potentially valid permutations of groupings of elements while the interpretation module 304 interprets the potentially valid permutations of groupings of elements to produce interpreted information that includes the most likely of groupings based on a question.

In an example of operation of the identifying of the potentially valid permutations of groupings of elements, when matching elements of the formatted content 314, the element matching module 400 generates matched elements 412 (e.g., identifiers of elements contained in the formatted content 314) based on the element list 332. For example, the element matching module 400 matches a received element to an element of the element list 332 and outputs the matched elements 412 to include an identifier of the matched element. When finding elements that are unidentified, the element matching module 400 outputs un-recognized words information 408 (e.g., words not in the element list 332, may temporarily add) as part of un-identified element information 342. For example, the element matching module 400 indicates that a match cannot be made between a received element of the formatted content 314, generates the unrecognized words info 408 to include the received element and/or a temporary identifier, and issues and updated element list 414 that includes the temporary identifier and the corresponding unidentified received element.

The element grouping module 402 analyzes the matched elements 412 in accordance with element rules 318 to produce grouping error information 410 (e.g., incorrect sentence structure indicators) when a structural error is detected. The element grouping module 402 produces identified element information 340 when favorable structure is associated with the matched elements in accordance with the element rules 318. The identified element information 340 may further include grouping information of the plurality of permutations of groups of elements (e.g., several possible interpretations), where the grouping information includes one or more groups of words forming an associated set and/or super-group set of two or more subsets when subsets share a common core element.

In an example of operation of the interpreting of the potentially valid permutations of groupings of elements to produce the interpreted information, the grouping matching module 404 analyzes the identified element information 340 in accordance with a groupings list 334 to produce validated groupings information 416. For example, the grouping matching module 404 compares a grouping aspect of the identified element information 340 (e.g., for each permutation of groups of elements of possible interpretations), generates the validated groupings information 416 to include identification of valid permutations aligned with the groupings list 334. Alternatively, or in addition to, the grouping matching module 404 generates an updated groupings list 418 when determining a new valid grouping (e.g., has favorable structure and interpreted meaning) that is to be added to the groupings list 334.

The grouping interpretation module 406 interprets the validated groupings information 416 based on the question information 346 and in accordance with the interpretation rules 320 to produce interpreted information 344 (e.g., most likely interpretations, next most likely interpretations, etc.). For example, the grouping interpretation module 406 obtains context, obtains favorable historical interpretations, processes the validated groupings based on interpretation rules 320, where each interpretation is associated with a correctness likelihood level.

Figure 6B:
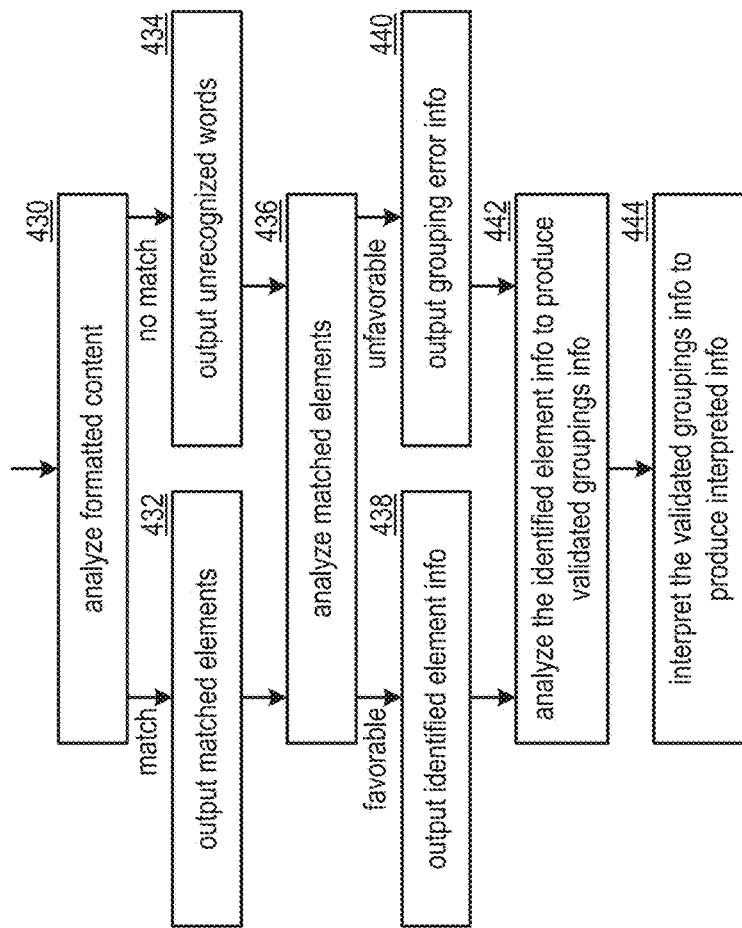
FIG. 6B is a logic diagram of an embodiment of a method for interpreting information within a computing system in accordance with the present invention.

FIG. 6B is a logic diagram of an embodiment of a method for interpreting information within a computing system. In particular, a method is presented for use in conjunction with one or more functions and features described in conjunction with FIGS. 1-3, 4A-4C, 5E-5F, 6A, and also FIG. 6B. The method includes step 430 where a processing module of one or more processing modules of one or more computing devices of the computing system analyzes formatted content. For example, the processing module attempt to match a received element of the formatted content to one or more elements of an elements list. When there is no match, the method branches to step 434 and when there is a match, the method continues to step 432. When there is a match, the method continues at step 432 where the processing module outputs matched elements (e.g., to include the matched element and/or an identifier of the matched element). When there is no match, the method continues at step 434 where the processing module outputs unrecognized words (e.g., elements and/or a temporary identifier for the unmatched element).

The method continues at step 436 where the processing module analyzes matched elements. For example, the processing module attempt to match a detected structure of the matched elements (e.g., chained elements as in a received sequence) to favorable structures in accordance with element rules. The method branches to step 440 when the analysis is unfavorable and the method continues to step 438 when the analysis is favorable. When the analysis is favorable matching a detected structure to the favorable structure of the element rules, the method continues at step 438 where the processing module outputs identified element information (e.g., an identifier of the favorable structure, identifiers of each of the detected elements). When the analysis is unfavorable matching a detected structure to the favorable structure of the element rules, the method continues at step 440 where the processing module outputs grouping error information (e.g., a representation of the incorrect structure, identifiers of the elements of the incorrect structure, a temporary new identifier of the incorrect structure).

The method continues at step 442 where the processing module analyzes the identified element information to produce validated groupings information. For example, the processing module compares a grouping aspect of the identified element information and generates the validated groupings information to include identification of valid permutations that align with the groupings list. Alternatively, or in addition to, the processing module generates an updated groupings list when determining a new valid grouping.

The method continues at step 444 where the processing module interprets the validated groupings information to produce interpreted information. For example, the processing module obtains one or more of context and historical interpretations and processes the validated groupings based on interpretation rules to generate the interpreted information, where each interpretation is associated with a correctness likelihood level (e.g., a quality level).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 6C:
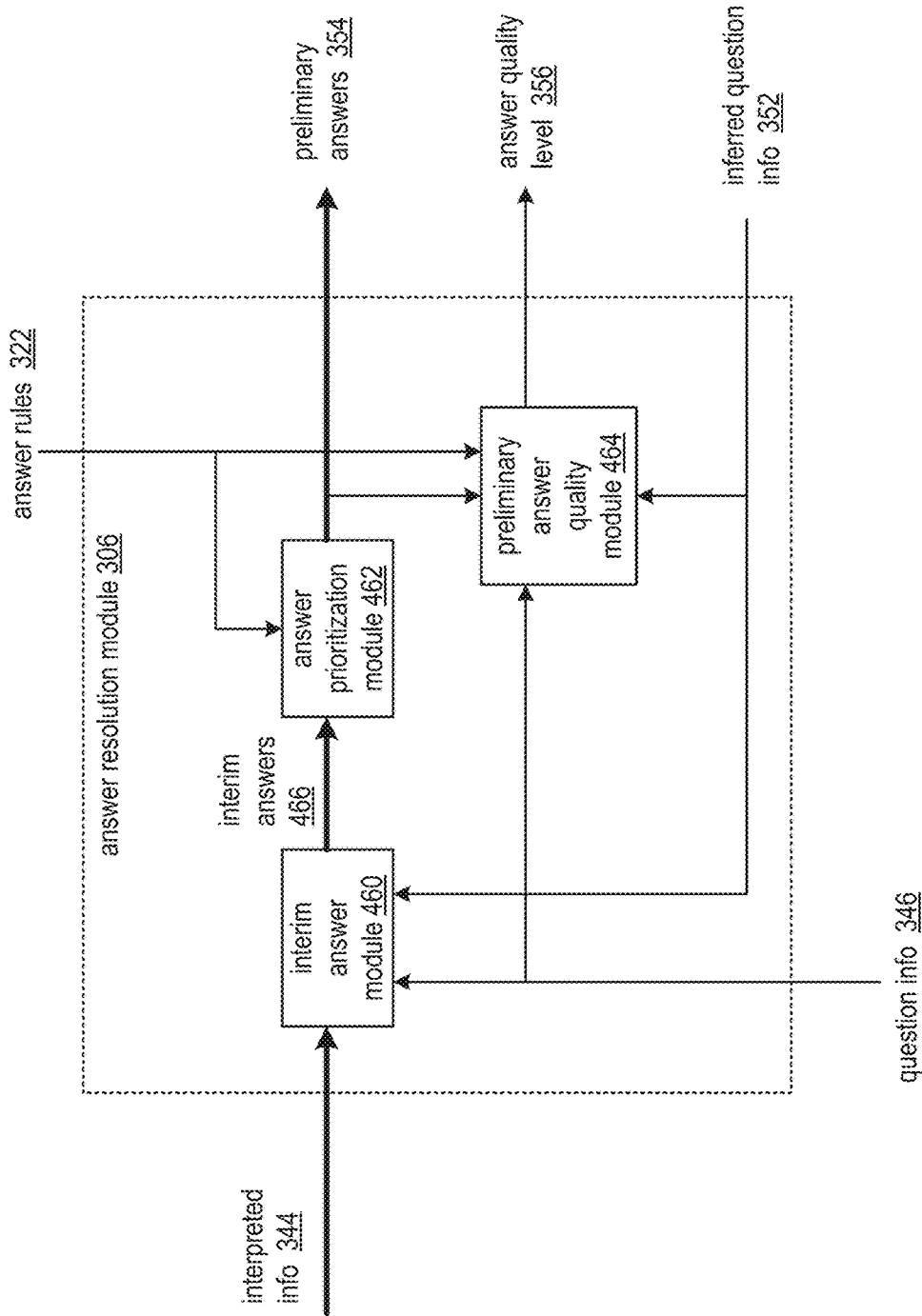
FIG. 6C is a schematic block diagram of an embodiment of an answer resolution module of a computing system in accordance with the present invention.

FIG. 6C is a schematic block diagram of an embodiment of the answer resolution module 306 of FIG. 5A that includes an interim answer module 460, and answer prioritization module 462, and a preliminary answer quality module 464. Generally, an embodiment of this invention presents solutions where the answer resolution module 306 supports producing an answer for interpreted information 344.

In an example of operation of the providing of the answer, the interim answer module 460 analyzes the interpreted information 344 based on question information 346 and inferred question information 352 to produce interim answers 466 (e.g., answers to stated and/or inferred questions without regard to rules that is subject to further refinement). The answer prioritization module 462 analyzes the interim answers 466 based on answer rules 322 to produce preliminary answer 354. For example, the answer prioritization module 462 identifies all possible answers from the interim answers 466 that conform to the answer rules 322.

The preliminary answer quality module 464 analyzes the preliminary answers 354 in accordance with the question information 346, the inferred question information 352, and the answer rules 322 to produce an answer quality level 356. For example, for each of the preliminary answers 354, the preliminary answer quality module 464 may compare a fit of the preliminary answer 354 to a corresponding previous answer and question quality level, calculate the answer quality level 356 based on a level of conformance to the answer rules 322, calculate the answer quality level 356 based on alignment with the inferred question information 352, and determine the answer quality level 356 based on an interpreted correlation with the question information 346.

Figure 6D:
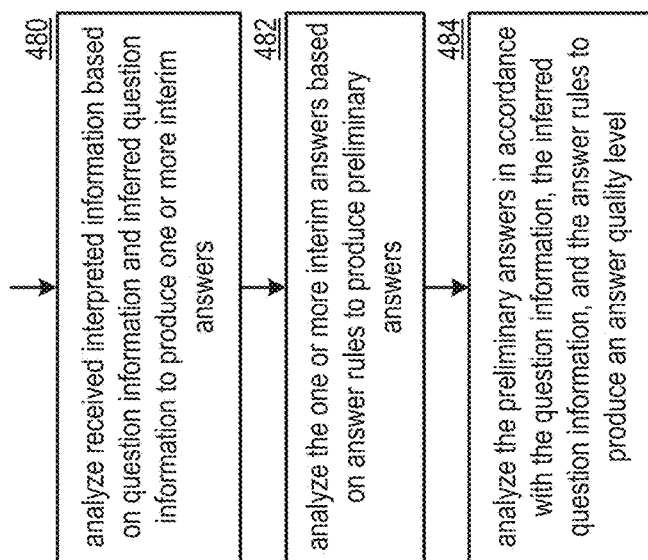
FIG. 6D is a logic diagram of an embodiment of a method for producing an answer within a computing system in accordance with the present invention.

FIG. 6D is a logic diagram of an embodiment of a method for producing an answer within a computing system. In particular, a method is presented for use in conjunction with one or more functions and features described in conjunction with FIGS. 1-3, 4A-4C, 5E-5F, 6C, and also FIG. 6D. The method includes step 480 where a processing module of one or more processing modules of one or more computing devices of the computing system analyzes received interpreted information based on question information and inferred question information to produce one or more interim answers. For example, the processing module generates potential answers based on patterns consistent with previously produced knowledge and likelihood of correctness.

The method continues at step 482 where the processing module analyzes the one or more interim answers based on answer rules to produce preliminary answers. For example, the processing module identifies all possible answers from the interim answers that conform to the answer rules. The method continues at step 484 where the processing module analyzes the preliminary answers in accordance with the question information, the inferred question information, and the answer rules to produce an answer quality level. For example, for each of the elementary answers, the processing module may compare a fit of the preliminary answer to a corresponding previous answer-and-answer quality level, calculate the answer quality level based on performance to the answer rules, calculate answer quality level based on alignment with the inferred question information, and determine the answer quality level based on interpreted correlation with the question information.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 7A:
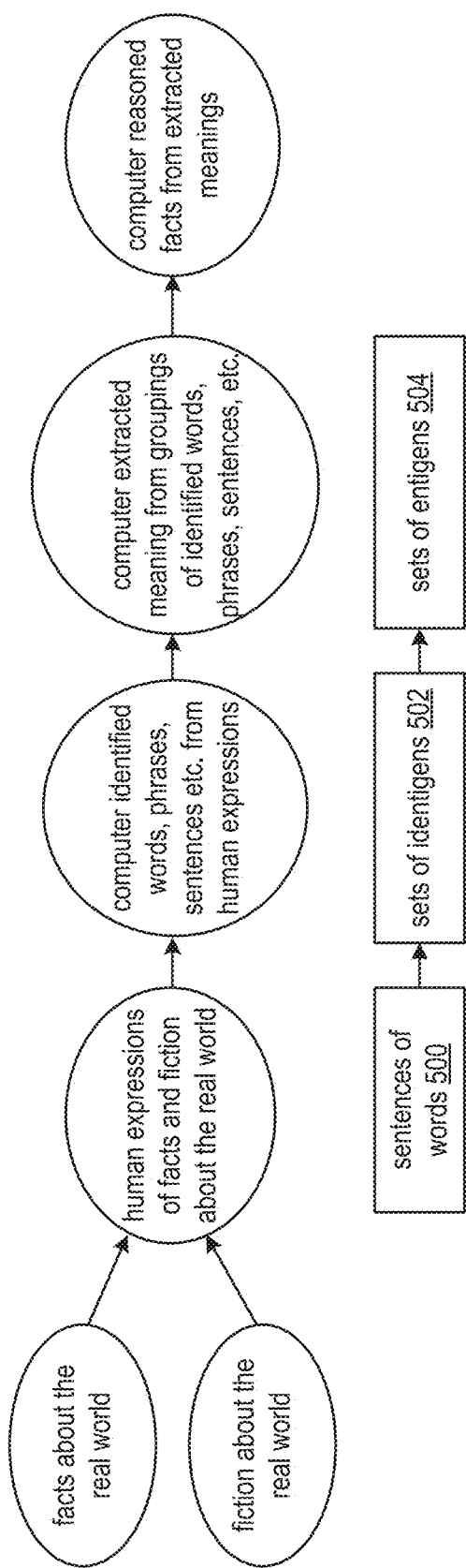
FIG. 7A is an information flow diagram for interpreting information within a computing system in accordance with the present invention.

FIG. 7A is an information flow diagram for interpreting information within a computing system, where sets of entigens 504 are interpreted from sets of identigens 502 which are interpreted from sentences of words 500. Such identigen entigen intelligence (IEI) processing of the words (e.g., to IEI process) includes producing one or more of interim knowledge, a preliminary answer, and an answer quality level. For example, the IEI processing includes identifying permutations of identigens of a phrase of a sentence (e.g., interpreting human expressions to produce identigen groupings for each word of ingested content), reducing the permutations of identigens (e.g., utilizing rules to eliminate unfavorable permutations), mapping the reduced permutations of identigens to at least one set of entigens (e.g., most likely identigens become the entigens) to produce the interim knowledge, processing the knowledge in accordance with a knowledge database (e.g., comparing the set of entigens to the knowledge database) to produce a preliminary answer, and generating the answer quality level based on the preliminary answer for a corresponding domain.

Human expressions are utilized to portray facts and fiction about the real world. The real-world includes items, actions, and attributes. The human expressions include textual words, textual symbols, images, and other sensorial information (e.g., sounds). It is known that many words, within a given language, can mean different things based on groupings and orderings of the words. For example, the sentences of words 500 can include many different forms of sentences that mean vastly different things even when the words are very similar.

The present invention presents solutions where the computing system 10 supports producing a computer-based representation of a truest meaning possible of the human expressions given the way that multitudes of human expressions relate to these meanings. As a first step of the flow diagram to transition from human representations of things to a most precise computer representation of the things, the computer identifies the words, phrases, sentences, etc. from the human expressions to produce the sets of identigens 502. Each identigen includes an identifier of their meaning and an identifier of an instance for each possible language, culture, etc. For example, the words car and automobile share a common meaning identifier but have different instance identifiers since they are different words and are spelled differently. As another example, the word duck is associated both with a bird and an action to elude even though they are spelled the same. In this example the bird duck has a different meaning than the elude duck and as such each has a different meaning identifier of the corresponding identigens.

As a second step of the flow diagram to transition from human representations of things to the most precise computer representation of the things, the computer extracts meaning from groupings of the identified words, phrases, sentences, etc. to produce the sets of entigens 504. Each entigen includes an identifier of a single conceivable and perceivable thing in space and time (e.g., independent of language and other aspects of the human expressions). For example, the words car and automobile are different instances of the same meaning and point to a common shared entigen. As another example, the word duck for the bird meaning has an associated unique entigen that is different than the entigen for the word duck for the elude meaning.

As a third step of the flow diagram to transition from human expressions of things to the most precise computer representation of the things, the computer reasons facts from the extracted meanings. For example, the computer maintains a fact-based of the valid meanings from the valid groupings or sets of entigens so as to support subsequent inferences, deductions, rationalizations of posed questions to produce answers that are aligned with a most factual view. As time goes on, and as an entigen has been identified, it can encounter an experience transformations in time, space, attributes, actions, and words which are used to identify it without creating contradictions or ever losing its identity.

Figure 7B:
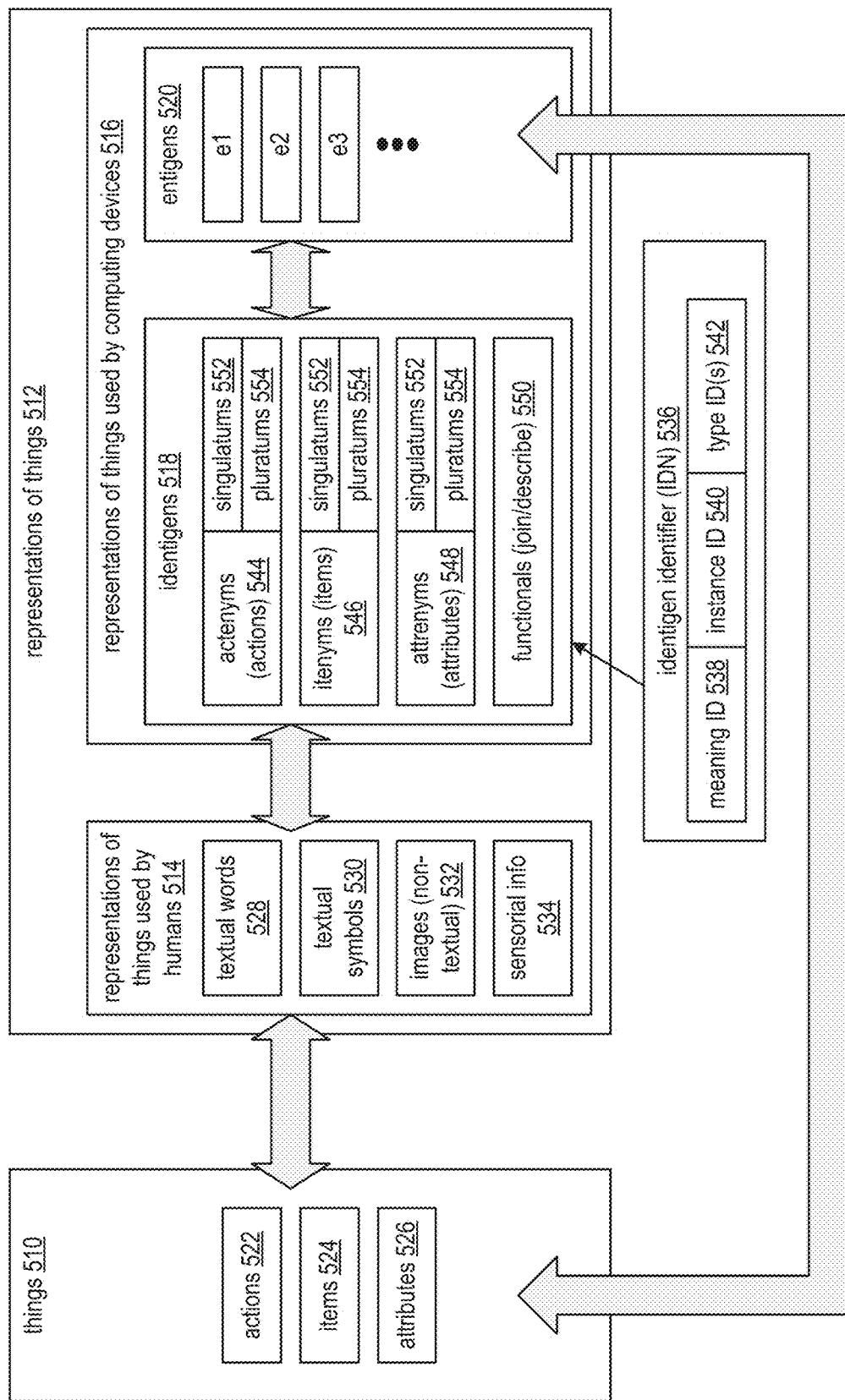
FIG. 7B is a relationship block diagram illustrating an embodiment of relationships between things and representations of things within a computing system in accordance with the present invention.

FIG. 7B is a relationship block diagram illustrating an embodiment of relationships between things 510 and representations of things 512 within a computing system. The things 510 includes conceivable and perceivable things including actions 522, items 524, and attributes 526. The representation of things 512 includes representations of things used by humans 514 and representation of things used by computing devices 516 of embodiments of the present invention. The things 510 relates to the representations of things used by humans 514 where the invention presents solutions where the computing system 10 supports mapping the representations of things used by humans 514 to the representations of things used by computing devices 516, where the representations of things used by computing devices 516 map back to the things 510.

The representations of things used by humans 514 includes textual words 528, textual symbols 530, images (e.g., non-textual) 532, and other sensorial information 534 (e.g., sounds, sensor data, electrical fields, voice inflections, emotion representations, facial expressions, whistles, etc.). The representations of things used by computing devices 516 includes identigens 518 and entigens 520. The representations of things used by humans 514 maps to the identigens 518 and the identigens 518 map to the entigens 520. The entigens 520 uniquely maps back to the things 510 in space and time, a truest meaning the computer is looking for to create knowledge and answer questions based on the knowledge.

To accommodate the mapping of the representations of things used by humans 514 to the identigens 518, the identigens 518 is partitioned into actenyms 544 (e.g., actions), itenyms 546 (e.g., items), attrenyms 548 (e.g., attributes), and functionals 550 (e.g., that join and/or describe). Each of the actenyms 544, itenyms 546, and attrenyms 548 may be further classified into singulatums 552 (e.g., identify one unique entigen) and pluratums 554 (e.g., identify a plurality of entigens that have similarities).

Each identigen 518 is associated with an identigens identifier (IDN) 536. The IDN 536 includes a meaning identifier (ID) 538 portion, an instance ID 540 portion, and a type ID 542 portion. The meaning ID 538 includes an identifier of common meaning. The instance ID 540 includes an identifier of a particular word and language. The type ID 542 includes one or more identifiers for actenyms, itenyms, attrenyms, singulatums, pluratums, a time reference, and any other reference to describe the IDN 536. The mapping of the representations of things used by humans 514 to the identigens 518 by the computing system of the present invention includes determining the identigens 518 in accordance with logic and instructions for forming groupings of words.

Generally, an embodiment of this invention presents solutions where the identigens 518 map to the entigens 520. Multiple identigens may map to a common unique entigen. The mapping of the identigens 518 to the entigens 520 by the computing system of the present invention includes determining entigens in accordance with logic and instructions for forming groupings of identigens.

FIG. 7C is a diagram of an embodiment of a synonym words table 570 within a computing system, where the synonym words table 570 includes multiple fields including textual words 572, identigens 518, and entigens 520. The identigens 518 includes fields for the meaning identifier (ID) 538 and the instance ID 540. The computing system of the present invention may utilize the synonym words table 570 to map textual words 572 to identigens 518 and map the identigens 518 to entigens 520. For example, the words car, automobile, auto, bil (Swedish), carro (Spanish), and bil (Danish) all share a common meaning but are different instances (e.g., different words and languages). The words map to a common meaning ID but to individual unique instant identifiers. Each of the different identigens map to a common entigen since they describe the same thing.

FIG. 7D is a diagram of an embodiment of a polysemous words table 576 within a computing system, where the polysemous words table 576 includes multiple fields including textual words 572, identigens 518, and entigens 520. The identigens 518 includes fields for the meaning identifier (ID) 538 and the instance ID 540. The computing system of the present invention may utilize the polysemous words table 576 to map textual words 572 to identigens 518 and map the identigens 518 to entigens 520. For example, the word duck maps to four different identigens since the word duck has four associated different meanings (e.g., bird, fabric, to submerge, to elude) and instances. Each of the identigens represent different things and hence map to four different entigens.

FIG. 7E is a diagram of an embodiment of transforming words into groupings within a computing system that includes a words table 580, a groupings of words section to validate permutations of groupings, and a groupings table 584 to capture the valid groupings. The words table 580 includes multiple fields including textual words 572, identigens 518, and entigens 520. The identigens 518 includes fields for the meaning identifier (ID) 538, the instance ID 540, and the type ID 542. The computing system of the present invention may utilize the words table 580 to map textual words 572 to identigens 518 and map the identigens 518 to entigens 520. For example, the word pilot may refer to a flyer and the action to fly. Each meaning has a different identigen and different entigen.

The computing system the present invention may apply rules to the fields of the words table 580 to validate various groupings of words. Those that are invalid are denoted with a "X" while those that are valid are associated with a check mark. For example, the grouping "pilot Tom" is invalid when the word pilot refers to flying and Tom refers to a person. The identigen combinations for the flying pilot and the person Tom are denoted as invalid by the rules. As another example, the grouping "pilot Tom" is valid when the word pilot refers to a flyer and Tom refers to the person. The identigen combinations for the flyer pilot and the person Tom are denoted as valid by the rules.

The groupings table 584 includes multiple fields including grouping ID 586, word strings 588, identigens 518, and entigens 520. The computing system of the present invention may produce the groupings table 584 as a stored fact base for valid and/or invalid groupings of words identified by their corresponding identigens. For example, the valid grouping "pilot Tom" referring to flyer Tom the person is represented with a grouping identifier of 3001 and identity and identifiers 150.001 and 457.001. The entigen field 520 may indicate associated entigens that correspond to the identigens. For example, entigen e717 corresponds to the flyer pilot meaning and entigen e61 corresponds to the time the person meaning. Alternatively, or in addition to, the entigen field 520 may be populated with a single entigen identifier (ENI).

The word strings field 588 may include any number of words in a string. Different ordering of the same words can produce multiple different strings and even different meanings and hence entigens. More broadly, each entry (e.g., role) of the groupings table 584 may refer to groupings of words, two or more word strings, an idiom, just identigens, just entigens, and/or any combination of the preceding elements. Each entry has a unique grouping identifier. An idiom may have a unique grouping ID and include identifiers of original word identigens and replacing identigens associated with the meaning of the idiom not just the meaning of the original words. Valid groupings may still have ambiguity on their own and may need more strings and/or context to select a best fit when interpreting a truest meaning of the grouping.

Figure 8A:
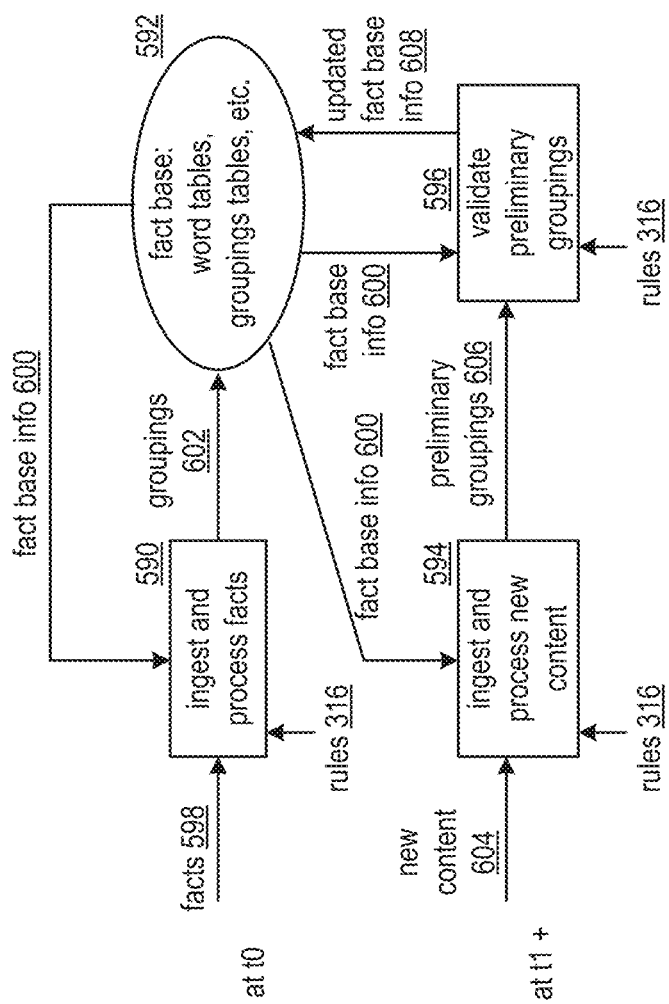
FIG. 8A is a data flow diagram for accumulating knowledge within a computing system in accordance with the present invention.

FIG. 8A is a data flow diagram for accumulating knowledge within a computing system, where a computing device, at a time=t0, ingests and processes facts 598 at a step 590 based on rules 316 and fact base information 600 to produce groupings 602 for storage in a fact base 592 (e.g., words, phrases, word groupings, identigens, entigens, quality levels). The facts 598 may include information from books, archive data, Central intelligence agency (CIA) world fact book, trusted content, etc. The ingesting may include filtering to organize and promote better valid groupings detection (e.g., considering similar domains together). The groupings 602 includes one or more of groupings identifiers, identigen identifiers, entigen identifiers, and estimated fit quality levels. The processing step 590 may include identifying identigens from words of the facts 598 in accordance with the rules 316 and the fact base info 600 and identifying groupings utilizing identigens in accordance with rules 316 and fact base info 600.

Subsequent to ingestion and processing of the facts 598 to establish the fact base 592, at a time=t1+, the computing device ingests and processes new content 604 at a step 594 in accordance with the rules 316 and the fact base information 600 to produce preliminary grouping 606. The new content may include updated content (e.g., timewise) from periodicals, newsfeeds, social media, etc. The preliminary grouping 606 includes one or more of preliminary groupings identifiers, preliminary identigen identifiers, preliminary entigen identifiers, estimated fit quality levels, and representations of unidentified words.

The computing device validates the preliminary groupings 606 at a step 596 based on the rules 316 and the fact base info 600 to produce updated fact base info 608 for storage in the fact base 592. The validating includes one or more of reasoning a fit of existing fact base info 600 with the new preliminary grouping 606, discarding preliminary groupings, updating just time frame information associated with an entry of the existing fact base info 600 (e.g., to validate knowledge for the present), creating new entigens, and creating a median entigen to summarize portions of knowledge within a median indicator as a quality level indicator (e.g., suggestive not certain).

Storage of the updated fact base information 608 captures patterns that develop by themselves instead of searching for patterns as in prior art artificial intelligence systems. Growth of the fact base 592 enables subsequent reasoning to create new knowledge including deduction, induction, inference, and inferential sentiment (e.g., a chain of sentiment sentences). Examples of sentiments includes emotion, beliefs, convictions, feelings, judgments, notions, opinions, and views.

FIG. 8B is a diagram of an embodiment of a groupings table 620 within a computing system. The groupings table 620 includes multiple fields including grouping ID 586, word strings 588, an IF string 622 and a THEN string 624. Each of the fields for the IF string 622 and the THEN string 624 includes fields for an identigen (IDN) string 626, and an entigen (ENI) string 628. The computing system of the present invention may produce the groupings table 620 as a stored fact base to enable IF THEN based inference to generate a new knowledge inference 630.

As a specific example, grouping 5493 points out the logic of IF someone has a tumor, THEN someone is sick and the grouping 5494 points of the logic that IF someone is sick, THEN someone is sad. As a result of utilizing inference, the new knowledge inference 630 may produce grouping 5495 where IF someone has a tumor, THEN someone is possibly sad (e.g., is sad).

Figure 8C:
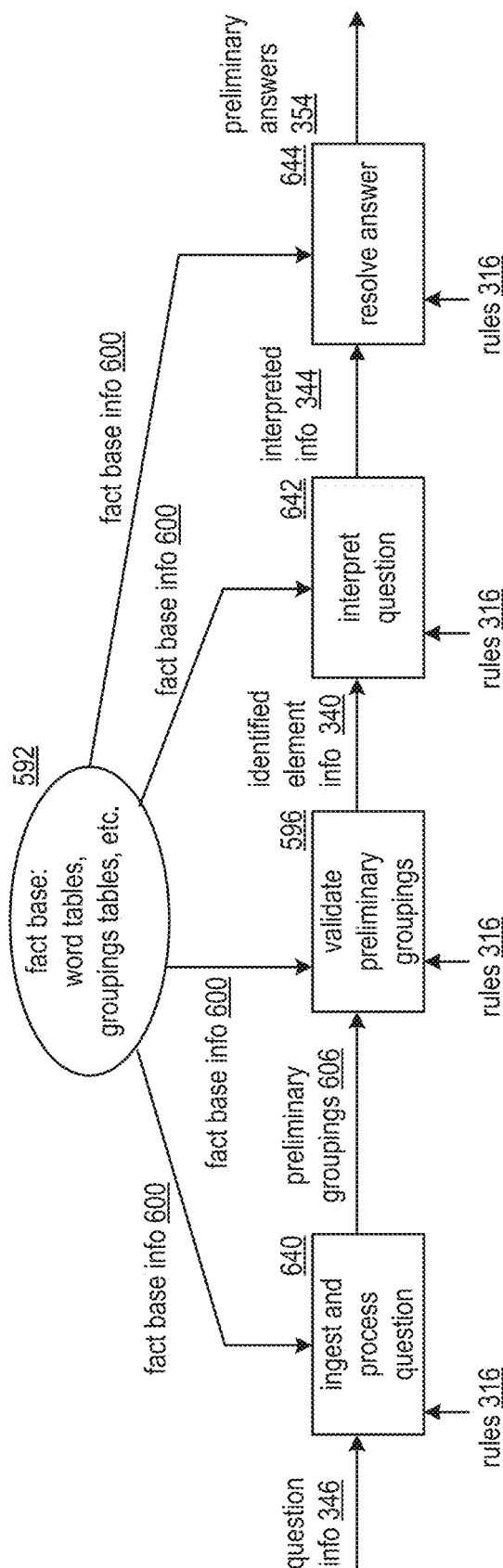
FIG. 8C is a data flow diagram for answering questions utilizing accumulated knowledge within a computing system in accordance with the present invention.

FIG. 8C is a data flow diagram for answering questions utilizing accumulated knowledge within a computing system, where a computing device ingests and processes question information 346 at a step 640 based on rules 316 and fact base info 600 from a fact base 592 to produce preliminary grouping 606. The ingesting and processing questions step 640 includes identifying identigens from words of a question in accordance with the rules 316 and the fact base information 600 and may also include identifying groupings from the identified identigens in accordance with the rules 316 and the fact base information 600.

The computing device validates the preliminary grouping 606 at a step 596 based on the rules 316 and the fact base information 600 to produce identified element information 340. For example, the computing device reasons fit of existing fact base information with new preliminary groupings 606 to produce the identified element information 340 associated with highest quality levels. The computing device interprets a question of the identified element information 340 at a step 642 based on the rules 316 and the fact base information 600. The interpreting of the question may include separating new content from the question and reducing the question based on the fact base information 600 and the new content.

The computing device produces preliminary answers 354 from the interpreted information 344 at a resolve answer step 644 based on the rules 316 and the fact base information 600. For example, the computing device compares the interpreted information 344 two the fact base information 600 to produce the preliminary answers 354 with highest quality levels utilizing one or more of deduction, induction, inferencing, and applying inferential sentiments logic. Alternatively, or in addition to, the computing device may save new knowledge identified from the question information 346 to update the fact base 592.

Figure 8D:
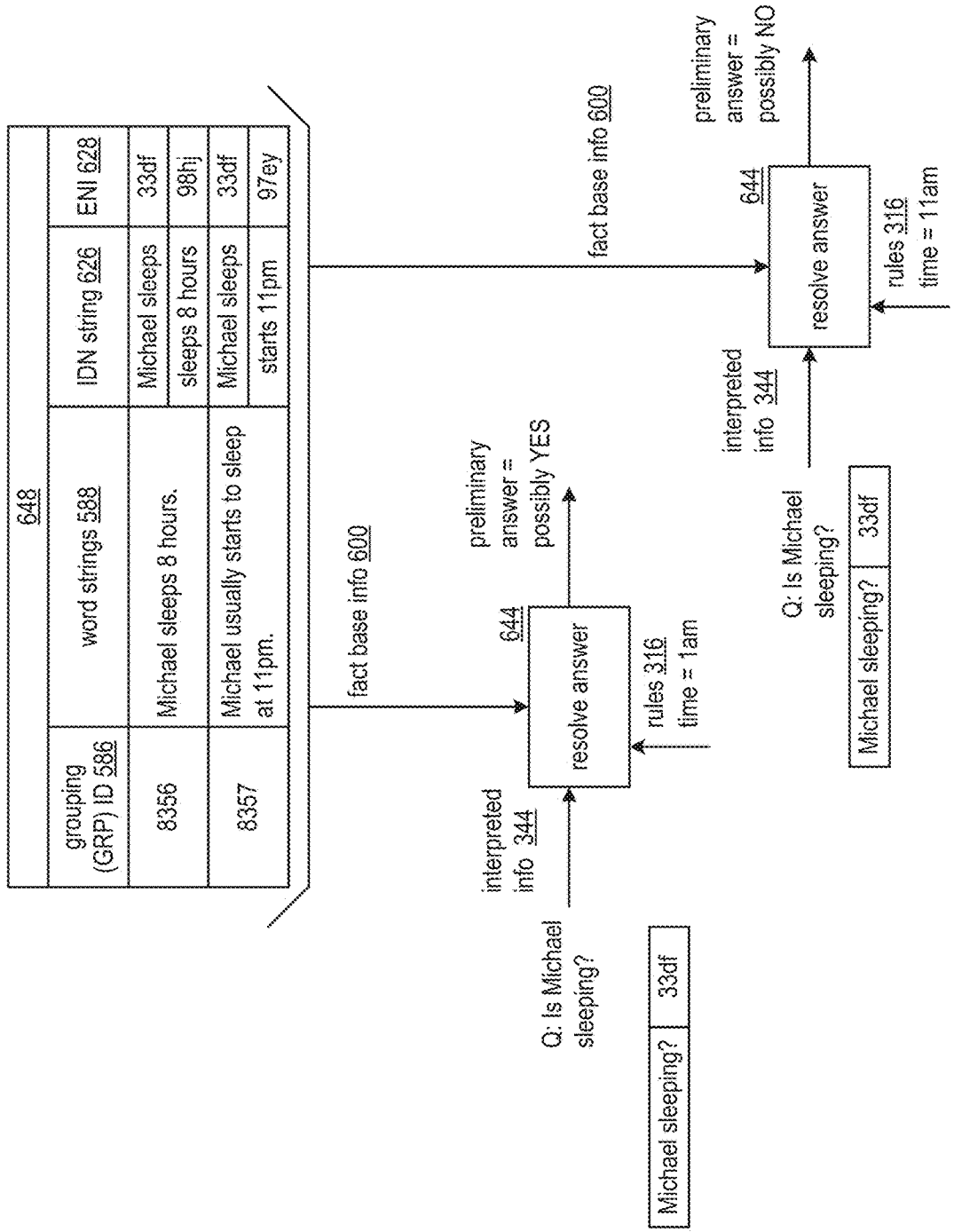
FIG. 8D is a data flow diagram for answering questions utilizing interference within a computing system in accordance with the present invention.

FIG. 8D is a data flow diagram for answering questions utilizing interference within a computing system that includes a groupings table 648 and the resolve answer step 644 of FIG. 8C. The groupings table 648 includes multiple fields including fields for a grouping (GRP) identifier (ID) 586, word strings 588, an identigen (IDN) string 626, and an entigen (ENI) 628. The groupings table 648 may be utilized to build a fact base to enable resolving a future question into an answer. For example, the grouping 8356 notes knowledge that Michael sleeps eight hours and grouping 8357 notes that Michael usually starts to sleep at 11 PM.

In a first question example that includes a question "Michael sleeping?", the resolve answer step 644 analyzes the question from the interpreted information 344 in accordance with the fact base information 600, the rules 316, and a real-time indicator that the current time is 1 AM to produce a preliminary answer of "possibly YES" when inferring that Michael is probably sleeping at 1 AM when Michael usually starts sleeping at 11 PM and Michael usually sleeps for a duration of eight hours.

In a second question example that includes the question "Michael sleeping?", the resolve answer step 644 analyzes the question from the interpreted information 344 in accordance with the fact base information 600, the rules 316, and a real-time indicator that the current time is now 11 AM to produce a preliminary answer of "possibly NO" when inferring that Michael is probably not sleeping at 11 AM when Michael usually starts sleeping at 11 PM and Michael usually sleeps for a duration of eight hours.

Figure 8E:
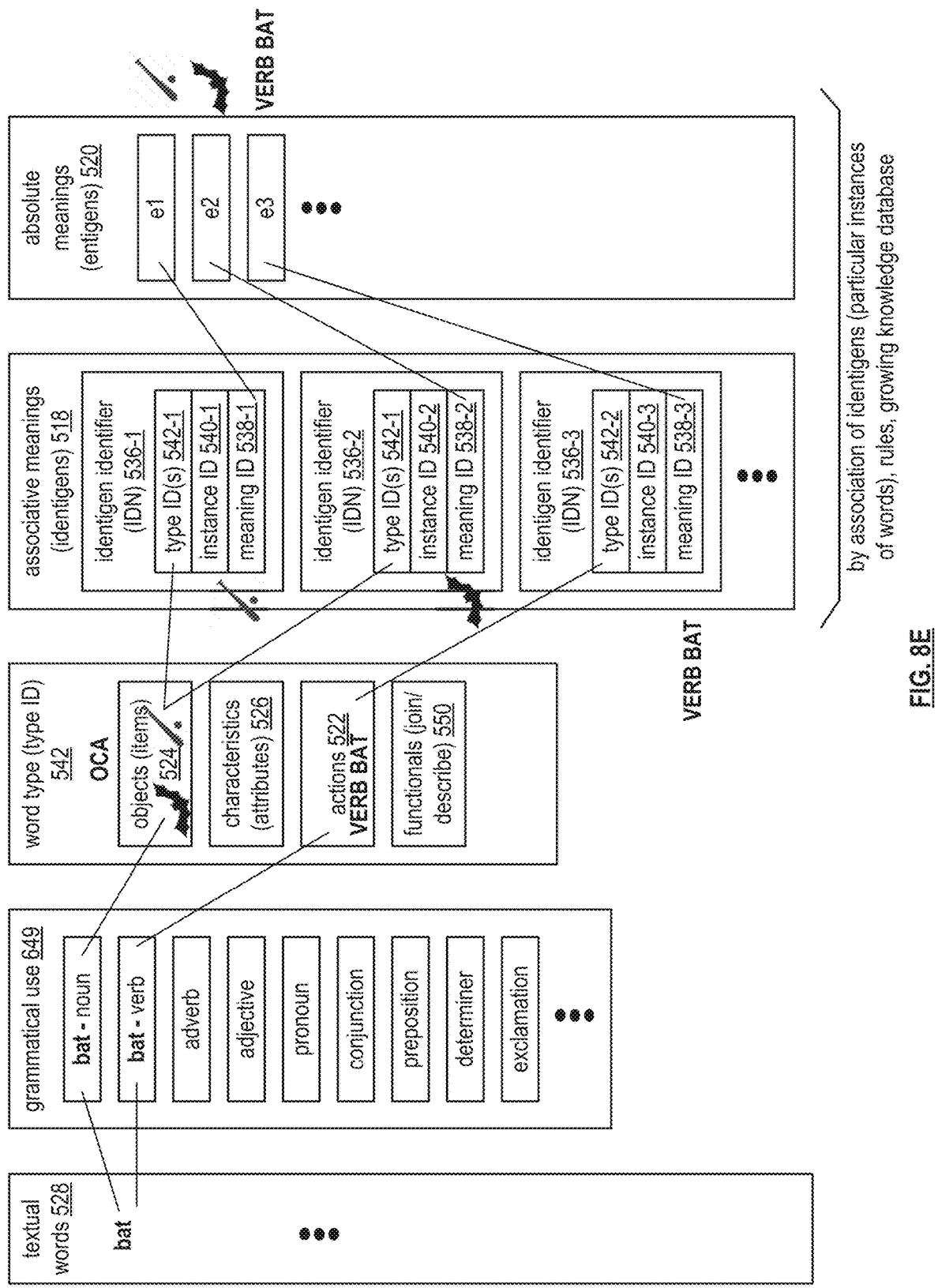
FIG. 8E is a relationship block diagram illustrating another embodiment of relationships between things and representations of things within a computing system in accordance with the present invention.

FIG. 8E is a relationship block diagram illustrating another embodiment of relationships between things and representations of things within a computing system. While things in the real world are described with words, it is often the case that a particular word has multiple meanings in isolation. Interpreting the meaning of the particular word may hinge on analyzing how the word is utilized in a phrase, a sentence, multiple sentences, paragraphs, and even whole documents or more. Describing and stratifying the use of words, word types, and possible meanings help in interpreting a true meaning.

Humans utilize textual words 528 to represent things in the real world. Quite often a particular word has multiple instances of different grammatical use when part of a phrase of one or more sentences. The grammatical use 649 of words includes the nouns and the verbs, and also includes adverbs, adjectives, pronouns, conjunctions, prepositions, determiners, exclamations, etc.

As an example of multiple grammatical use, the word "bat" in the English language can be utilized as a noun or a verb. For instance, when utilized as a noun, the word "bat" may apply to a baseball bat or may apply to a flying "bat." As another instance, when utilized as a verb, the word "bat" may apply to the action of hitting or batting an object, i.e., "bat the ball."

To stratify word types by use, the words are associated with a word type (e.g., type identifier 542). The word types include objects (e.g., items 524), characteristics (e.g., attributes 526), actions 522, and the functionals 550 for joining other words and describing words. For example, when the word "bat" is utilized as a noun, the word is describing the object of either the baseball bat or the flying bat. As another example, when the word "bat" is utilized as a verb, the word is describing the action of hitting.

To determine possible meanings, the words, by word type, are mapped to associative meanings (e.g., identigens 518). For each possible associative meaning, the word type is documented with the meaning and further with an identifier (ID) of the instance (e.g., an identigen identifier).

For the example of the word "bat" when utilized as a noun for the baseball bat, a first identigen identifier 536-1 includes a type ID 542-1 associated with the object 524, an instance ID 540-1 associated with the first identigen identifier (e.g., unique for the baseball bat), and a meaning ID 538-1 associated with the baseball bat.

For the example of the word "bat" when utilized as a noun for the flying bat, a second identigen identifier 536-2 includes a type ID 542-1 associated with the object 524, an instance ID 540-2 associated with the second identigen identifier (e.g., unique for the flying bat), and a meaning ID 538-2 associated with the flying bat. For the example of the word "bat" when utilized as a verb for the bat that hits, a third identigen identifier 536-2 includes a type ID 542-2 associated with the actions 522, an instance ID 540-3 associated with the third identigen identifier (e.g., unique for the bat that hits), and a meaning ID 538-3 associated with the bat that hits.

With the word described by a type and possible associative meanings, a combination of full grammatical use of the word within the phrase etc., application of rules, and utilization of an ever-growing knowledge database that represents knowledge by linked entigens, the absolute meaning (e.g., entigen 520) of the word is represented as a unique entigen. For example, a first entigen e1 represents the absolute meaning of a baseball bat (e.g., a generic baseball bat not a particular baseball bat that belongs to anyone), a second entigen e2 represents the absolute meaning of the flying bat (e.g., a generic flying bat not a particular flying bat), and a third entigen e3 represents the absolute meaning of the verb bat (e.g., to hit).

An embodiment of methods to ingest text to produce absolute meanings for storage in a knowledge database are discussed in greater detail with reference to FIGS. 8F-H. Those embodiments further discuss the discerning of the grammatical use, the use of the rules, and the utilization of the knowledge database to definitively interpret the absolute meaning of a string of words.

Another embodiment of methods to respond to a query to produce an answer based on knowledge stored in the knowledge database are discussed in greater detail with reference to FIGS. 8J-L. Those embodiments further discuss the discerning of the grammatical use, the use of the rules, and the utilization of the knowledge database to interpret the query. The query interpretation is utilized to extract the answer from the knowledge database to facilitate forming the query response.

Figure 8F:
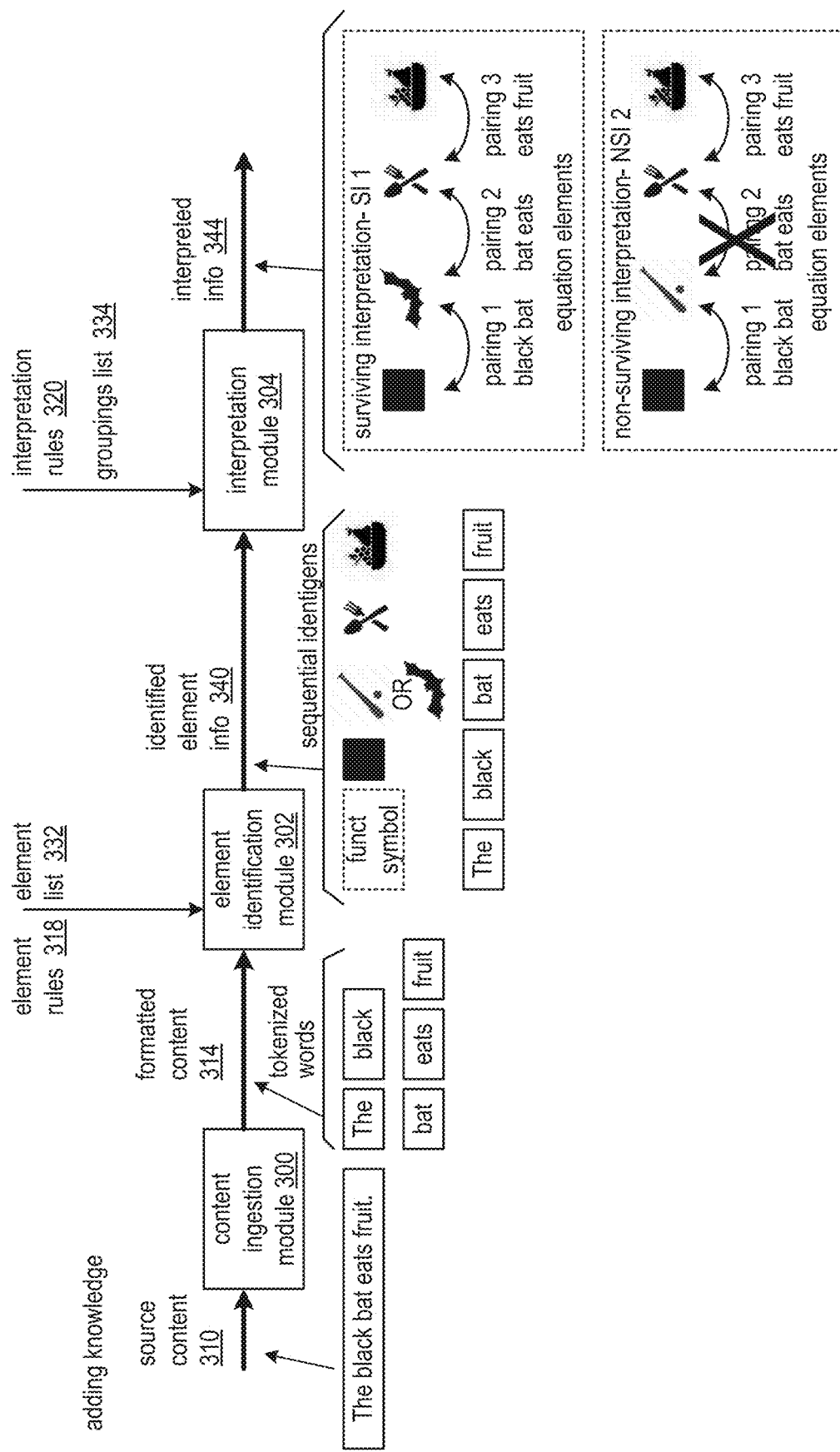
FIGS. 8F and 8G are schematic block diagrams of another embodiment of a computing system in accordance with the present invention.
Figure 8G:
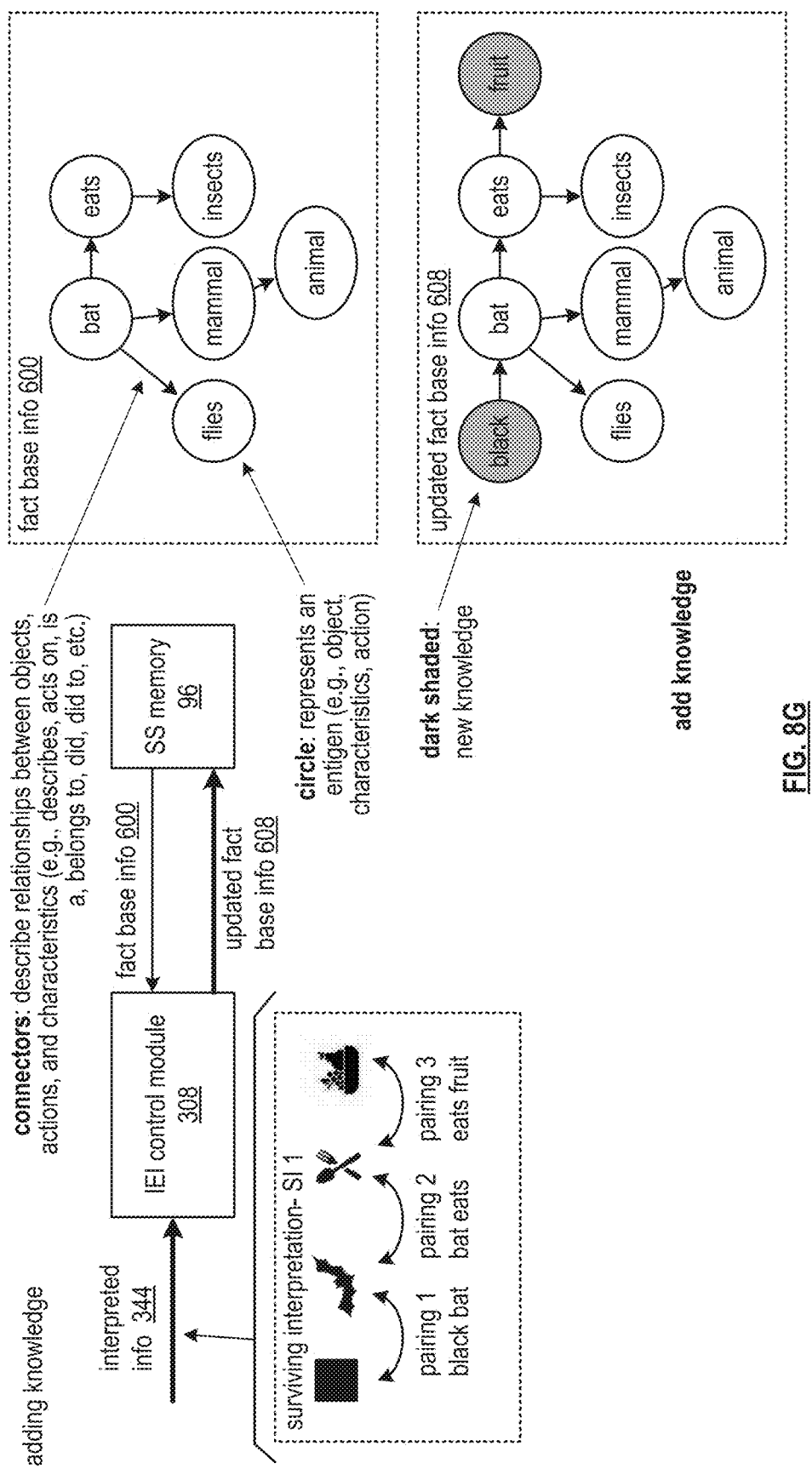

FIGS. 8F and 8G are schematic block diagrams of another embodiment of a computing system that includes the content ingestion module 300 of FIG. 5E, the element identification module 302 of FIG. 5E, the interpretation module 304 of FIG. 5E, the IEI control module 308 of FIG. 5E, and the SS memory 96 of FIG. 2. Generally, an embodiment of this invention provides presents solutions where the computing system supports processing content to produce knowledge for storage in a knowledge database.

The processing of the content to produce the knowledge includes a series of steps. For example, a first step includes identifying words of an ingested phrase to produce tokenized words. As depicted in FIG. 8F, a specific example of the first step includes the content ingestion module 300 comparing words of source content 310 to dictionary entries to produce formatted content 314 that includes identifiers of known words. Alternatively, when a comparison is unfavorable, the temporary identifier may be assigned to an unknown word. For instance, the content ingestion module 300 produces identifiers associated with the words "the", "black", "bat", "eats", and "fruit" when the ingested phrase includes "The black bat eats fruit", and generates the formatted content 314 to include the identifiers of the words.

A second step of the processing of the content to produce the knowledge includes, for each tokenized word, identifying one or more identigens that correspond the tokenized word, where each identigen describes one of an object, a characteristic, and an action. As depicted in FIG. 8F, a specific example of the second step includes the element identification module 302 performing a look up of identigen identifiers, utilizing an element list 332 and in accordance with element rules 318, of the one or more identigens associated with each tokenized word of the formatted content 314 to produce identified element information 340.

A unique identifier is associated with each of the potential object, the characteristic, and the action (OCA) associated with the tokenized word (e.g. sequential identigens). For instance, the element identification module 302 identifies a functional symbol for "the", identifies a single identigen for "black", identifies two identigens for "bat" (e.g., baseball bat and flying bat), identifies a single identigen for "eats", and identifies a single identigen for "fruit." When at least one tokenized word is associated with multiple identigens, two or more permutations of sequential combinations of identigens for each tokenized word result. For example, when "bat" is associated with two identigens, two permutations of sequential combinations of identigens result for the ingested phrase.

A third step of the processing of the content to produce the knowledge includes, for each permutation of sequential combinations of identigens, generating a corresponding equation package (i.e., candidate interpretation), where the equation package includes a sequential linking of pairs of identigens (e.g., relationships), where each sequential linking pairs a preceding identigen to a next identigen, and where an equation element describes a relationship between paired identigens (OCAs) such as describes, acts on, is a, belongs to, did, did to, etc. Multiple OCAs occur for a common word when the word has multiple potential meanings (e.g., a baseball bat, a flying bat).

As depicted in FIG. 8F, a specific example of the third step includes the interpretation module 304, for each permutation of identigens of each tokenized word of the identified element information 340, the interpretation module 304 generates, in accordance with interpretation rules 320 and a groupings list 334, an equation package to include one or more of the identifiers of the tokenized words, a list of identifiers of the identigens of the equation package, a list of pairing identifiers for sequential pairs of identigens, and a quality metric associated with each sequential pair of identigens (e.g., likelihood of a proper interpretation). For instance, the interpretation module 304 produces a first equation package that includes a first identigen pairing of a black bat (e.g., flying bat with a higher quality metric level), the second pairing of bat eats (e.g., the flying bat eats, with a higher quality metric level), and a third pairing of eats fruit, and the interpretation module 304 produces a second equation package that includes a first pairing of a black bat (e.g., baseball bat, with a neutral quality metric level), the second pairing of bat eats (e.g., the baseball bat eats, with a lower quality metric level), and a third pairing of eats fruit.

A fourth step of the processing of the content to produce the knowledge includes selecting a surviving equation package associated with a most favorable confidence level. As depicted in FIG. 8F, a specific example of the fourth step includes the interpretation module 304 applying interpretation rules 320 (i.e., inference, pragmatic engine, utilizing the identifiers of the identigens to match against known valid combinations of identifiers of entigens) to reduce a number of permutations of the sequential combinations of identigens to produce interpreted information 344 that includes identification of at least one equation package as a surviving interpretation SI (e.g., higher quality metric level).

Non-surviving equation packages are eliminated that compare unfavorably to pairing rules and/or are associated with an unfavorable quality metric levels to produce a non-surviving interpretation NSI 2 (e.g., lower quality metric level), where an overall quality metric level may be assigned to each equation package based on quality metric levels of each pairing, such that a higher quality metric level of an equation package indicates a higher probability of a most favorable interpretation. For instance, the interpretation module 304 eliminates the equation package that includes the second pairing indicating that the "baseball bat eats" which is inconsistent with a desired quality metric level of one or more of the groupings list 334 and the interpretation rules 320 and selects the equation package associated with the "flying bat eats" which is favorably consistent with the one or more of the quality metric levels of the groupings list 334 and the interpretation rules 320.

A fifth step of the processing of the content to produce the knowledge utilizing the confidence level includes integrating knowledge of the surviving equation package into a knowledge database. For example, integrating at least a portion of the reduced OCA combinations into a graphical database to produce updated knowledge. As another example, the portion of the reduced OCA combinations may be translated into rows and columns entries when utilizing a rows and columns database rather than a graphical database. When utilizing the rows and columns approach for the knowledge database, subsequent access to the knowledge database may utilize structured query language (SQL) queries.

As depicted in FIG. 8G, a specific example of the fifth step includes the IEI control module 308 recovering fact base information 600 from SS memory 96 to identify a portion of the knowledge database for potential modification utilizing the OCAs of the surviving interpretation SI 1 (i.e., compare a pattern of relationships between the OCAs of the surviving interpretation SI 1 from the interpreted information 344 to relationships of OCAs of the portion of the knowledge database including potentially new quality metric levels).

The fifth step further includes determining modifications (e.g., additions, subtractions, further clarifications required when information is complex, etc.) to the portion of the knowledge database based on the new quality metric levels. For instance, the IEI control module 308 causes adding the element "black" as a "describes" relationship of an existing bat OCA and adding the element "fruit" as an eats "does to" relationship to implement the modifications to the portion of the fact base information 600 to produce updated fact base information 608 for storage in the SS memory 96.

Figure 8H:
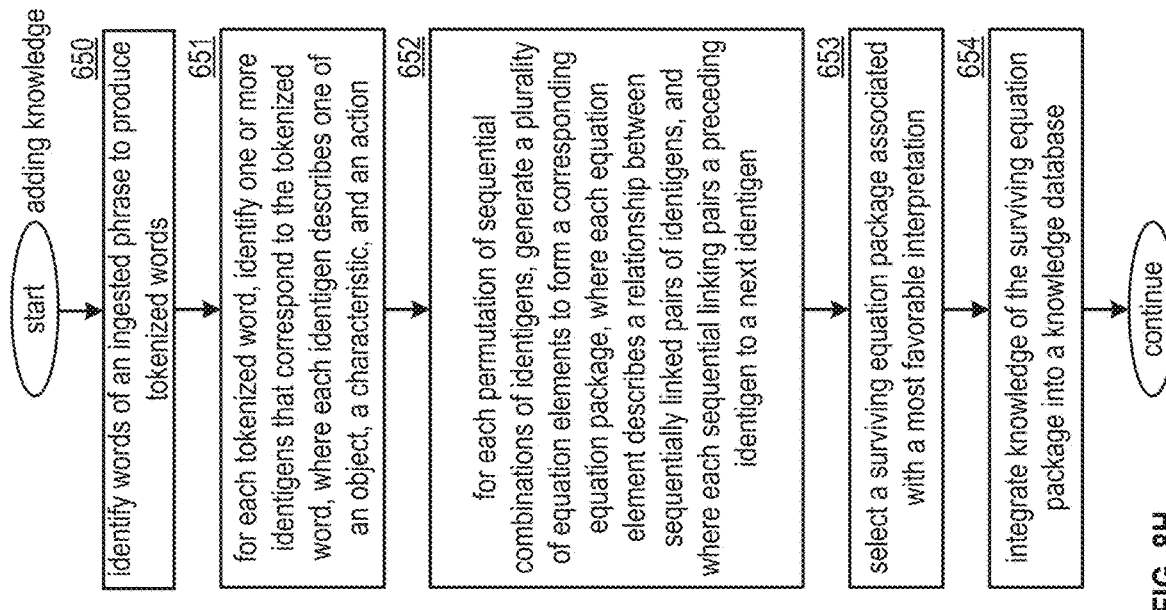
FIG. 8H is a logic diagram of an embodiment of a method for processing content to produce knowledge within a computing system in accordance with the present invention.

FIG. 8H is a logic diagram of an embodiment of a method for processing content to produce knowledge for storage within a computing system. In particular, a method is presented for use in conjunction with one or more functions and features described in conjunction with FIGS. 1-8E, 8F, and also FIG. 8G. The method includes step 650 where a processing module of one or more processing modules of one or more computing devices of the computing system identifies words of an ingested phrase to produce tokenized words. The identified includes comparing words to known words of dictionary entries to produce identifiers of known words.

For each tokenized word, the method continues at step 651 where the processing module identifies one or more identigens that corresponds to the tokenized word, where each identigen describes one of an object, a characteristic, and an action (e.g., OCA). The identifying includes performing a lookup of identifiers of the one or more identigens associated with each tokenized word, where he different identifiers associated with each of the potential object, the characteristic, and the action associated with the tokenized word.

The method continues at step 652 where the processing module, for each permutation of sequential combinations of identigens, generates a plurality of equation elements to form a corresponding equation package, where each equation element describes a relationship between sequentially linked pairs of identigens, where each sequential linking pairs a preceding identigen to a next identigen. For example, for each permutation of identigens of each tokenized word, the processing module generates the equation package to include a plurality of equation elements, where each equation element describes the relationship (e.g., describes, acts on, is a, belongs to, did, did too, etc.) between sequentially adjacent identigens of a plurality of sequential combinations of identigens. Each equation element may be further associated with a quality metric to evaluate a favorability level of an interpretation in light of the sequence of identigens of the equation package.

The method continues at step 653 where the processing module selects a surviving equation package associated with most favorable interpretation. For example, the processing module applies rules (i.e., inference, pragmatic engine, utilizing the identifiers of the identigens to match against known valid combinations of identifiers of entigens), to reduce the number of permutations of the sequential combinations of identigens to identify at least one equation package, where non-surviving equation packages are eliminated the compare unfavorably to pairing rules and/or are associated with an unfavorable quality metric levels to produce a non-surviving interpretation, where an overall quality metric level is assigned to each equation package based on quality metric levels of each pairing, such that a higher quality metric level indicates an equation package with a higher probability of favorability of correctness.

The method continues at step 654 where the processing module integrates knowledge of the surviving equation package into a knowledge database. For example, the processing module integrates at least a portion of the reduced OCA combinations into a graphical database to produce updated knowledge. The integrating may include recovering fact base information from storage of the knowledge database to identify a portion of the knowledge database for potential modifications utilizing the OCAs of the surviving equation package (i.e., compare a pattern of relationships between the OCAs of the surviving equation package to relationships of the OCAs of the portion of the knowledge database including potentially new quality metric levels). The integrating further includes determining modifications (e.g., additions, subtractions, further clarifications required when complex information is presented, etc.) to produce the updated knowledge database that is based on fit of acceptable quality metric levels, and implementing the modifications to the portion of the fact base information to produce the updated fact base information for storage in the portion of the knowledge database.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 8J:
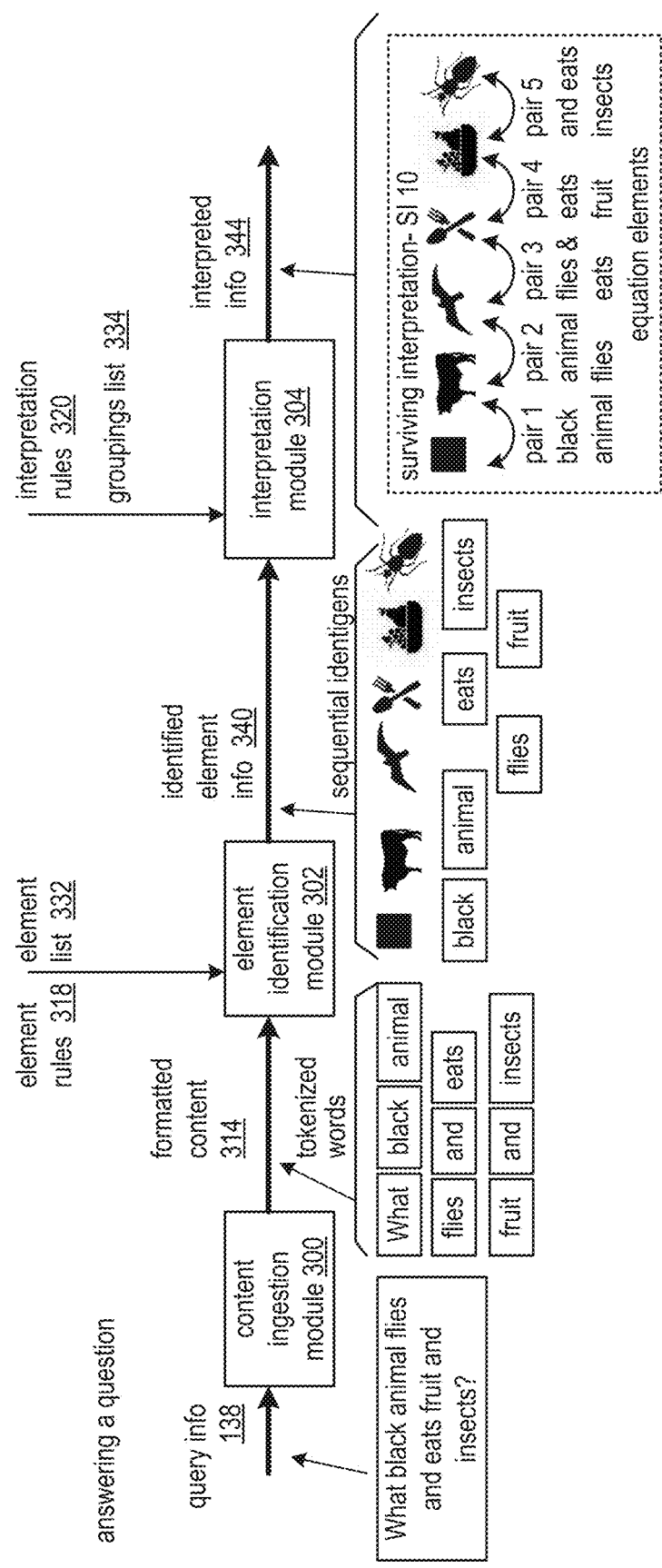
FIGS. 8J and 8K are schematic block diagrams another embodiment of a computing system in accordance with the present invention.
Figure 8K:
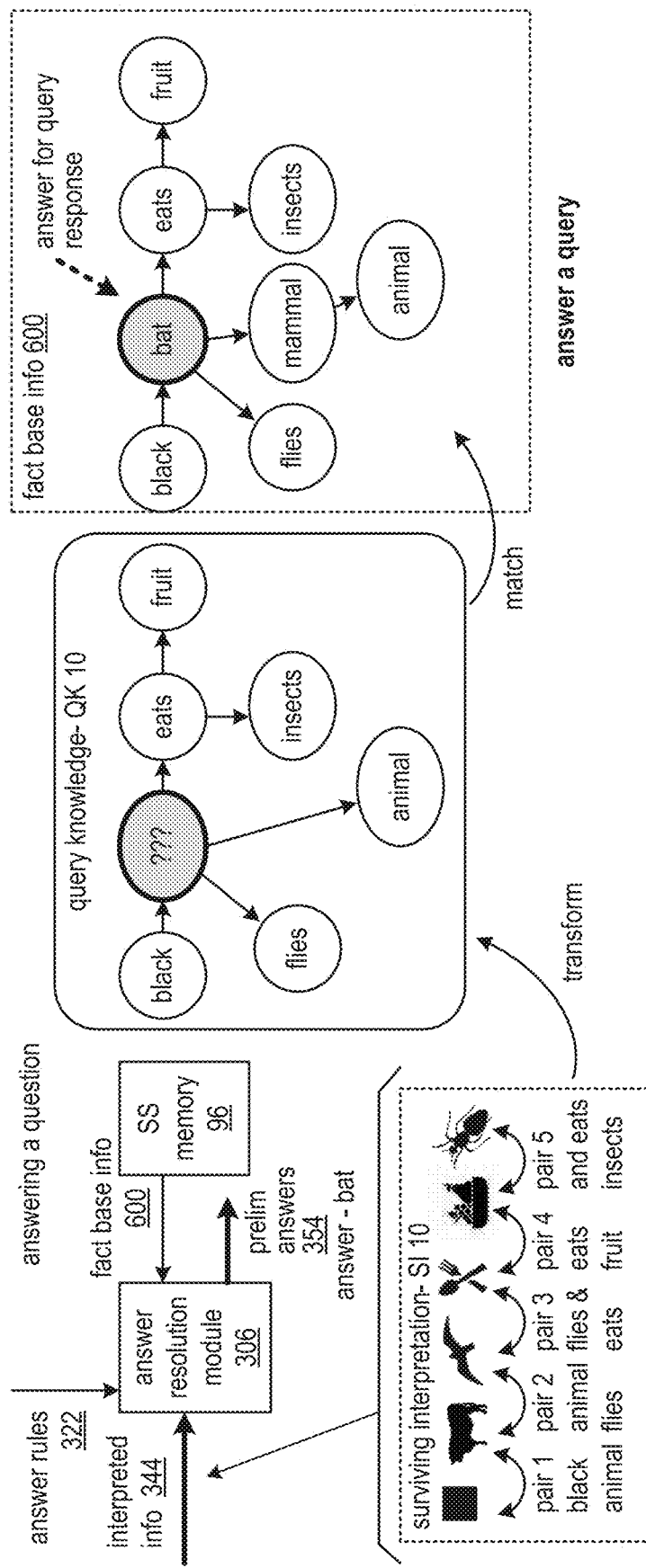

FIGS. 8J and 8K are schematic block diagrams of another embodiment of a computing system that includes the content ingestion module 300 of FIG. 5E, the element identification module 302 of FIG. 5E, the interpretation module 304 of FIG. 5E, the answer resolution module 306 of FIG. 5E, and the SS memory 96 of FIG. 2. Generally, an embodiment of this invention provides solutions where the computing system 10 supports for generating a query response to a query utilizing a knowledge database.

The generating of the query response to the query includes a series of steps. For example, a first step includes identifying words of an ingested query to produce tokenized words. As depicted in FIG. 8J, a specific example of the first step includes the content ingestion module 300 comparing words of query info 138 to dictionary entries to produce formatted content 314 that includes identifiers of known words. For instance, the content ingestion module 300 produces identifiers for each word of the query "what black animal flies and eats fruit and insects?"

A second step of the generating of the query response to the query includes, for each tokenized word, identifying one or more identigens that correspond the tokenized word, where each identigen describes one of an object, a characteristic, and an action (OCA). As depicted in FIG. 8J, a specific example of the second step includes the element identification module 302 performing a look up of identifiers, utilizing an element list 332 and in accordance with element rules 318, of the one or more identigens associated with each tokenized word of the formatted content 314 to produce identified element information 340. A unique identifier is associated with each of the potential object, the characteristic, and the action associated with a particular tokenized word. For instance, the element identification module 302 produces a single identigen identifier for each of the black color, an animal, flies, eats, fruit, and insects.

A third step of the generating of the query response to the query includes, for each permutation of sequential combinations of identigens, generating a corresponding equation package (i.e., candidate interpretation). The equation package includes a sequential linking of pairs of identigens, where each sequential linking pairs a preceding identigen to a next identigen. An equation element describes a relationship between paired identigens (OCAs) such as describes, acts on, is a, belongs to, did, did to, etc.

As depicted in FIG. 8J, a specific example of the third step includes the interpretation module 304, for each permutation of identigens of each tokenized word of the identified element information 340, generating the equation packages in accordance with interpretation rules 320 and a groupings list 334 to produce a series of equation elements that include pairings of identigens. For instance, the interpretation module 304 generates a first pairing to describe a black animal, a second pairing to describe an animal that flies, a third pairing to describe flies and eats, a fourth pairing to describe eats fruit, and a fifth pairing to describe eats fruit and insects.

A fourth step of the generating the query response to the query includes selecting a surviving equation package associated with a most favorable interpretation. As depicted in FIG. 8J, a specific example of the fourth step includes the interpretation module 304 applying the interpretation rules 320 (i.e., inference, pragmatic engine, utilizing the identifiers of the identigens to match against known valid combinations of identifiers of entigens) to reduce the number of permutations of the sequential combinations of identigens to produce interpreted information 344. The interpreted information 344 includes identification of at least one equation package as a surviving interpretation SI 10, where non-surviving equation packages, if any, are eliminated that compare unfavorably to pairing rules to produce a non-surviving interpretation.

A fifth step of the generating the query response to the query includes utilizing a knowledge database, generating a query response to the surviving equation package of the query, where the surviving equation package of the query is transformed to produce query knowledge for comparison to a portion of the knowledge database. An answer is extracted from the portion of the knowledge database to produce the query response.

As depicted in FIG. 8K, a specific example of the fifth step includes the answer resolution module 306 interpreting the surviving interpretation SI 10 of the interpreted information 344 in accordance with answer rules 322 to produce query knowledge QK 10 (i.e., a graphical representation of knowledge when the knowledge database utilizes a graphical database). For example, the answer resolution module 306 accesses fact base information 600 from the SS memory 96 to identify the portion of the knowledge database associated with a favorable comparison of the query knowledge QK 10 (e.g., by comparing attributes of the query knowledge QK 10 to attributes of the fact base information 600), and generates preliminary answers 354 that includes the answer to the query. For instance, the answer is "bat" when the associated OCAs of bat, such as black, eats fruit, eats insects, is an animal, and flies, aligns with OCAs of the query knowledge.

Figure 8L:
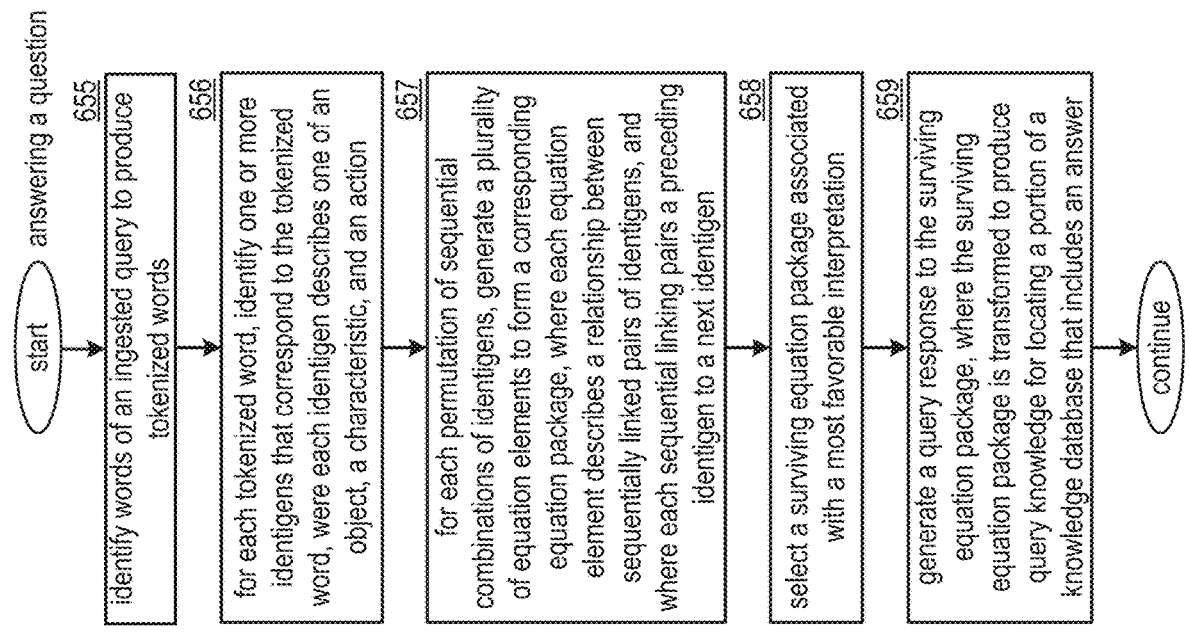
FIG. 8L is a logic diagram of an embodiment of a method for generating a query response to a query within a computing system in accordance with the present invention.

FIG. 8L is a logic diagram of an embodiment of a method for generating a query response to a query utilizing knowledge within a knowledge database within a computing system. In particular, a method is presented for use in conjunction with one or more functions and features described in conjunction with FIGS. 1-8D, 8J, and also FIG. 8K. The method includes step 655 where a processing module of one or more processing modules of one or more computing devices of the computing system identifies words of an ingested query to produce tokenized words. For example, the processing module compares words to known words of dictionary entries to produce identifiers of known words.

For each tokenized word, the method continues at step 656 where the processing module identifies one or more identigens that correspond to the tokenized word, where each identigen describes one of an object, a characteristic, and an action. For example, the processing module performs a lookup of identifiers of the one or more identigens associated with each tokenized word, where different identifiers associated with each permutation of a potential object, characteristic, and action associated with the tokenized word.

For each permutation of sequential combinations of identigens, the method continues at step 657 where the processing module generates a plurality of equation elements to form a corresponding equation package, where each equation element describes a relationship between sequentially linked pairs of identigens. Each sequential linking pairs a preceding identigen to a next identigen. For example, for each permutation of identigens of each tokenized word, the processing module includes all other permutations of all other tokenized words to generate the equation packages. Each equation package includes a plurality of equation elements describing the relationships between sequentially adjacent identigens of a plurality of sequential combinations of identigens.

The method continues at step 658 where the processing module selects a surviving equation package associated with a most favorable interpretation. For example, the processing module applies rules (i.e., inference, pragmatic engine, utilizing the identifiers of the identigens to match against known valid combinations of identifiers of entigens) to reduce the number of permutations of the sequential combinations of identigens to identify at least one equation package. Non-surviving equation packages are eliminated the compare unfavorably to pairing rules.

The method continues at step 659 where the processing module generates a query response to the surviving equation package, where the surviving equation package is transformed to produce query knowledge for locating the portion of a knowledge database that includes an answer to the query. As an example of generating the query response, the processing module interprets the surviving the equation package in accordance with answer rules to produce the query knowledge (e.g., a graphical representation of knowledge when the knowledge database utilizes a graphical database format).

The processing module accesses fact base information from the knowledge database to identify the portion of the knowledge database associated with a favorable comparison of the query knowledge (e.g., favorable comparison of attributes of the query knowledge to the portion of the knowledge database, aligning favorably comparing entigens without conflicting entigens). The processing module extracts an answer from the portion of the knowledge database to produce the query response.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 9A:
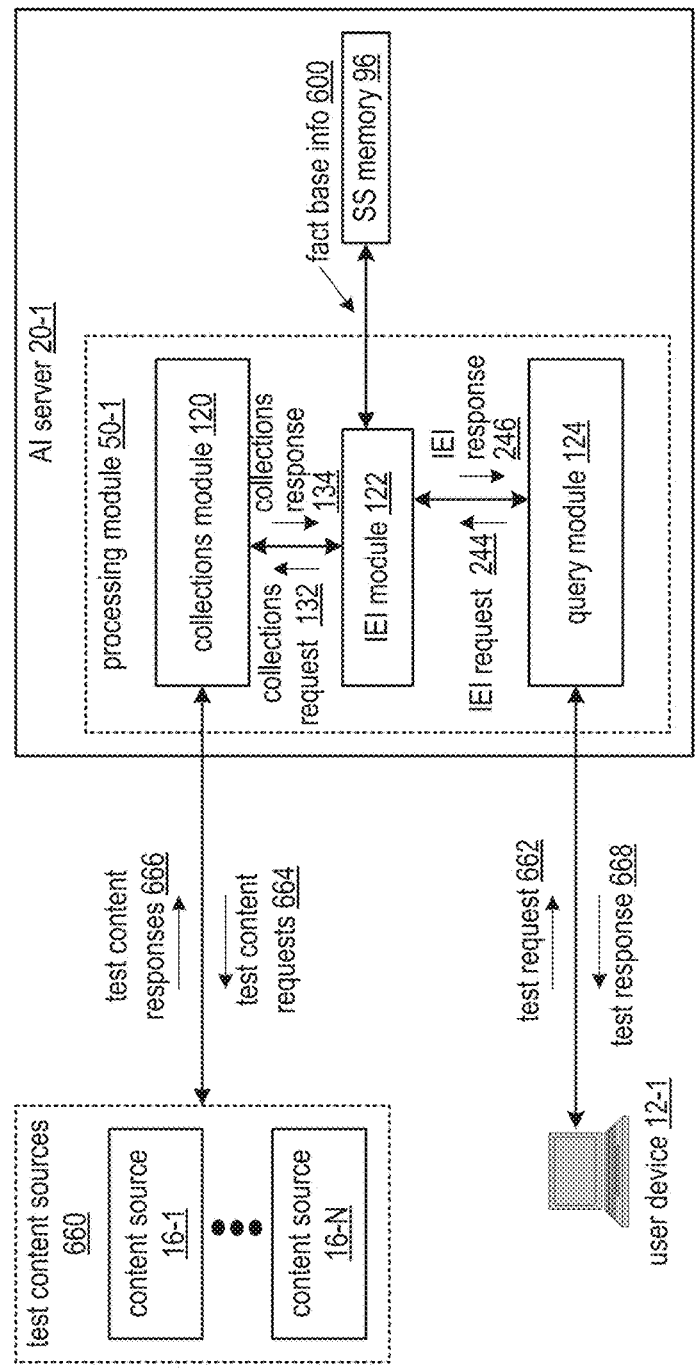
FIG. 9A is a schematic block diagram of another embodiment of a computing system in accordance with the present invention.

FIG. 9A is a schematic block diagram of another embodiment of a computing system that includes test content sources 660, the AI server 20-1 of FIG. 1, and the user device 12-1 of FIG. 1. The test content sources 660 includes the content sources 16-1 through 16-N of FIG. 1 and provides content generated, or retrieved, in response to one or more test content requests 664 in accordance with a test response generating approach. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of the invention presents solutions where the computing system 10 supports verifying knowledge extraction from content.

In an example of operation of the verifying of the knowledge extraction from the content, the IEI module 122 determines one or more steps of an AI engine test sequence. The AI engine test sequence includes steps to exercise and validate one or more of processing capabilities, utilization of stored knowledge, and ability to gather further knowledge. The determining includes one or more of indicating to invoke the test sequence based on one or more of expiration of a test cycle time frame, detecting an anomaly, and interpreting an IEI request 244 from the query module 124 based on a test request 662 from the user device 12-1. The determining of the one or more steps may be based on one or more of the test request 662, a previous test, a previous test result, an interpretation of the anomaly, a historical test pattern, and identifying which aspects to test (i.e., processing capabilities, utilization of the stored knowledge, gathering of the further knowledge).

When the one or more steps of the AI engine test sequence includes gathering further knowledge, the IEI module 122 facilitates collection of test content to generate the further knowledge. The identifying includes one or more of identifying a deficiency of presently stored knowledge (e.g., fact base info 600 from the SS memory 96), untimely knowledge, insufficient depth of understanding indicator, potential inaccuracies, and an unfavorable level of ambiguity detected. The facilitating includes one or more of causing one or more content collection cycles, where each cycle includes the issuing a collections request 132 to the collections module 120, where the request includes one or more of a content type, the content source, information with regards to the identified deficiency, and a recommended test to generate test content. The collections module 120 facilitates one or more test content collection cycles, where each cycle includes issuing one or more test content requests 664 to one or more content sources 16-1 through 16-N of the test content sources 660 cause receiving of test content responses 666.

One or more of the content sources dynamically generates content of the test content responses 666 based on locally prestored content and a test response generating approach. The collections module 120 issues a collections response 134 to the IEI module 122 when favorable for the content has been collected (e.g., a goal of a content collection experiment has been met, a number of content sources have been query, a sufficient volume of incremental content has been collected, one or more mandatory content sources have provided a model content, etc.).

The IEI module 122 processes the test content of the collections response 134 in accordance with the one or more steps of the AT engine test sequence to produce the further knowledge for storage as fact base information 600 in the SS memory 96. The IEI module 122 issues, in accordance with the one or more steps of the EI engine test sequence, an IEI response 246 to the query module 124 in response to an IEI request 244 from the query module 124. The query module 124 generates the IEI request 244 based on the test request 662 from the user device 12-1. The IEI module 122 generates the IEI response 246 to include a response to the test request 662 based on the further knowledge of the knowledge base. The query module 124 issues a test response 668 to the user device 12-1. The query module 124 generates the test response 668 to include the response of the IEI response 246.

Figure 9B:
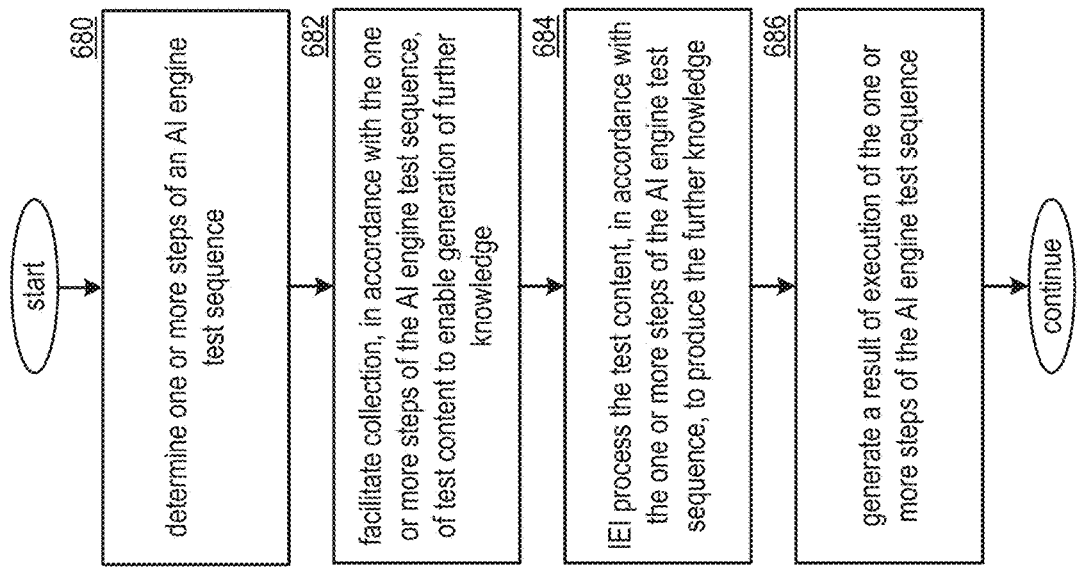
FIG. 9B is a logic diagram of an embodiment of a method for verifying knowledge extraction from content within a computing system in accordance with the present invention.

FIG. 9B is a logic diagram of an embodiment of a method for verifying knowledge extraction from content within a computing system. In particular, a method is presented for use in conjunction with one or more functions and features described in conjunction with FIGS. 1-8D, 9A, and also FIG. 9B. The method includes step 680 where a processing module of one or more processing modules of one or more computing devices of the computing system determines one or more steps of an AI engine test sequence. The determining includes indicating to invoke the test sequence based on one or more of an expiration of a test cycle time frame, detecting an anomaly, and interpreting a request. The determining of the one or more steps may be based on one or more of the request, a previous test, a previous test result, and interpretation of the anomaly, a historical test pattern, and identifying which aspects of the test (i.e., processing capabilities, utilizing the stored knowledge, and gathering further knowledge).

The method continues at step 682 where the processing module facilitates collection, in accordance with the one or more steps of the EI engine test sequence, of test content to enable generation of further knowledge. The facilitating includes causing one or more content collection cycles, where each cycle includes issuing a collections request. The request indicates one or more of a content type, a content source, information with regards to an identified deficiency, and a recommended test to generate test content.

Each cycle includes issuing one or more test content requests to one or more content sources of test content sources to cause retrieving of test responses. One or more of the content sources dynamically generates content of the test content responses based on locally prestored content and a test response generating approach. The processing module determines that favorable further content has been collected when at least one of satisfying at least one goal of a content collection test has been met, a number of content sources have been queried, a sufficient volume of an incremental content has been collected, and one or more mandatory content sources have provided the incremental content etc.

The method continues at step 684 where the processing module IEI processes the test content in accordance with the one or more steps of the AI engine test sequence to produce the further knowledge. For example, the processing module converts human expressions of the test content into computer representations as the further knowledge of the test content, aggregates the further knowledge of the test content with previously stored knowledge to produce augmented knowledge, and utilizes the augmented knowledge in a step of the one or more steps of the AI engine test sequence (e.g., to answer a question).

The method continues at step 686 where the processing module generates a result of execution of the one or more steps of the AI engine test sequence. The generating includes one or more of summarizing a result, comparing a result to a desired result, identifying a result recipient, generating a test result message, issuing the test result message to the identified result recipient, and saving the result as a historical result for utilization in subsequent tests.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

FIGS. 10A-10D are schematic block diagrams of another embodiment of a computing system illustrating an embodiment of a method for processing a query. The computing system includes the content ingestion module 300 of FIG. 5E, the element identification module 302 of FIG. 5E, the interpretation module 304 of FIG. 5E, the answer resolution module 306 of FIG. 5E, a knowledge database 700, and a data source 710. In an embodiment, the knowledge database 700 is implemented utilizing the fact base 592 of FIG. 8A. In an embodiment, the data source 710 is implemented utilizing one or more of the content sources 16-1 through 16-N.

Figure 10A:
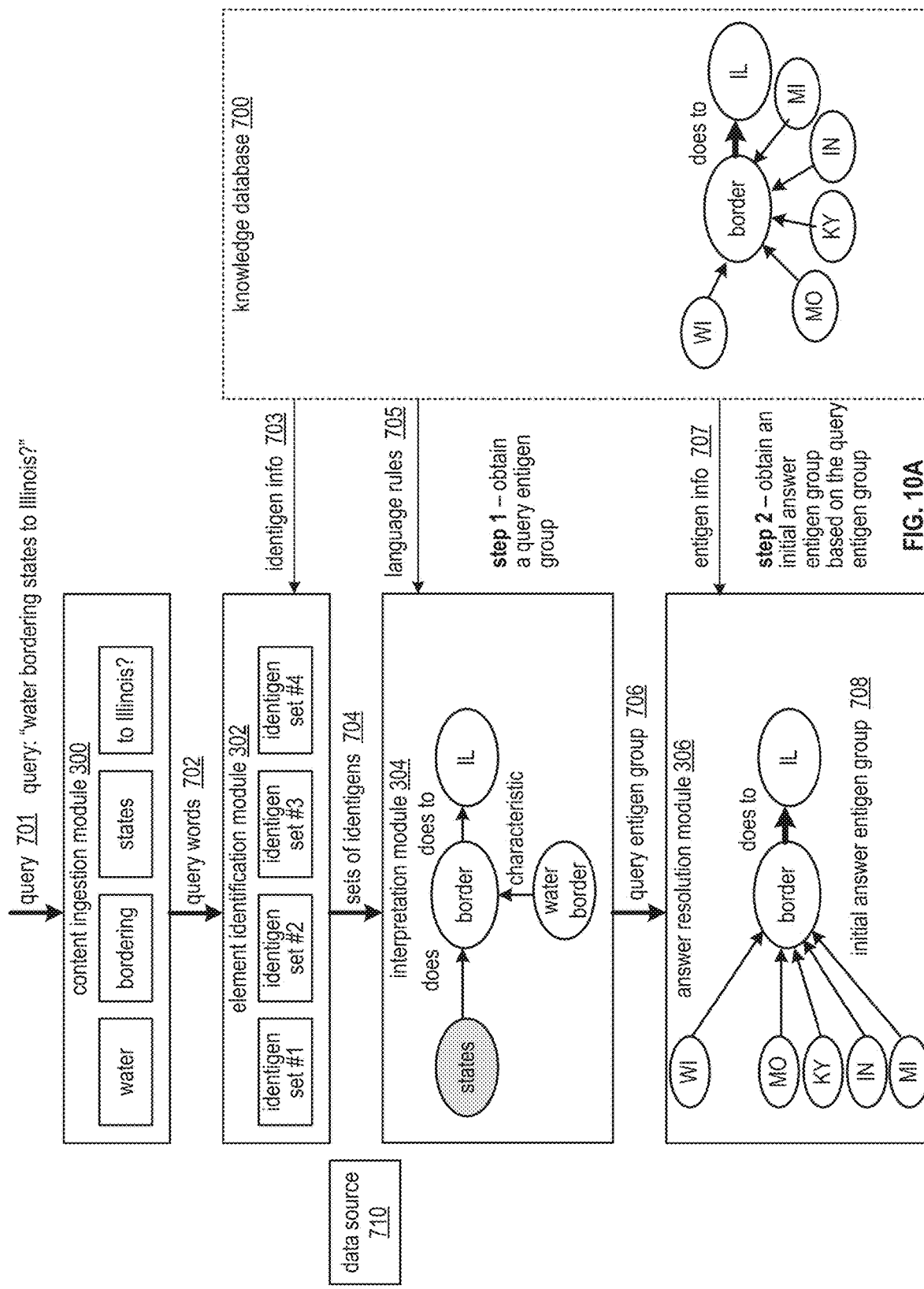
FIGS. 10A-10D are schematic block diagrams of another embodiment of a computing system illustrating an embodiment of a method for processing a query in accordance with the present invention.

FIG. 10A illustrates an example of the method of the processing of the query where the content ingestion module 300 receives the query 701 and parses the query 701 to produce query words 702 that includes a plurality of words. For example, when the query includes "water bordering states to Illinois?", the content ingestion module 300 produces the query words 702 to include "water", "bordering", "states", and "to Illinois?"

The element identification module 302 identifies a set of identigens for each word of the query to produce a plurality of sets of identigens 704. For example, the element identification module 302 accesses the knowledge database 700 utilizing the query words 702 to recover identigen information 703. The identigen information 703 includes, for each word, a set of associated identigens. A set of identigens of the plurality of sets of identigens includes one or more different meanings of a word of the query For instance, an identigen set #1 is recovered that corresponds to the word "water" (e.g., noun water, verb water, etc.), and an entigen set #2 is recovered that corresponds to the word "bordering", etc.

The interpretation module 304 interprets, utilizing language rules 705, the plurality of sets of identigens 704 to produce a query entigen group 706. A query entigen of the query entigen group corresponds to an identigen of the set identigens having a selected meaning of the one or more different meanings of the word of the query. The language rules 705 includes an indication of valid sequential permutations of identigens as found in accordance with a particular language.

The query entigen group 706 represents a most likely interpretation of the query 701. An entigen group includes a plurality of entigens, where each entigen represents one of an object, a characteristic, and an action. For example, the interpretation module 304 generates the query entigen group 706 to include a placeholder object entigen for states, an action entigen for borders, an object entigen for Illinois, and a characteristic entigen for a water border entigen describing a type of border.

An entigen group further includes relationships between entigens including describes, acts on, is a, belongs to, did, did too, etc. The query entigen group 706 further includes a relationship between the state entigen and the border entigen, a relationship between the border entigen and the Illinois entigen, and a relationship between the water border entigen and the border entigen.

Having received the query entigen group 706, the answer resolution module 306 obtains an initial answer entigen group 708 from the knowledge database 700 based on the query entigen group 706. An answer entigen of the initial answer entigen group 708 corresponds to a partial query answer element (e.g., part of an answer to the query).

The obtaining of the initial answer entigen group 708 includes identifying a group of entigens from entigen information 707 of the knowledge database 700 that compares favorably to the query entigen group 706 as the initial answer entigen group 708. For example, the answer resolution module 306 identifies a first answer entigen of the initial answer entigen group that is substantially the same as a first query entigen of the query entigen group. For instance, the entigen for "Illinois" is identified in both the query entigen group 706 and an entigen of the knowledge database 700.

The answer resolution module 306 further identifies that a second answer entigen of the initial answer entigen group is substantially the same as a second query entigen of the query entigen group. For instance, the entigen for "border" is identified in both the query entigen group 706 and another entigen of the knowledge database 700. The answer resolution module 306 further identifies that a first entigen relationship between the first and second query entigens of the query entigen group is substantially the same as a second entigen relationship between the first and second answer entigens of the answer entigen group. For instance, the relationship is identified between the entigens for border and Illinois of both the query entigen group 706 and the identified entigens of the knowledge database 700.

The identifying of common entigens and entigen relationships is carried out to find a best matching entigen group of the knowledge database 700 to the query entigen group 706. For example, the answer resolution module 306 produces the initial answer entigen group 708 to include the Illinois entigen, the border entigen, and entigens for the states of Wisconsin, Missouri, Kentucky, Indiana, and Michigan since the knowledge database 700 further indicates that those state names are valid states. It is noted that the state of Iowa is temporarily missing in this example which is further discussed with reference to FIG. 10B.

Figure 10B:
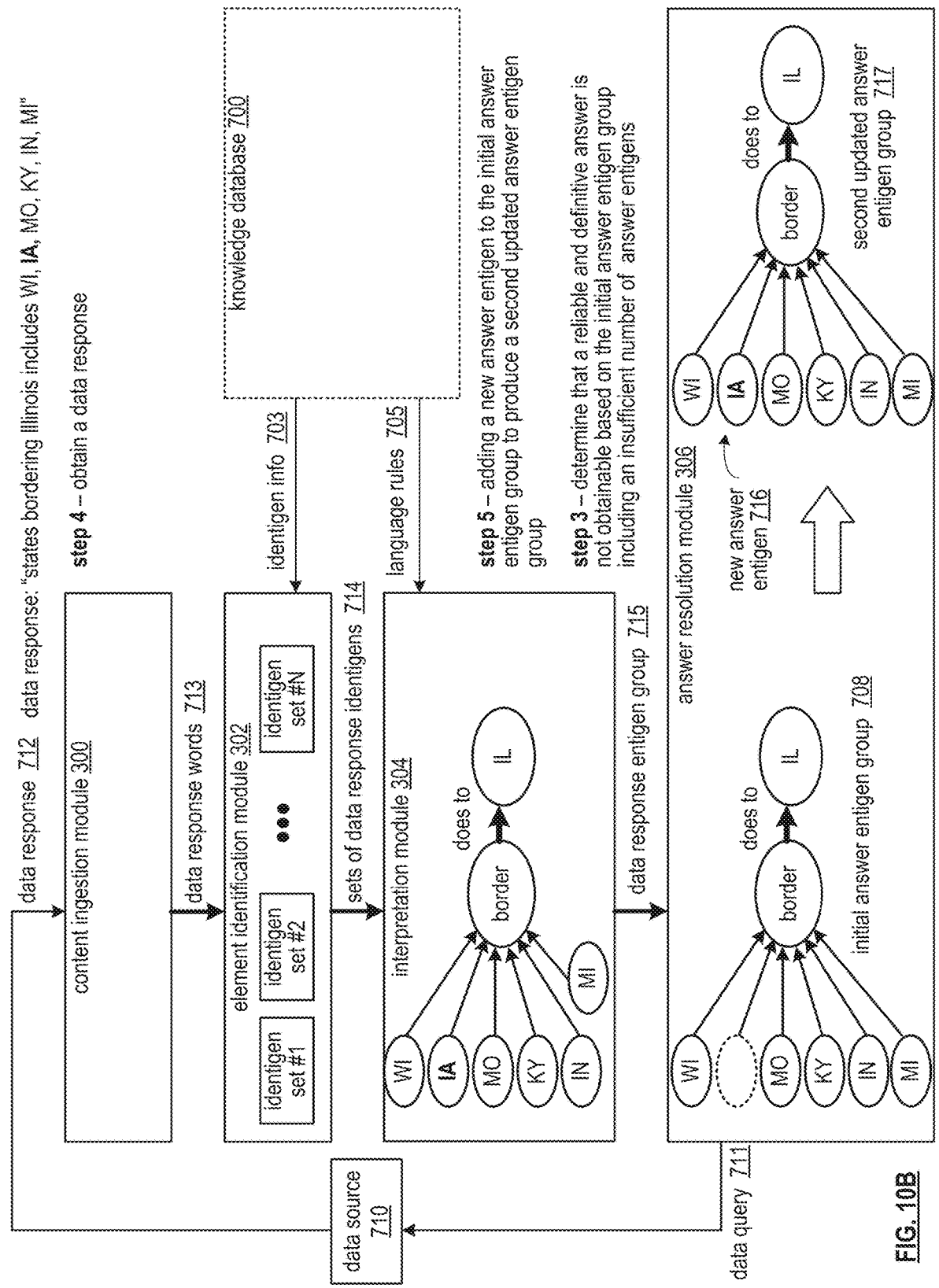

FIG. 10B further illustrates the example of the processing of the query where the answer resolution module 306 determines that a reliable and definitive answer for the query 701 is not obtainable from the initial answer entigen group 708 based at least one root cause. A first root cause is detectable when the initial answer entigen group 708 includes an incomplete answer entigen (e.g., missing characteristic entigen(s)). A second root cause is detectable when the initial answer entigen group includes an insufficient number of answer entigens (e.g., missing object entigen(s)). A scenario associated with the incomplete answer entigen is discussed in greater detail with reference to FIG. 10C.

The determining that the reliable and definitive answer is not obtainable includes determining that the initial answer entigen group 708 includes the insufficient number of answer entigens by a series of steps. A first step includes extracting a first characteristic, a first action, and a first object from a first answer entigen of the initial answer entigen group. For example, the answer resolution module 306 extracts the action entigen for bordering Illinois.

Having extracted the first answer entigen, a second step includes the answer resolution module 306 generating a data query 711 based on the first characteristic, the first action, and the first object. For example, the answer resolution module 306 generates the data query 711 to identify states bordering Illinois.

Having generated the data query 711, a third step includes the answer resolution module 306 querying one or more data sources (e.g., the data source 710) based on the data query 711 to obtain a data response 712. For example, the answer resolution module 306 identifies the data source 710 as a data source that likely contains content associated with the data query (e.g., a list of states that border Illinois). Having identified the data source 710, the answer resolution module 306 sends the data query 711 to the data source 710.

In a fourth step, the content ingestion module 300 receives the data response 712. For example, the content ingestion module 300 parses words of the data response including "states bordering Illinois includes Wisconsin, Iowa, Missouri, Kentucky, Indiana, and Michigan" to produce data response words 713.

In the fifth step, the element identification module 302 processes each word of the data response word 713 to identify a set of identigens from identigen information 703 from the knowledge database 700 to produce a plurality of sets of data response identigens 714. In a sixth step, the interpretation module 304 interprets the set of data response identigens 714 in accordance with the language rules 705 of the knowledge database 700 to produce a data response entigen group 715. For example, the interpretation module 304 generates the data response entigen group 715 to include an Illinois entigen, a border entigen, and entigens for the states of Wisconsin, Iowa, Missouri, Kentucky, Indiana, and Michigan.

Having received the data response entigen group 715, and a seventh step, the answer resolution module 306 determines that the data response 712 does not correspond to the initial answer entigen group 708. For example, the answer resolution module 306 determines that the data response entigen group 715 includes the state of Iowa and the initial answer entigen group 708 does not include the state of Iowa (e.g., Iowa was missing from the initial knowledge database 700).

Having determined that the data response 712 does not correspond to the initial answer entigen group 708, the answer resolution module 306 generates a new answer entigen 716 based on the data response 712. Example, the answer resolution module 306 generates the new answer entigen 716 to represent the state of Iowa. The answer resolution module 306 adds the new answer entigen 716 to the initial answer entigen group 708 to produce a second updated answer entigen group 717. For example, the answer resolution module 306 establishes a relationship between the Iowa entigen and the border entigen. In addition, the answer resolution module 306 updates the knowledge database 700 with the second updated answer entigen group 717 (e.g., Iowa is added to the knowledge database 700).

Having produced the second updated answer entigen group 717, the answer resolution module 306 determines whether the reliable and definitive answer is obtainable by comparing the second updated answer entigen group 717 to the query entigen group 706. For example, the answer resolution module 306 indicates that the reliable and definitive answer is not obtainable due to the incomplete answer entigen when the query entigen group 706 includes the water border characteristic entigen and the second updated answer entigen group 717 does not. Resolution of the incomplete answer entigen is discussed in greater detail with reference to FIG. 10c.

When the second updated answer entigen group 717 produces the reliable and definitive answer, the answer resolution module 306 outputs the reliable and definitive answer. In another example, the reliable and definitive answer is obtainable when the query entigen group 706 does not include the water border entigen (e.g., when the query simply asks which states border Illinois).

Figure 10C:
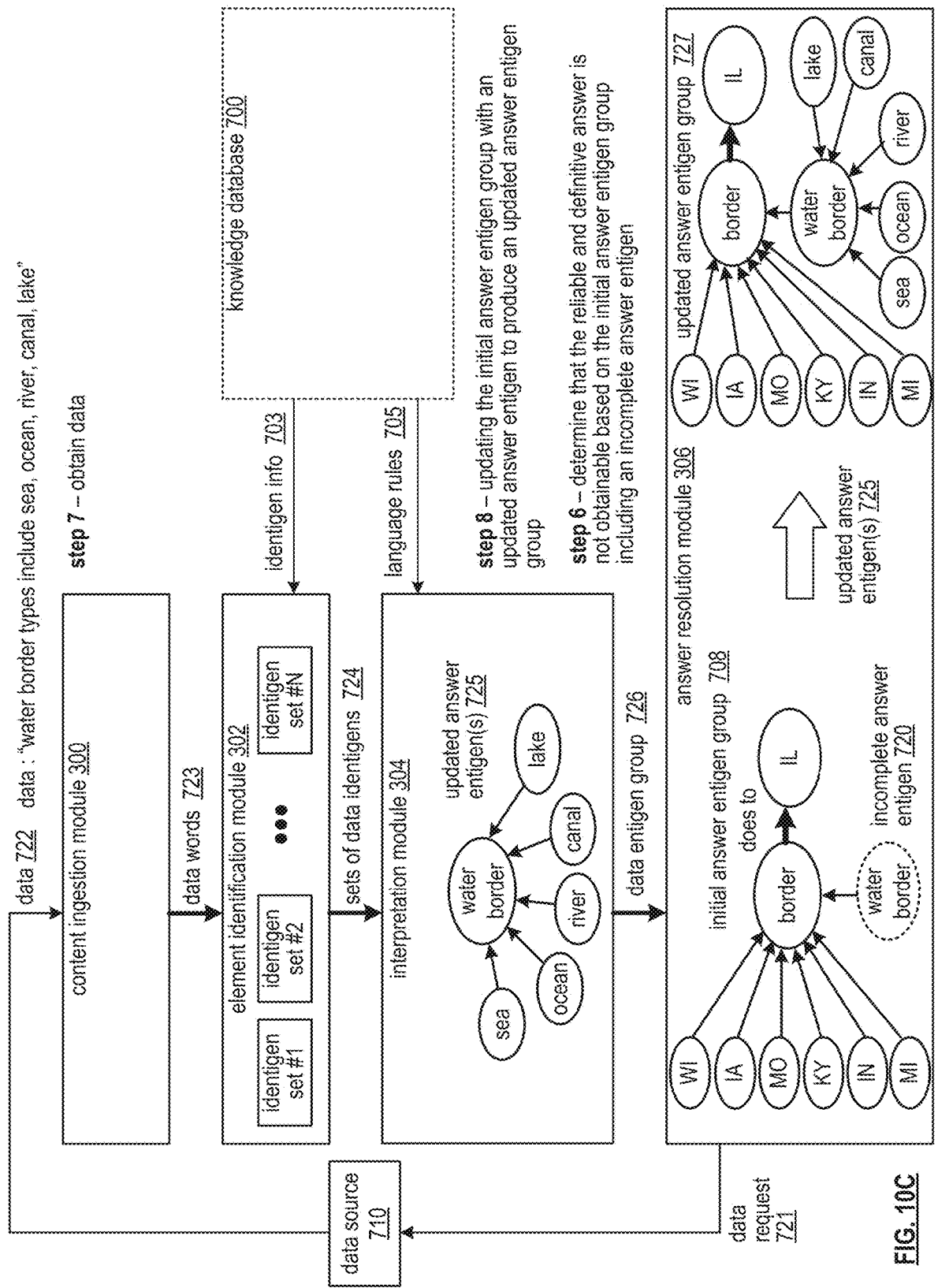

FIG. 10C further illustrates the example of the processing of the query where the answer resolution module 306 determines that the reliable and definitive answer for the query is not obtainable from the initial answer entigen group 708 due to the initial answer entigen group including the incomplete answer entigen. The determining that the initial answer entigen group includes the incomplete answer entigen includes a series of steps.

A first step includes the answer resolution module 306 identifying a first answer entigen of the initial answer entigen group 708 that is substantially the same as a first query entigen of the query entigen group 706. For example, the answer resolution module 306 identifies the border entigen to be the same between the query entigen group 706 and the initial answer entigen group 708.

A second step includes the answer resolution module 306 determining that a number of a first set of entigen relationships between the first query entigen and a first set of related query entigens of the query entigen group is greater than a number of a second set of entigen relationships between the first answer entigen and a second set of related answer entigens of the answer entigen group. For example, the answer resolution module 306 determines that the border entigen of the query entigen group 706 has one more relationship (e.g., the water border entigen relationship) than the border entigen of the initial answer entigen group 708. The answer resolution module 306 identifies the water border entigen as the incomplete answer entigen 720.

When the incomplete answer entigen is a cause for the inability to obtain the reliable and definitive answer, the answer resolution module 306 determines, for the incomplete answer entigen 720, a missing element of a set of elements that includes a characteristic, an action, and an object. For example, the answer resolution module 306 identifies a characteristic of bordering by water as the missing element.

Having identified the missing element, the answer resolution module 306 obtains data regarding the missing element. For example, the answer resolution module 306 issues a data request 721 to the data source 710, where the data request 721 looks for water border characteristics. The answer resolution module 306 selects the data source 710 when the data source 710 is known to include content associated with water border characteristics (e.g., geography references, etc.).

Having issued the data request 721 to the data source 710, the content ingestion module 300 parses words of data 722 from the data source 710 in response to the data request 721. For example, the content ingestion module 300 produces data words 723 from the data that includes "water border types include sea, ocean, river, canal, lake."

The element identification module 302 generates a set of identigens utilizing identigens information 703 from the knowledge database 700 for each word of the data words 723 to produce sets of data identigens 724. The interpretation module 304 interprets the sets of data identigens 724 in accordance with the language rules 705 from the knowledge database 700 to produce a data entigen group 726. For example, the interpretation module 304 generates a water border entigen that is associated with entigens for types of water borders including sea, ocean, river, canal, and lake.

The answer resolution module 306 updates the incomplete answer entigen 720 with the data 722 to produce an updated answer entigen 725. The types of water borders establish updated answer entigens 725 for the initial answer entigen group 708.

Having produced the updated answer entigen 725, the answer resolution module 306 updates the initial answer entigen group 708 with the updated answer entigen 725 to produce an updated answer entigen group 727. For example, the water border entigen and associated water border characteristic entigens are attached to the border entigen. In an embodiment, the answer resolution module 306 updates the knowledge database 700 with the updated answer entigen group 727.

The answer resolution module 306 determines whether the reliable and definitive answer is obtainable based on the updated answer entigen group 727. For example, the answer resolution module 306 indicates that the reliable and definitive answer is not obtainable when the water border entigen includes only characteristic entigens that do not indicate specific example object bodies of water as is sought by the query. The resolution is discussed in greater detail with reference to FIG. 10D. When the updated answer entigen group 727 produces the reliable and definitive answer, the answer resolution module 306 outputs the reliable and definitive answer.

Figure 10D:
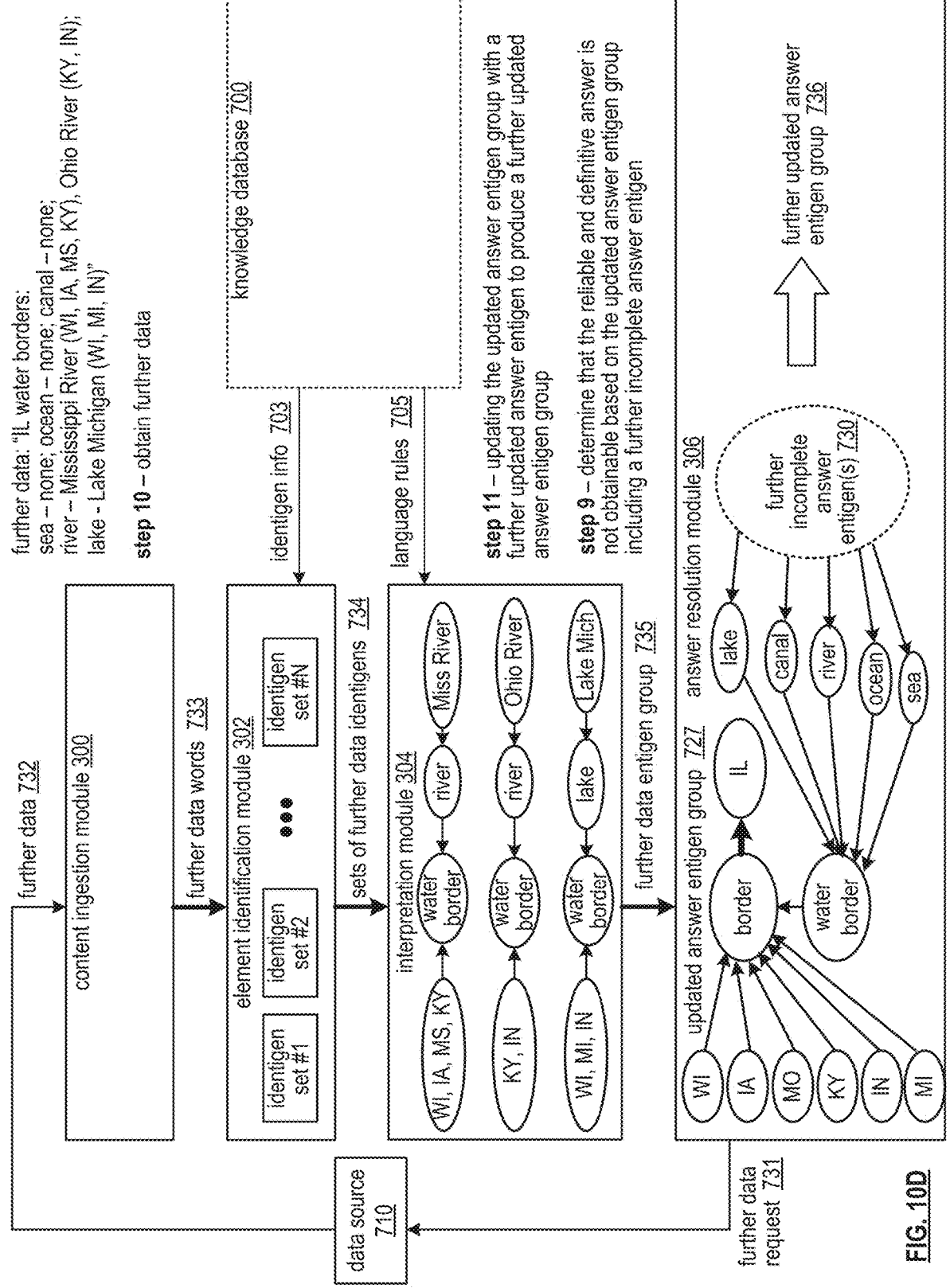

FIG. 10D further illustrates the example of the processing of the query where the answer resolution module 306 has determined that the updated answer entigen group 727 does not produce the reliable and definitive answer. The answer resolution module 306 identifies a further incomplete answer entigen(s) 730 of the updated answer entigen group 727. For example, the answer resolution module 306 identifies a need for specific object entigens that relate to the types of water borders.

The answer resolution module 306 determines, for the further incomplete answer entigen 730, a further missing element of the set of elements that includes the characteristic, the action, and the object. For example, which lakes and rivers (e.g., objects) provide water borders between states bordering Illinois and Illinois.

Having identified the further missing element, the answer resolution module 306 obtains further data regarding the further missing element. For example, the answer resolution module 306 issues a further data request 731 to the data source 710 requesting specific examples of water borders by type (e.g., sea, ocean, river, canal, lake) with Illinois. The content ingestion module 300 and receives further data 732 from the data source 710 and parses the further data 732 to produce further data words 733. For example, the content ingestion module 300 produces the further data words 733 from further data that includes "Illinois water borders: sea—none; ocean—none; canal—none; river—Mississippi River (e.g., Wisconsin, Iowa, Missouri, Kentucky,), Ohio River (e.g., Kentucky, Indiana); and lake—Lake Michigan (e.g., Wisconsin, Michigan, Indiana)."

The element identification module 302 utilizes identigens information 703 from the knowledge database 700 to identify a set of identigens for each word of the further data words 733 to produce sets of further data identigens 734. The interpretation module 304 utilizes the language rules 705 from the knowledge database 700 to interpret the sets of further data identigens 734 to produce a further data entigen group 735 as a most likely meaning of the further data 732. For example, the further data entigen group 735 includes an entigen for the Mississippi River coupled to an entigen for river coupled to an entigen for water border coupled to entigens for the states of Wisconsin, Iowa, Missouri, and Kentucky, etc.

Having received the further data entigen group 735, the answer resolution module 306 updates the further incomplete answer entigen 730 with the further data 732 to produce a further updated answer entigen (e.g., entigens of the Mississippi River, the Ohio River, and Lake Michigan). Having produced the further updated answer entigens, the answer resolution module 306 updates the updated answer entigen group 727 with the further updated answer entigens to produce a further updated answer entigen group 736. In an embodiment, the answer resolution module 306 updates the knowledge database 700 with the further updated answer entigen group 736. An example of the further updated answer entigen group 736 is discussed in greater detail with reference to FIG. 10E.

The answer resolution module 306 determines whether the reliable and definitive answer is obtainable from the further updated answer entigen group 736. For example, the answer resolution module 306 indicates that the reliable and definitive answer is obtainable when the further updated answer entigen group 736 includes the specific examples of the water borders. When the further updated answer entigen group 736 produces the reliable and definitive answer, the answer resolution module 306 outputs the reliable and definitive answer. An example of the reliable and definitive answer is discussed in greater detail with reference to FIG. 10E.

The method described above in conjunction with the content ingestion module 300, the element identification module 302, the interpretation module 304, and the answer resolution module 306 can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices of the computing system 10, cause the one or more computing devices to perform any or all of the method described above.

Figure 10E:
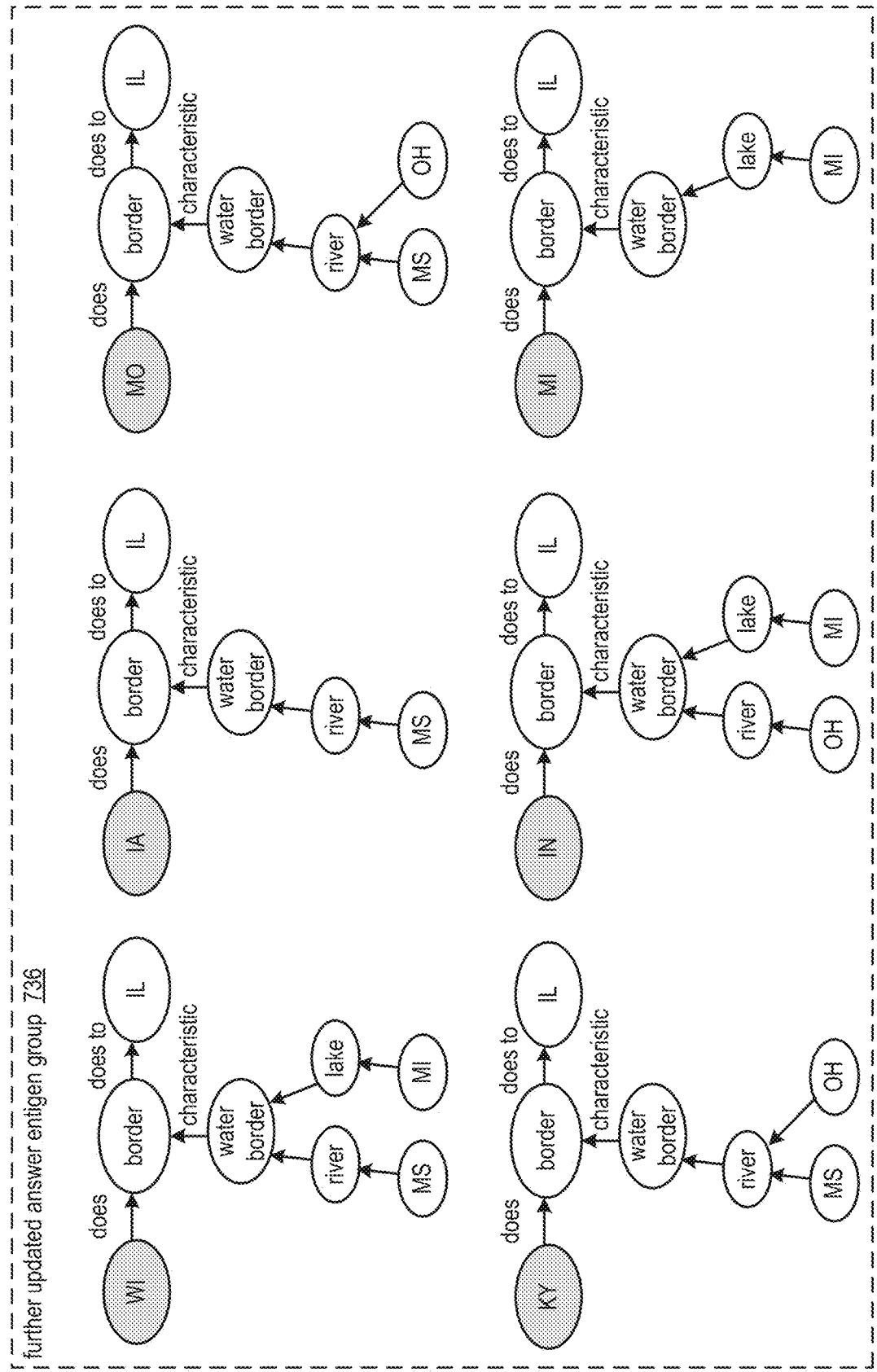
FIG. 10E is a data structure diagram of an example of a further updated answer entigen group in accordance with the present invention.

FIG. 10E is a data structure diagram of an example of a further updated answer entigen group 736. The further updated answer entigen group 736 includes, for each state bordering Illinois, a water border entigen with relevant examples of water border type entigens. For each relevant water border type entigen, there are object entigens listing examples of actual bodies of water. For example, a first portion of the further updated answer entigen group 736 includes entigens for the Mississippi River and Lake Michigan as example water borders between Wisconsin and Illinois.

The reliable and definitive answer is produced from the further updated answer entigen group 736 by deductive reasoning examining instances of states bordering Illinois where at least one specific water border is included. For example, the reliable and definitive answer includes "water bordering states of Illinois are Wisconsin, Iowa, Missouri, Kentucky, Indiana, and Michigan."

When the knowledge database is updated utilizing the further updated answer entigen group 736, subsequent further reliable and definitive answers are enabled for associated further queries. For example, it is noted that a query of "of states bordering Illinois with a water border, which states include only a lake border?" A reliable and definitive answer is readily available by utilizing the updated knowledge database. For example, the answer to the further query includes "Michigan is the only state that borders Illinois with only a lake border".

Figure 11A:
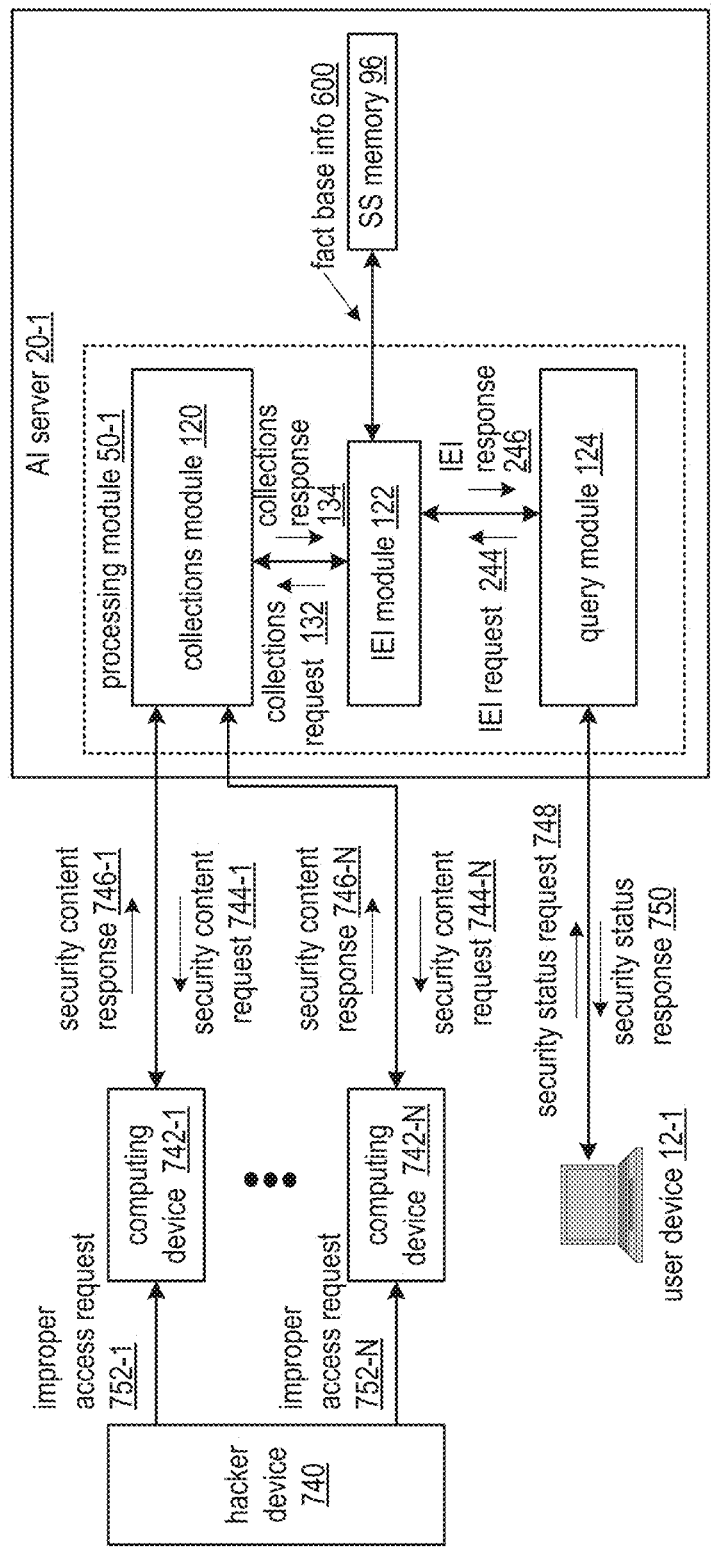
FIG. 11A is a schematic block diagram of another embodiment of a computing system in accordance with the present invention.

FIG. 11A is a schematic block diagram of another embodiment of a computing system that includes a hacker device 740, a plurality of computing devices 742-1 through 742-N, the AI server 20-1 of FIG. 1, and the user device 12-1 of FIG. 1. The hacker device 740 includes any device capable of issuing an improper access request 752 of a potential plurality of improper access requests 752-1 through 752-N. The improper access request 752 is intended to attack a security vulnerability of the computing devices 742-1 through 742-N (e.g., to cause the computing device to perform an undesired action such as providing confidential information).

Each computing device 742-1 through 742-N may be implemented utilizing any type of computing system or device that may be vulnerable to the improper access request 752. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of the invention presents solutions where the computing system 10 supports detecting an unfavorable security condition.

In an example of operation of the detecting of the unfavorable security condition, the IEI module 122 determines, in response to a security status request 748 received from the user device 12-1 (i.e., computing device identifiers, request to identify the hacker device, a request to identify a hacking approach, request to identify security aspects of the hacking approach including encryption keys, device identifiers, etc.), descriptors of required security content to facilitate subsequently issuing a security status response 750 to the user device 12-1. The determining includes interpreting an IEI request 244 from the query module 124. The IEI request 244 is based on the security status request 748, identifying the devices, identify potential vulnerabilities based on knowledge of the fact base info 600 from SS memory 96, and identifying a timeliness requirement of gathering the required security content.

The IEI module 122 facilitates gathering the required security content. For example, the facilitating includes issuing a collections request 132 to the collections module 120, where the collections request 132 is based on the descriptors of the required security content. The collections module 120 issues, for each identified computing device of the computing devices 742-1 through 742-N, a security content request 744 of security content requests 744-1 through 744-N (i.e., request for hacking information).

Each computing device generates a corresponding security content response 746 of security content responses 746-1 through 746-N based on content associated with one or more improper access request 752 of improper access request 752-1 through 752-N. The collections module 120 generates a collections response 134 based on the received security content responses. The collections response 134 provides the required security content.

The IEI module 122 IEI processes the required security content of the collections response 134 to produce the further security knowledge for storage as fact base information 600 and the SS memory 96 (e.g., interpret human expressions to produce identigen groupings for each word of the content, apply rules to identify a unique entigen for each identigen grouping, compare resulting groupings of entigens to knowledge of the fact base info 600 to provide the further security knowledge). The IEI module 122 issues, in response to the security status request 748, an IEI response 246 to the query module 124.

The IEI module 122 generates the IEI response 246 to include aspects of the hacking device (e.g., an identifier of the hacker device, an Internet address of the hacker device, identifiers of attempted hacks, identifiers of improper encryption keys utilized, identification of a hacking approach, an estimated next attack, estimated next improper encryption keys, a security recommendation to abate for the potential risk) based on the further security knowledge of the knowledge base. The query module 124 issues the security status response 750 to the user device 12-1 and where the query module 124 generates the security status response 750 based on the IEI response 246.

Figure 11B:
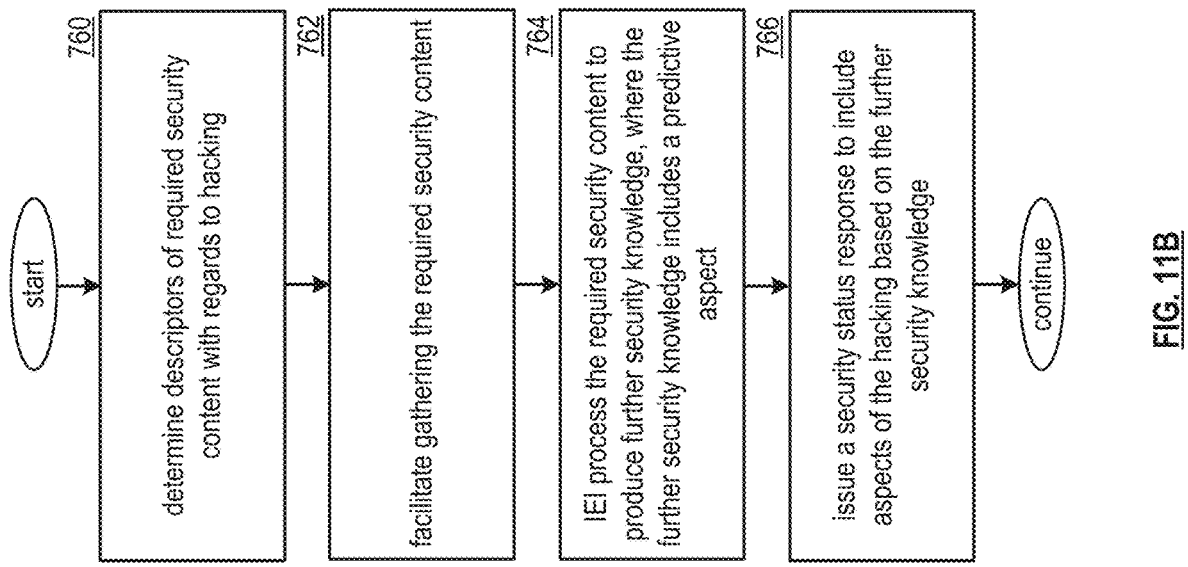
FIG. 11B is a logic diagram of an embodiment of a method for detecting an unfavorable security condition within a computing system in accordance with the present invention.

FIG. 11B is a logic diagram of an embodiment of a method for detecting an unfavorable security condition within a computing system. In particular, a method is presented for use in conjunction with one or more functions and features described in conjunction with FIGS. 1-8D, 11A, and also FIG. 11B. The method includes step 760 where a processing module of one or more processing modules of one or more computing devices of the computing system determines descriptors of required security content with regards to hacking. The determining includes one or more of interpreting a security status request, receiving a security alert, indicating to determine the descriptors, and identifying descriptors associated with aspects of at least one of the request and the alert (e.g., identify a source of the hacking, identify victims of the hacking, identify a hacking approach, identify a hacking pattern, etc.).

The method continues at step 762 where the processing module facilitates gathering the required security content. The facilitating includes one or more of issuing security content requests to the victims of the hacking, receiving security content responses, and aggregating the security content responses to produce the required security content.

The method continues at step 764 where the processing module IEI processes the required security content to produce further security knowledge, where the further security knowledge includes a predictive aspect. The processing includes IEI processing the required security content to produce the further security knowledge that includes the predictive aspect (e.g., predict subsequent hacking based on the detected hacking pattern, etc.).

The method continues at step 766 where the processing module issues a security status response to include aspects of the hacking based on the further security knowledge. The issuing includes one or more of generating the security status response to include aspects of the hacking based on the further security knowledge. The aspects of the hacking includes the predictive aspect and may further include a recommended countermeasure for the predicted subsequent hacking (i.e., different encryption, a updated timeliness to change encryption keys, etc.).

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 12A:
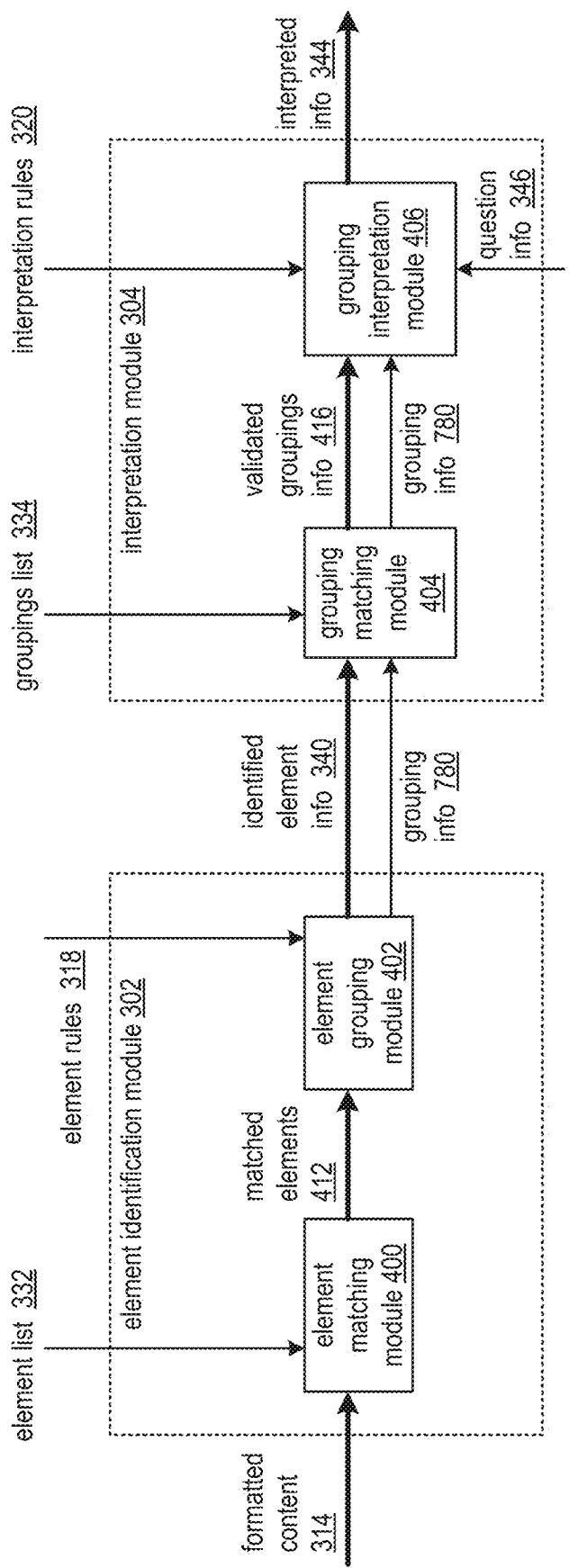
FIG. 12A is a schematic block diagram of another embodiment of a computing system in accordance with the present invention.

FIG. 12A is a schematic block diagram of another embodiment of a computing system that includes the element identification module 302 of FIG. 5E and the interpretation module 304 of FIG. 5E. The element identification module 302 includes the element matching module 400 of FIG. 6A and the element grouping module 402 of FIG. 6A. The interpretation module 304 includes the grouping matching module 404 of FIG. 6A and the grouping interpretation module 406 of FIG. 6A. Generally, an embodiment of the invention presents solutions where the computing system 10 supports optimizing knowledge extraction from content.

In an example of operation of the optimizing of the knowledge extraction, when matching elements of received formatted content 314, the element matching module 400 generates matched elements 412. The generating includes one or more of matching a received element to an element of an element list 332. The element list 332 further includes identification of one or more objects, verbs, and adjectives, and outputs the matched elements 412 to include an identifier of the matched element.

The element grouping module 402 analyzes the matched elements 412 in accordance with element rules 318, where the element rules 318 further includes workgroup permutation rules, to produce identified element information 340 when a favorable word grouping is associated with the matched elements 412 in accordance with the element rules 318, and produces grouping information 780. The grouping information 780 includes identified valid and/or invalid word groupings based on listen rules, permutations of possible word grouping meanings based on a predicted domain, and intermediate grouping, an adjective skipping rule, etc. The analyzing includes comparing the matched elements 412 with word group permutation rules of the element rules 318 and extracting possible word group meanings from the element rules 318.

The grouping matching module 404 analyzes the identified element information 340 and grouping information 780 in accordance with a grouping list 334 to produce validated groupings information 416. The producing includes comparing a groupings aspect of the identified element information 340 in light of the grouping information 780 (e.g., for each permutation of groups of elements of possible interpretations). The producing further includes generating the validated groupings information 416 to include identification of valid permutations that align with a groupings list in light of the grouping information 780 (e.g., eliminate in valid permutations right away that are inconsistent with domain, contacts, etc.).

The grouping interpretation module 406 interprets the validated groupings information 416 based on question information 346 and in accordance with the interpretation rules 320 to produce interpreted information 344 (e.g., most likely interpretations, next likely interpretations, etc.). The producing may be based on the plurality of possible meanings of the word grouping, pruning the plurality of possible meanings based on the interpretation rules 320 in light of other words of the validated groupings information 416 (e.g., eliminate a meaning when the word grouping does not align with other aspects as indicated by the grouping information 780). The interpreting further includes outputting and interpretation of the word grouping that includes a meaning of a word group that survives the pruning.

Figure 12B:
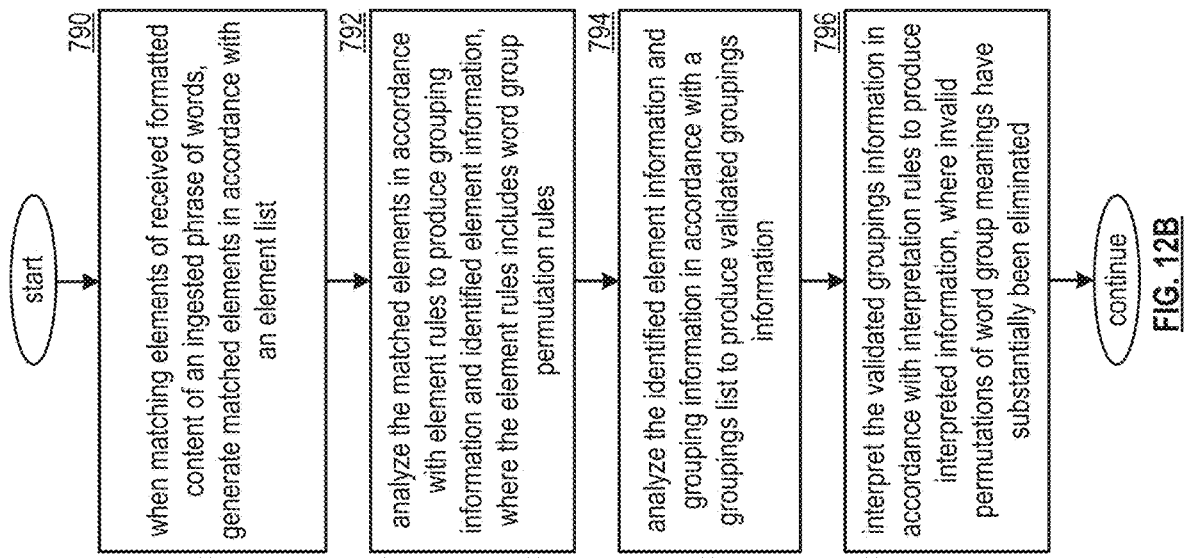
FIG. 12B is a logic diagram of an embodiment of a method for optimizing knowledge extraction within a computing system in accordance with the present invention.

FIG. 12B is a logic diagram of an embodiment of a method for optimizing knowledge extraction within a computing system. In particular, a method is presented for use in conjunction with one or more functions and features described in conjunction with FIGS. 1-8D, 12A, and also FIG. 12B. The method includes step 790 where a processing module of one or more processing modules of one or more computing devices of the computing system, when matching elements of received formatted content of an ingested phrase of words, generates matched elements in accordance with an element list. The element list may further include identification of one or more objects, verbs, adjectives. The generating may further include outputting the matched elements to include an identifier of each matched element.

The method continues at step 792 where the processing module analyzes the matched elements in accordance with element rules to produce grouping information and identified element information, where the element rules includes workgroup permutation rules. The analyzing includes comparing matched elements with word group permutation rules of the element rules, extracting possible word group meanings from the element rules based on one or more of a predicted domain, an intermediate grouping, and an adjective skipping rule, etc.

The method continues at step 794 where the processing module analyzes the identified element information and grouping information in accordance with a groupings list to produce validated groupings information. The analyzing includes one or more of comparing a groupings aspect of the identified element information in light of the grouping information (e.g., for each permutation of groups of elements of possible interpretations) and generating the validated groupings information to include identification of valid permutations that align with the groupings list in light of the grouping information (e.g., eliminate in valid permutations right away that are inconsistent with one or more of a domain, a context, etc.).

The method continues at step 796 where the processing module interprets the validated groupings information in accordance with interpretation rules to produce interpreted information, where invalid permutations of word group meanings have substantially been eliminated. For example, the processing module, based on the plurality of possible meanings of a given workgroup, prunes the plurality of possible meanings based on the interpretation rules in light of other words of the validated groupings information of the phrase (e.g., eliminate a meaning when the word grouping does not align with other aspects as indicated by the grouping information). The processing module outputs and interpretation of the phrase that includes a meaning of the word group that survives the pruning.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 13A:
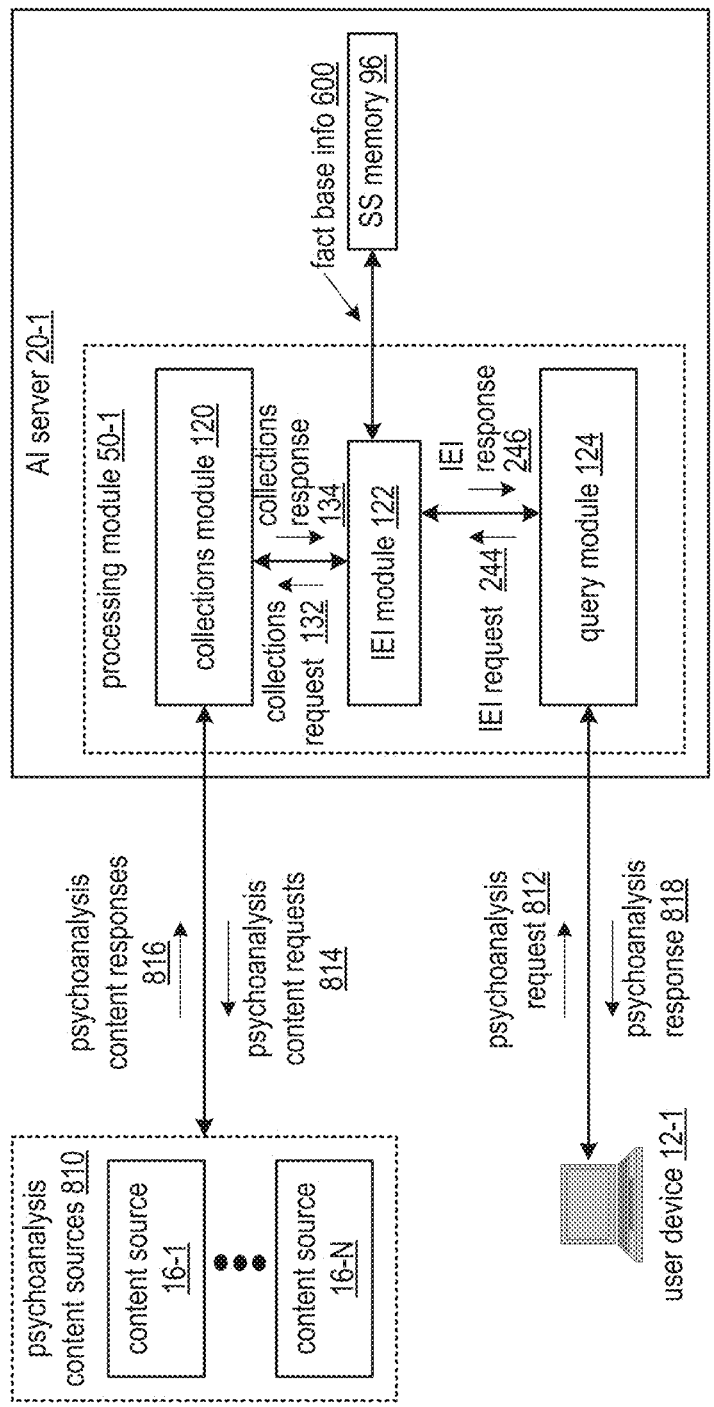
FIG. 13A is a schematic block diagram of another embodiment of a computing system in accordance with the present invention.

FIG. 13A is a schematic block diagram of another embodiment of a computing system that includes psychoanalysis content sources 810, the AI server 20-1 of FIG. 1, and the user device 12-1 of FIG. 1. The psychoanalysis content sources 810 includes the content sources 16-1 through 16-N of FIG. 1 and provides content generated, or retrieved, in response to one or more psychoanalysis content request 814 in accordance with a psychoanalysis response generating approach, where the content includes one or more of psychoanalysis test results, psychoanalysis profiles, previous psychoanalysis diagnostic information, and psychoanalysis data for an individual. The AI server 20-1 includes the processing module 50-1 of FIG. 2 and the SS memory 96 of FIG. 2. The processing module 50-1 includes the collections module 120 of FIG. 4A, the IEI module 122 of FIG. 4A, and the query module 124 of FIG. 4A. Generally, an embodiment of the invention presents solutions where the computing system 10 supports performing an analysis.

In an example of operation of the performing of the analysis, the IEI module 122 identifies required psychoanalysis content (e.g., psychoanalysis test results, profiles, previous diagnostic information, data by group, data by individual, particular psychoanalysis analysis content source information) to provide a psychoanalysis response 818 to the user device 12-1 in response to a psychoanalysis request 812. The request includes one or more of general psychoanalysis data, specific psychoanalysis data, likelihood of factual statements, psychoanalysis questions, etc.). For example, the identifying includes interpreting an IEI request 244 from the query module 124, where the query module 124 receives the psychoanalysis request 812 from the user device 12-1, identifying a diagnostic type based on the request and a list from the fact base 600, and alternatively performing pre-IEI processing on a data sample of the psychoanalysis request 812 to identify a diagnostic aspect associated with the required psychoanalysis content.

The IEI module 122 facilitates collection of the required psychoanalysis content to generate further knowledge. The facilitating includes causing one or more content collection cycles, where each cycle includes the IEI module 122 issuing a collections request 132 to the collections module 120. The request indicates one or more of a content type, a content source, information with regards to the required psychoanalysis content.

The collections module 120 facilitates one or more psychoanalysis content collection cycles, where each cycle includes issuing one or more psychoanalysis content request 814 to the one or more content sources 16-1 through 16-N of the psychoanalysis content sources 810 to cause receiving of psychoanalysis content responses 816. One or more of the content sources dynamically generates content of the psychoanalysis content responses 816 based on locally prestored content and a psychoanalysis content response generating approach.

The collections module 120 issues a collections response 134 to the IEI module 122 (e.g., an aggregate of psychoanalysis content) when favorable psychoanalysis content has been collected. Favorable content is detected when a goal of a content collection cycle has been met, a number of content sources have been queried, a sufficient volume of a criminal content has been collected, one or more mandatory content sources have provided a terminal content, etc.

The IEI module 122 IEI processes the psychoanalysis content of the collections response 134 in accordance with the psychoanalysis request 812 to produce further knowledge for storage as fact base information 600 and the SS memory 96. For example, the IEI processing includes interpreting human expressions to produce identigen groupings for each word of the content, applying rules to identify a unique entigen for each identigen grouping, and comparing resulting groupings of entigens to knowledge of the fact base info 600 to provide the further knowledge.

The IEI module 122 issues, in accordance with the psychoanalysis request 812, an IEI response 246 to the query module 124, where the IEI module 122 generates the IEI response 246 to include a response to the psychoanalysis request 812 based on the further knowledge of the knowledge base. The query module 124 issues the psychoanalysis response 818 to the user device 12-1. The query module 124 generates the psychoanalysis response 818 to include at least some of the IEI response 246.

Figure 13B:
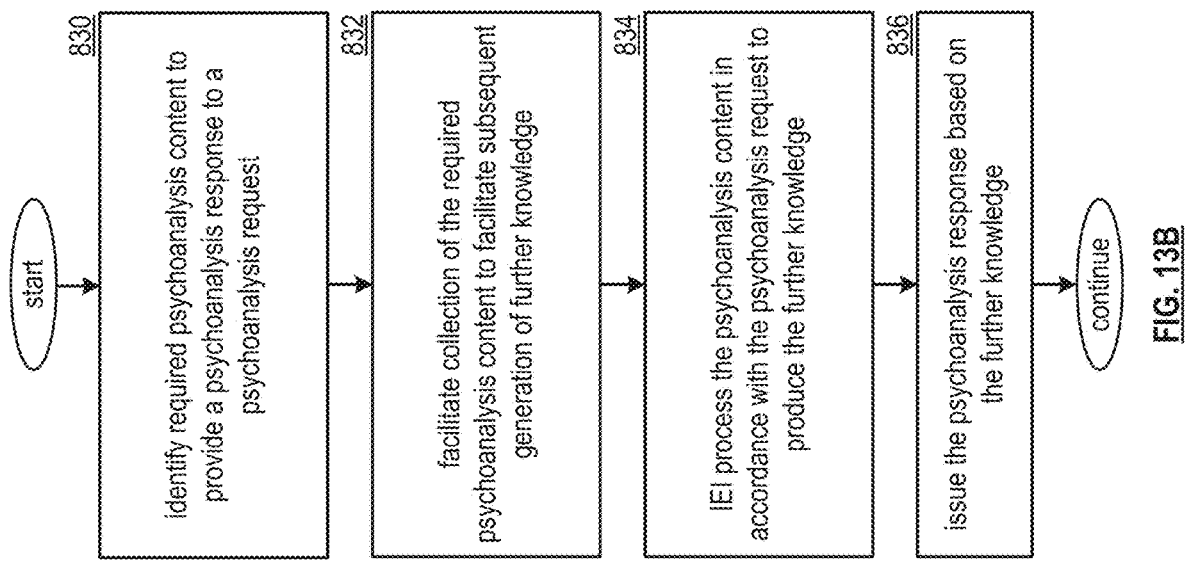
FIG. 13B is a logic diagram of an embodiment of a method for performing an analysis within a computing system in accordance with the present invention.

FIG. 13B is a logic diagram of an embodiment of a method for performing an analysis within a computing system. In particular, a method is presented for use in conjunction with one or more functions and features described in conjunction with FIGS. 1-8D, 13A, and also FIG. 13B. The method includes step 830 where a processing module of one or more processing modules of one or more computing devices of the computing system identifies required psychoanalysis content to provide a psychoanalysis response to a psychoanalysis request. The identifying includes one or more of interpreting the psychoanalysis request, identifying a diagnostic type based on the request and a list from a knowledge base, and alternatively performing pre-IEI processing on a data sample of the psychoanalysis request to identify a diagnostic aspect associated with the required psychoanalysis content.

The method continues at step 832 where the processing module facilitates collection of the required psychoanalysis content to facilitate subsequent generation of further knowledge. As an example of the facilitating, the processing module causes one or more content collection cycles, where each cycle includes issuing a collections request. The request indicates one or more of a content type, a content source, information with regards to the required psychoanalysis content, and to facilitate one or more psychoanalysis content collection cycles.

Each cycle includes issuing one or more psychoanalysis content requests to one or more content sources of psychoanalysis content to cause receiving of psychoanalysis content responses. One or more of the content sources dynamically generates content of the psychoanalysis content responses based on locally prestored content and a psychoanalysis content response generating approach. The processing module further causes issuing of a collections response when favorable psychoanalysis content has been collected (e.g., a goal of a content collection cycle has been met, in number of content sources have been query, a sufficient number of incremental content has been collected, one or more mandatory content sources have provided a criminal content, etc.).

The method continues at step 834 where the processing module IEI processes the psychoanalysis content in accordance with the psychoanalysis request to produce the further knowledge. For example, the processing module processes the content to determine meaning and store the knowledge associated with the meaning in the knowledge base. As another example, the IEI processing includes interpreting human expressions to produce identigen groupings for each word of the content, applying rules to identify a unique entigen for each identigen grouping, and comparing resulting groupings of entigens to knowledge of the knowledge base to provide the further knowledge.

The method continues at step 836 where the processing module issues the psychoanalysis response based on the further knowledge. For example, the processing module generates the response based on responding to one or more aspects of the psychoanalysis request and sends the psychoanalysis response to a requesting entity.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 14A:
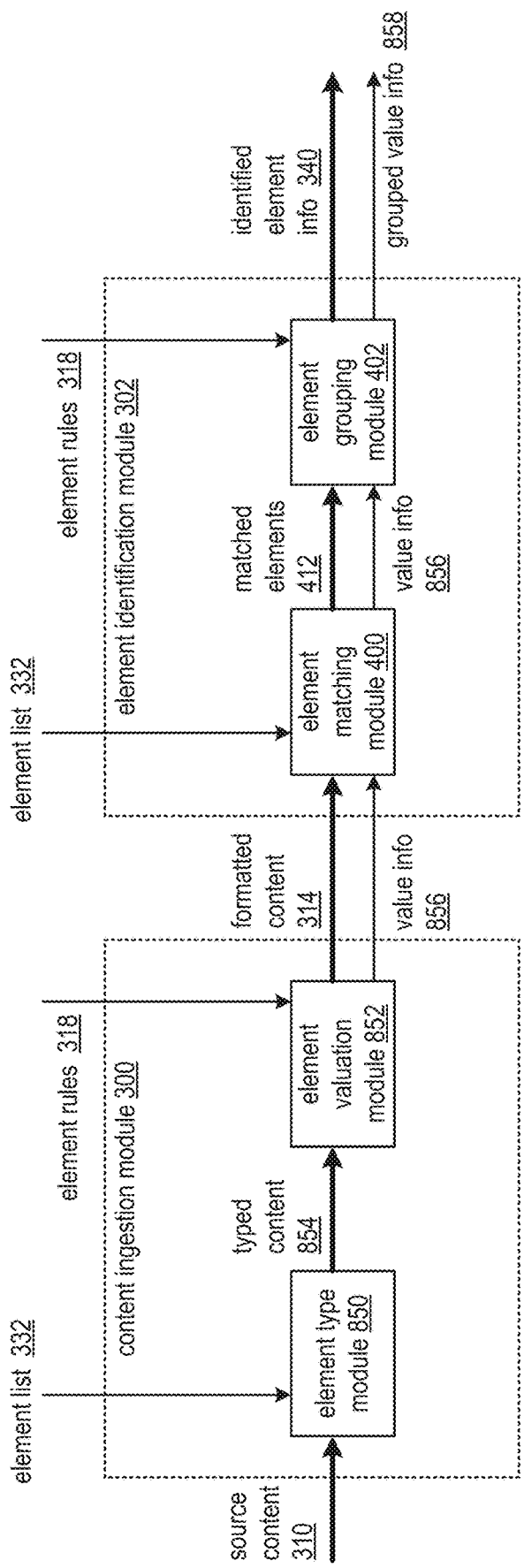
FIG. 14A is a schematic block diagram of another embodiment of a computing system in accordance with the present invention.

FIG. 14A is a schematic block diagram of another embodiment of a computing system that includes the content ingestion module 300 of FIG. 5E and the element identification module 302 of FIG. 5E. The content ingestion module 300 includes an element type module 850 and an element valuation module 852. The element identification module 302 includes the element matching module 400 of FIG. 6A and the element grouping module 402 of FIG. 6A. Generally, an embodiment of the invention presents solutions where the computing system 10 supports representing numbers in a knowledge base.

In an example of operation of the representing of the numbers, the element type module 850 analyzes source content 310 in accordance with an element list 332 to produce typed content 854. The element list 332 includes numbers types and the typed content 854 includes a type indicator (e.g., textual representations: text characters, word symbols, text groups; numeric representations: numeric digits, numeric words, numeric symbols, numeric groups). The analyzing includes comparing elements of the source content 310 to element type indicators of the element list 332 and indicating a numeric representation when a favorable match occurs for a numerical type indicator of the element list 332.

The element valuation module 852 interprets the typed content 854 in accordance with element rules 318 to produce formatted content 314 and to produce value information 856. The value information 856 includes possible values of identified numbers contained in identified character sets of the source content 310 and the element rules 318 includes numbers valuation rules. As an example of the interpreting, the element valuation module 852 indicates a possible value when a numerical character set is recognized and compares favorably with the numbers valuation rules of the element rules 318.

The element matching module 400 interprets the formatted content 314 in accordance with the element list 332 and the value information 856 to produce matched elements 412. As an example of the interpreting, the element matching module 400 generates the matched elements 412 using a favorable numbers list of the element list 332 that are identified within the formatted content 314 commensurate with the value information 856 for a valid representation of numbers.

The element grouping module 402 analyzes permutations of words of the matched elements 412 in accordance with the element rules 318 and the value information 856 to produce identified element information 340 and grouped value information 858. The grouped value information 858 includes values of numbers contained in identified valid and/or invalid word groupings based on the rules and permutations of possible word groupings based on numbers values. The element rules 318 includes numbers groupings rules. As an example of analyzing, the element grouping module 402, of a plurality of possible limitations of workgroups of the matched elements 412, identifies a subset of most valid identified workgroups where the value information 856 compares favorably to valid numerics in accordance with the numbers groupings rules of the element rules 318.

Figure 14B:
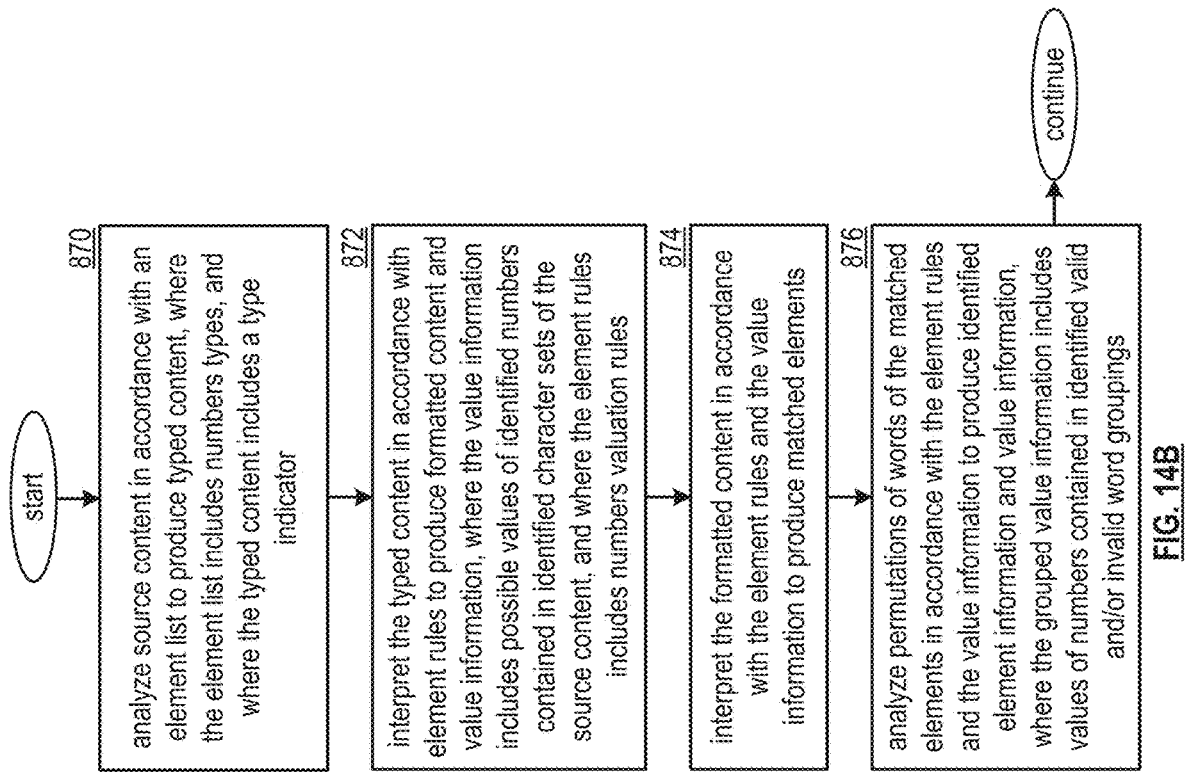
FIG. 14B is a logic diagram of an embodiment of a method for representing numbers in a knowledge base within a computing system in accordance with the present invention.

FIG. 14B is a logic diagram of an embodiment of a method for representing numbers in a knowledge base within a computing system. In particular, a method is presented for use in conjunction with one or more functions and features described in conjunction with FIGS. 1-8D, 14A, and also FIG. 14B. The method includes step 870 where a processing module of one or more processing modules of one or more computing devices of the computing system analyzes source content in accordance with an element list to produce typed content, where the element list includes numbers types, and where the typed content includes a type indicator. For example, the processing module compares elements of the source content to element type indicators of the element list and indicates a numeric representation when a favorable match occurs for a numerical type indicator of the element list.

The method continues at step 872 where the processing module interprets the typed content in accordance with element rules to produce formatted content and value information, where the value information includes possible values of identified numbers contained in identified character sets of the source content, and where the element rules includes numbers valuation rules. For example, the processing module indicates a possible value when a numerical character set is recognized in accordance with the numbers valuation rules.

The method continues at step 874 where the processing module interprets the formatted content in accordance with the element rules and the value information to produce matched elements. For example, the processing module generates the matched elements when a favorable numbers list of the element rules is identified within the formatted content commensurate with the value information for a valid representation of numbers.

The method continues at step 876 where the processing module analyzes permutations of words of the matched elements in accordance with the element rules and the value information to produce identified element information and value information. The grouped value information includes values of numbers contained in identified valid and/or invalid word groupings. The values of the numbers contained in the identified valid and/or invalid word groupings may be based on the element rules and for permutations of possible word groupings based on number values.

The element rules include numbers groupings rules. For example, the processing module identifies, for a plurality of possible permutations of word groups of the matched elements, a subset of most valid identified word groups. The value information compares favorably to valid numerics in accordance with the numbers groupings rules of the element rules.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 15A:
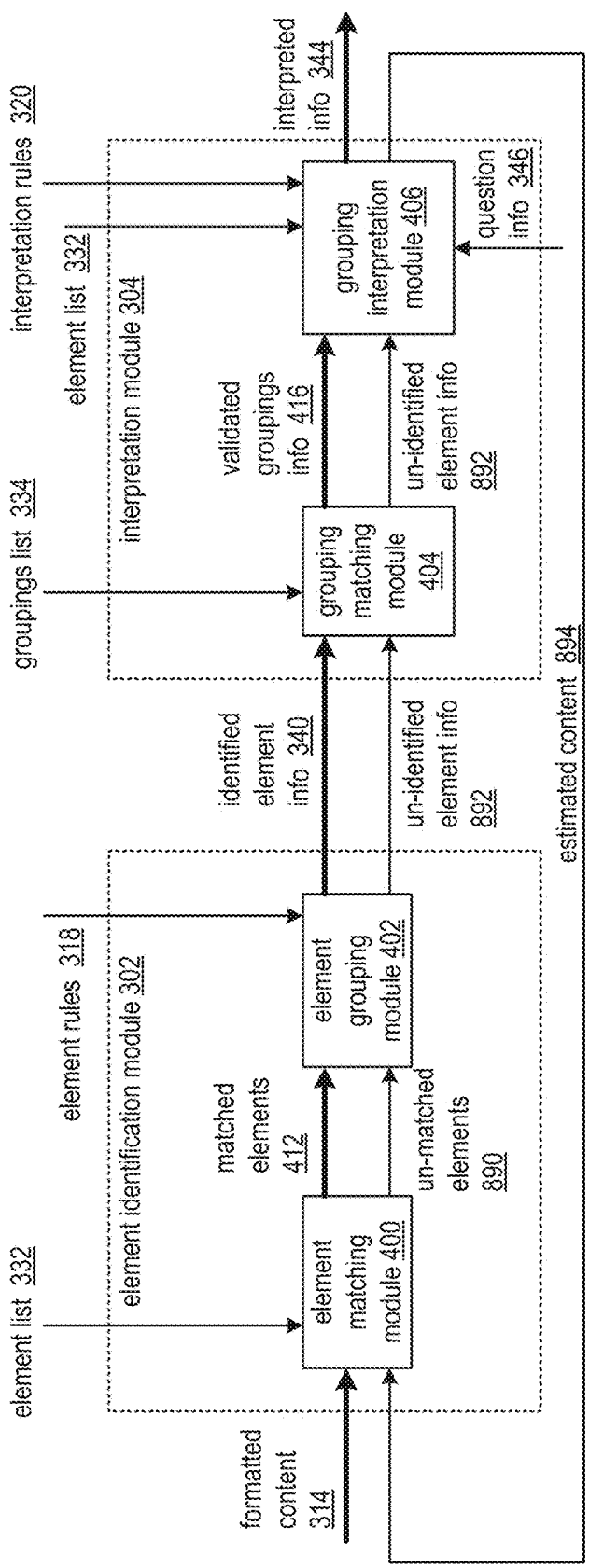
FIG. 15A is a schematic block diagram of another embodiment of a computing system in accordance with the present invention.

FIG. 15A is a schematic block diagram of another embodiment of a computing system that includes the element identification module 302 of FIG. 5E and the interpretation module 304 of FIG. 5E. The element identification module 302 includes the element matching module 400 of FIG. 6A and the element grouping module 402 of FIG. 6A. The interpretation module 304 includes the grouping matching module 404 of FIG. 6A and the grouping interpretation module 406 of FIG. 6A. Generally, an embodiment of the invention presents solutions where the computing system 10 supports processing an unknown word.

In an example of operation of the processing of the unknown word, the element matching module 400 analyzes formatted content 314 in accordance with an element list 332 to produce matched elements 412 when matching words of the formatted content 314 to words of the element list 332 and further produces un-matched elements 890 when a word of the formatted content 314 does not match any of the words of the element list 332. As an example of analyzing, the element matching module 400 generates the un-matched elements 890 to include the unmatched word when the word of the formatted content 314 does not match the words of the element list 332.

The element grouping module 402 analyzes the matched elements 412 in accordance with element rules 318 to produce identified element information 340 with regards to the matched words and further produces un-identified element information 892 for each of the unmatched words. The analyzing includes, for an un-matched word, generating the un-identified element information 892 to include one or more of an object identifier, a characteristic type identifier, and an action type identifier (e.g., where each type identifier is a temporary identifier for a subsequent narrowing to just one type).

The grouping matching module 404 analyzes the identified element information 340 in accordance with a groupings list 334 and the un-identified element information 892 to produce validated groupings information 416 associated with potentially valid groupings of known and one or more unknown words. The analyzing includes one or more of generating the validated groupings information 416 to include potentially valid permutations of word groupings, where each permutation is associated with just one of the object, the characteristic, and the action type of each unknown word.

The grouping interpretation module 406 analyzes the validated groupings information 416 in accordance with interpretation rules 320, the element list 332, the un-identified element information 892, and question information 346 to produce estimated content 894 when interpreting the word grouping utilizing an estimated word from the element list 332 in place of an unknown word. When interpreting the word grouping of known words (e.g., a second pass), the grouping interpretation module 406 outputs interpreted information 344 that includes an interpretation of a word grouping where every unknown word has been replaced with a known word. Alternatively, or in addition to, the grouping interpretation module 406 requests user input to decide on a choice between two or more words for an unknown word when a quality level of reducing a number of estimated words is below a quality threshold level.

Figure 15B:
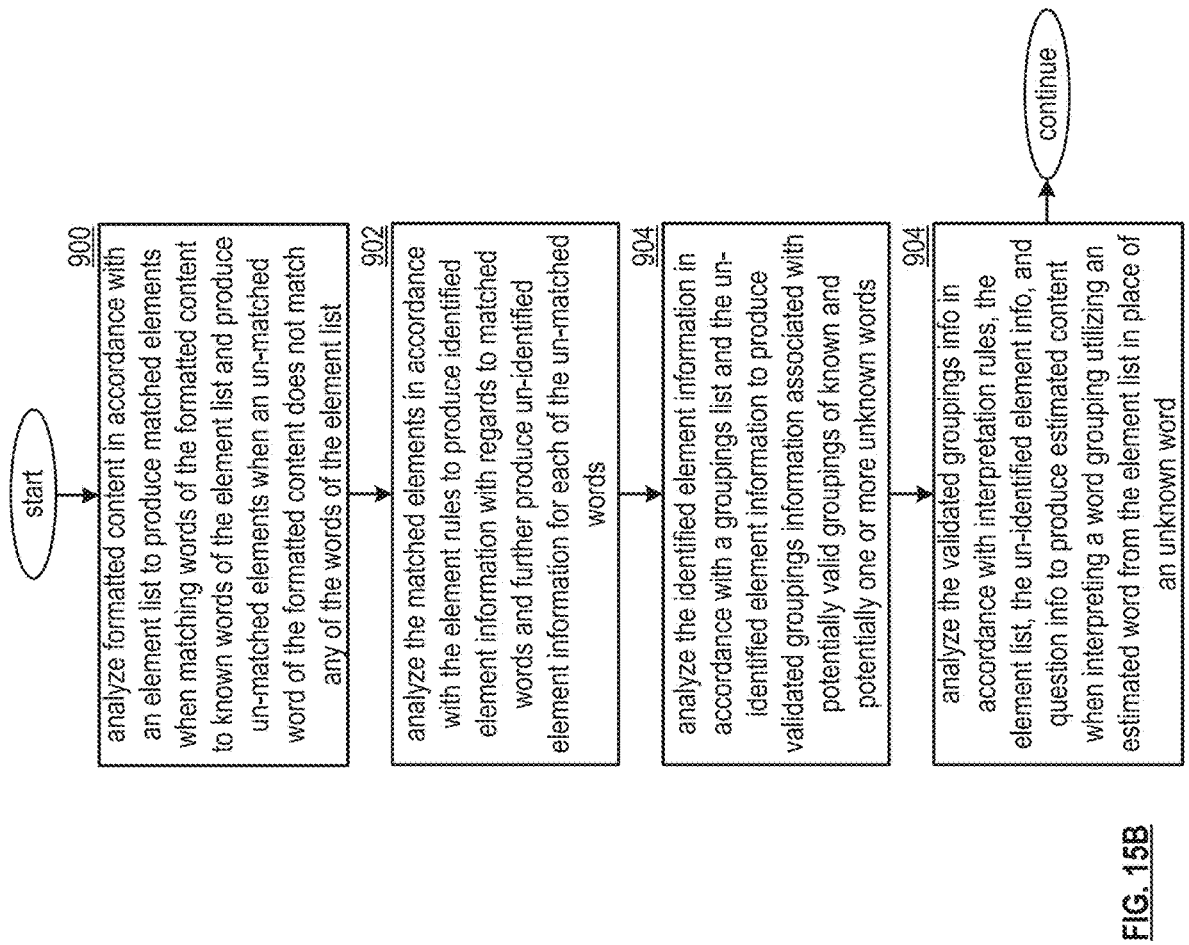
FIG. 15B is a logic diagram of an embodiment of a method for processing an unknown word within a computing system in accordance with the present invention.

FIG. 15B is a logic diagram of an embodiment of a method for processing an unknown word within a computing system. In particular, a method is presented for use in conjunction with one or more functions and features described in conjunction with FIGS. 1-8D, 15A, and also FIG. 15B. The method includes step 900 where a processing module of one or more processing modules of one or more computing devices of the computing system analyzes formatted content in accordance with an element list to produce matched elements when matching words of the formatted content to known words of the element list and produces un-matched elements when an un-matched word of the formatted content does not match any of the words of the element list. The analyzing includes, when a word does not match, generating the un-matched elements to include the unmatched word.

The method continues at step 902 where the processing module analyzes the matched elements in accordance with the element rules to produce identified element information with regards to matched words and further produces un-identified element information for each of the un-matched words. The analyzing includes, for an un-matched word, generating the un-identified element information to include one of an object type identifier, a characteristic type identifier, and an action type identifier (e.g., where each type identifier is a temporary identifier for subsequent narrowing to just one type).

The method continues at step 904 where the processing module analyzes the identified element information in accordance with a groupings list and the un-identified element information to produce validated groupings information associated with potentially valid groupings of known and potentially one or more unknown words. The analyzing includes generating the validated groupings information to include potentially valid presentations of word groupings. Each permutation is associated with just one of the object type identifier, the characteristic type identifier, and the action type identifier of each unknown word.

The method continues at step 904 where the processing module analyzes the validated groupings information in accordance with interpretation rules, the element list, the un-identified element information, and question information to produce estimated content when interpreting a word grouping utilizing an estimated word from the element list in place of an unknown word. The analyzing includes, when interpreting the word grouping of known words (e.g., a second pass, outputting interpreted information that includes an interpretation of a word grouping where every unknown word has been replaced with a known word. Alternatively, or in addition to, the processing module obtains user input to select between two or more words for an unknown word when a quality level of production of possible valid words is below a quality threshold level.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 16A:
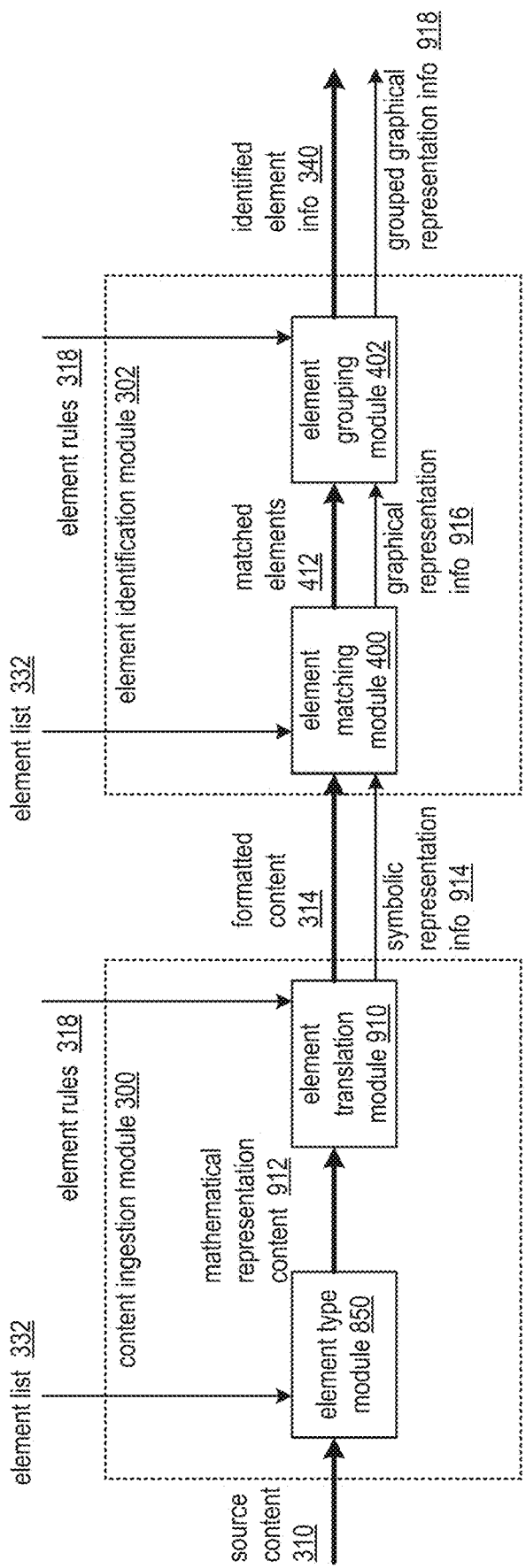
FIG. 16A is a schematic block diagram of another embodiment of a computing system in accordance with the present invention.

FIG. 16A is a schematic block diagram of another embodiment of a computing system that includes the content ingestion module 300 of FIG. 5E and the element identification module 302 of FIG. 5E. The content ingestion module 300 includes the element type module 850 of FIG. 14A and an element translation module 910. The element identification module 302 includes the element matching module 400 of FIG. 6A and the element grouping module 402 of FIG. 6A. Generally, an embodiment of the invention presents solutions where the computing system 10 supports representing mathematical symbols.

In an example of operation of the representing of the mathematical symbols, the element type module 850 analyzes source content 310 in accordance with an element list 332 to produce mathematical representation content 912. The element list 332 includes mathematical representation types. The mathematical representation content 912 includes a portion of the source content that includes mathematical representations and an indicator for the mathematical representations (e.g., mathematical symbols). The analyzing includes comparing elements of the source content 310 to element type indicators of the element list 332 and indicating a mathematical representation when a favorable match occurs for a mathematical representation type indicator of the element list 332.

The element translation module 910 interprets the mathematical representation content 912 in accordance with element rules 318 to produce formatted content 314 and symbolic representation information 914. The symbolic representation information 914 includes mathematical representations including one or more of characters, formulas, variables, constants, etc. in identified character sets of the source content 310. The element rules 318 includes mathematical representation rules.

The element matching module 400 interprets the formatted content 314 in accordance with the element list 332 and the symbolic representation information 914 to produce matched elements 412 and graphical representation information 916. As an example of the interpreting, the matched elements 412 are generated when a mathematical representations list of the element list 332 is identified within the formatted content 314 commensurate with the symbolic representation information 914 for a valid representation of mathematical representations and generates the graphical representation information 916 to include candidate textual representations of the mathematical representations of the symbolic representation information 914 (e.g., 3=three, +=plus, etc.).

The element grouping module 402 analyzes permutations of words of the matched elements 412 in accordance with the element rules 318 and the graphical representation information 916 to produce identified element information 340 and grouped graphical representation information 918. The group graphical representation information 918 includes group textual representations of the mathematical recitations in identified valid and/or invalid word groupings based on the listed rules and permutations of possible word groupings.

The element rules 318 includes mathematical representation grouping rules. As an example of analyzing, the element grouping module 402 identifies, for a plurality of permutations of possible word groupings, a subset of most valid identified word groups where the group graphical representation information 918 compares favorably to valid mathematical representations in accordance with the mathematical representation groupings rules of the element rules 318.

Figure 16B:
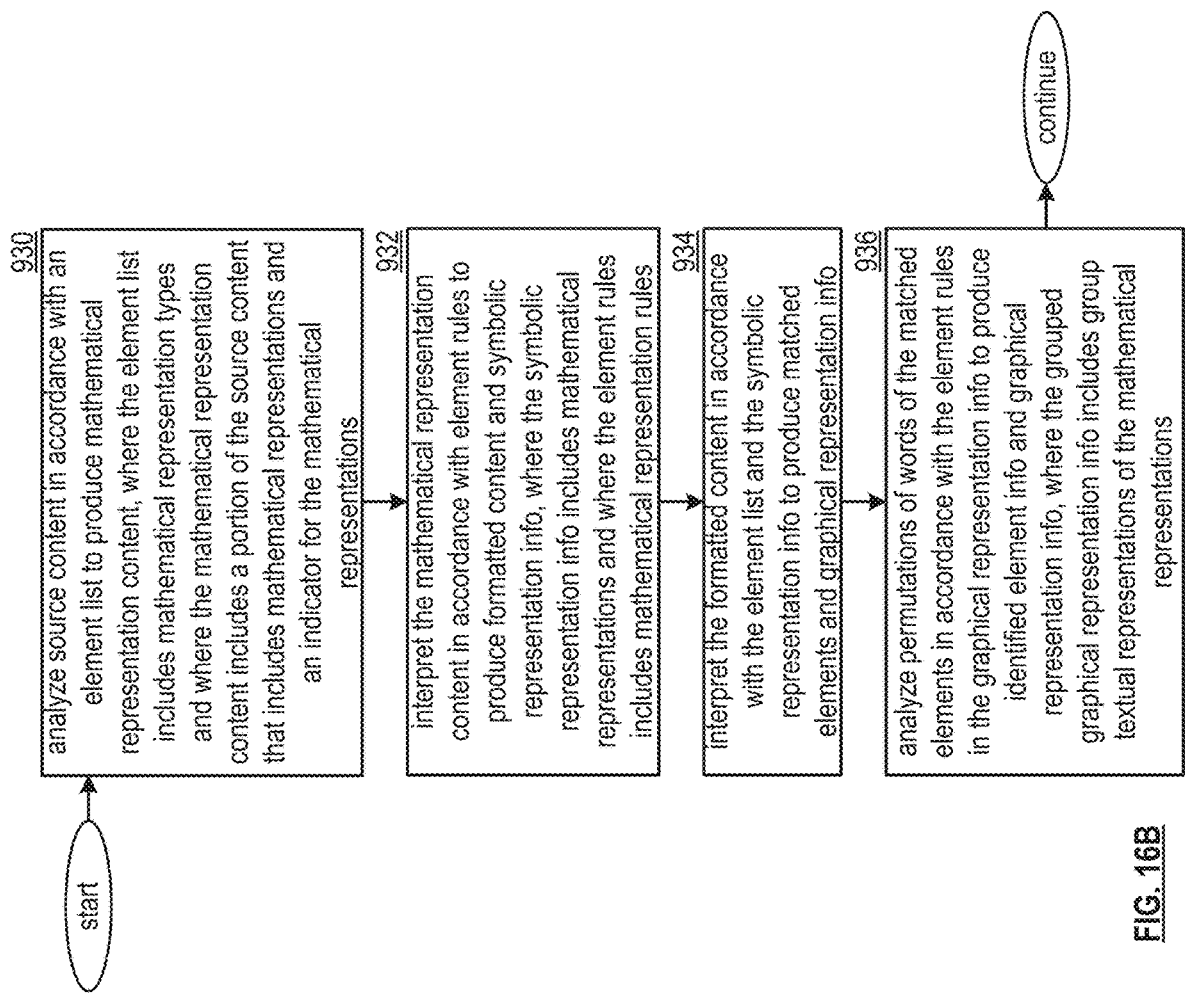
FIG. 16B is a logic diagram of an embodiment of a method for representing mathematical symbols within a computing system in accordance with the present invention.

FIG. 16B is a logic diagram of an embodiment of a method for representing mathematical symbols within a computing system. In particular, a method is presented for use in conjunction with one or more functions and features described in conjunction with FIGS. 1-8D, 16A, and also FIG. 16B. The method includes step 930 where a processing module of one or more processing modules of one or more computing devices of the computing system analyzes source content in accordance with an element list to produce mathematical representation content, where the element list includes mathematical representation types and where the mathematical representation content includes a portion of the source content that includes mathematical representations and an indicator for the mathematical representations. For example, the processing module compares elements of the source content to element type indicators of the element list and indicates a mathematical representation when a favorable match occurs for a mathematical representation type indicator of the element list.

The method continues at step 932 where the processing module interprets the mathematical representation content in accordance with element rules to produce formatted content and symbolic representation information. The symbolic representation information includes mathematical representations and where the element rules includes mathematical representation rules. For example, the processing module indicates a symbolic representation when a mathematical representation character set is recognized and is in favorable accordance with mathematical representation rules of the element rules.

The method continues at step 934 where the processing module interprets the formatted content in accordance with the element list and the symbolic representation information to produce matched elements and graphical representation information. For example, the processing module generates the matched elements when a mathematical representations list of the element list is identified within the formatted content commensurate with the symbolic representation information for a valid representation of mathematical representations and generates the graphical representation information to include candidate textual representations of the mathematical representations of the symbolic representation information (e.g., 3=three, +=plus, etc.).

The method continues at step 936 where the processing module analyzes permutations of words of the matched elements in accordance with the element rules in the graphical representation information to produce identified element information and graphical representation information. The grouped graphical representation information includes group textual representations of the mathematical representations.

The group textual representations may be identified as a valid and/or invalid word groupings based on the listed rules and permutations of possible word groupings, where the element rules includes mathematical representation grouping rules. As another example, of a plurality of possible permutations of word groups of the matched elements, the processing module identifies a subset of the most identified word groups where the group graphical representation information compares favorably to valid mathematical representations in accordance with the mathematical representations grouping rules of the element rules.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 17A:
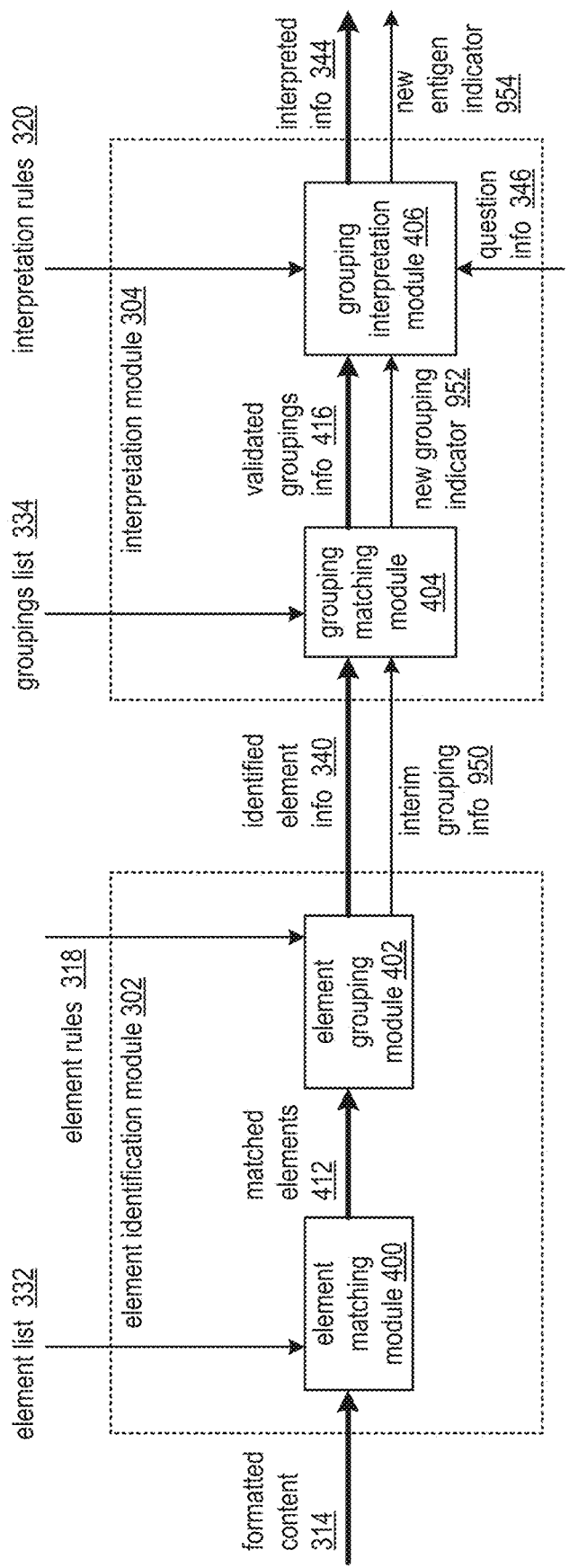
FIG. 17A is a schematic block diagram of another embodiment of a content ingestion module within a computing system in accordance with the present invention.

FIG. 17A is a schematic block diagram of another embodiment of a content ingestion module within a computing system that includes the element identification module 302 of FIG. 5E and the interpretation module 304 of FIG. 5E. The element identification module 302 includes the element matching module 400 of FIG. 6A and the element grouping module 402 of FIG. 6A. The interpretation module 304 includes the grouping matching module 404 of FIG. 6A and the grouping interpretation module 406 of FIG. 6A. Generally, an embodiment of the invention presents solutions where the computing system 10 supports facilitating subsequent rapid phrase detection.

In an example of operation of the facilitating of the subsequent rapid phrase detection, the element matching module 400 and interprets formatted content 314 to produce matched elements 412. The matched elements 412 includes a workgroup of a group of known words. The generating includes matching a received element to an element of an element list 332. The element list 332 further includes identification of known words and one or more identigens per word. The matched elements 412 further includes an identifier of each matched element.

The element grouping module 402 analyzes the matched elements 412 in accordance with element rules 318, that further includes word group rules, to produce identified element information 341. A favorable word grouping is associated with the matched elements in accordance with the element rules 318 producing interim grouping information 950. The interim grouping information 950 includes identity of valid words of the word grouping based on lists and rules, permutations of possible word grouping meanings based on one or more of a predicted domain, an intermediate grouping, an adjective skipping rule, a source of content a topic, a pending question, etc.

The grouping matching module 404 analyzes the identified element information 340 and the interim grouping information 950 in accordance with the groupings list 334 to produce validated groupings information 416 and a new grouping indicator 952. The new grouping indicator 952 includes an entigen for each word of the word group. The producing includes one or more of comparing a groupings aspect of the identified element information 340 in light of the interim grouping information 950 (e.g., for each permutation of groups of elements of possible interpretations). The producing further includes generating the validated groupings information 416 to include identification of valid permutations that align with the groupings list in light of the interim grouping information 950 (e.g., eliminate invalid permutations right away when inconsistent with one or more of domain, context, etc.). The grouping matching module 404 further produces a new grouping indicator 952 for the word group that does not have a single entigen assigned per the groupings list 334.

The grouping interpretation module 406 interprets the validated groupings information 416 and the new grouping indicator 952 based on question information 346 and in accordance with interpretation rules 320 to produce interpreted information 344 (e.g., most likely interpretations, next likely interpretations, etc.) and to produce a new entigen indicator 954. The new entigen indicator 954 includes words of the word group, entigens of the words, and a newly assigned entigen for the group of entigens. The producing may be based on the plurality of possible meanings and a pruning of a plurality of possible meanings based on the interpretation rules 320 in light of other words of the validated groupings information 416 of the word group to produce a meaning and generating the new entigen when the word group as a valid deterministic meaning.

FIG. 17B is a logic diagram of an embodiment of a method for facilitating subsequent rapid phrase detection within a computing system. In particular, a method is presented for use in conjunction with one or more functions and features described in conjunction with FIGS. 1-8D, 17A, and also FIG. 17B. The method includes step 960 where a processing module of one or more processing modules of one or more computing devices of the computing system interprets formatted content to produce matched elements, where the matched elements include a word group of a group of known words. The generating includes matching a received element to an element of an element list, where the element list further includes identification of known words and one or more identigens per word, and outputting the matched elements to include an identifier of each matched element.

The method continues at step 962 where the processing module analyzes the matched elements in accordance with element rules to produce identified element information and interim grouping information when favorable word grouping is associated with the matched elements in accordance with element rules. For example, the processing module identifies valid words of the word grouping based on the element rules and the element list to produce the interim grouping information to include the identified valid words based on one or more of a predicted domain, an intermediate grouping, an adjective skipping rule, a source topic, a pending question, etc. As another example, the processing module compares matched elements with word group rules of the element rules to extract possible word group meetings from the element rules and identifies the words of the word group and for each word, identifies candidate identigens. At least one identigen is also an entigen when the associated word is considered a part of the word group.

The method continues at step 964 where the processing module analyzes the identified element information and the interim grouping information in accordance with a groupings list to produce validated groupings information and a new grouping indicator. The new grouping indicator includes an entigen for each word of the word group. The analyzing includes comparing a groupings aspect of the identified element information in light of the grouping information (e.g., for each permutation of groups of elements of possible interpretations).

The analyzing further includes generating the validated groupings information to include identification of valid permutations that align with the groupings list in light of the interim grouping information (e.g., eliminate invalid permutations right away that are inconsistent with one or more of domain, context, etc.). The processing module further produces a new grouping indicator for the word group that does not have a single entigen assigned per the groupings list.

The method continues at step 966 where the processing module interprets the validated groupings information and the new grouping indicator in accordance with interpretation rules to produce interpreted information and a new entigen indicator. The new entigen indicator includes a group of entigens of the words of the word group and a newly assigned entigen for the group of entigens. The producing includes, based on the plurality of possible meanings, pruning a plurality of possible meanings based on the interpretation rules in light of other words of the validated groupings information of the word group to produce a meaning and generating the new entigen when the word group as a valid deterministic meaning.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

Figure 18A:
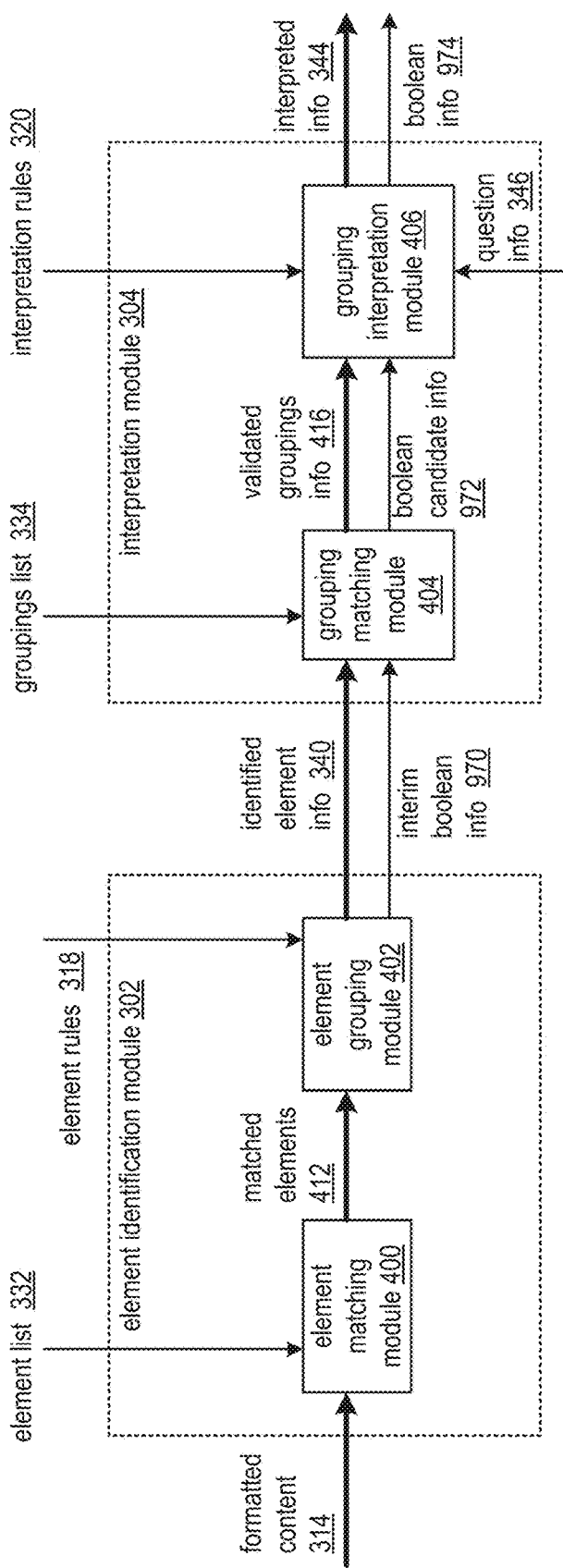
FIG. 18A is a schematic block diagram of another embodiment of an interpretation module within a computing system in accordance with the present invention.

FIG. 18A is a schematic block diagram of another embodiment of an interpretation module within a computing system that includes the element identification module 302 of FIG. 5E and the interpretation module 304 of FIG. 5E. The element identification module 302 includes the element matching module 400 of FIG. 6A and the element grouping module 402 of FIG. 6A. The interpretation module 304 includes the grouping matching module 404 of FIG. 6A and the grouping interpretation module 406 of FIG. 6A. Generally, an embodiment of the invention presents solutions where the computing system 10 supports representing a Boolean expression.

In an example of operation of the representing of the Boolean expression, the element matching module 400 interprets formatted content 314 to produce matched elements 412, where the matched elements 412 includes a Boolean expression of known words. The generating includes matching a received element to an element of an element list 332, where the element list 332 further includes identification of known words of Boolean expressions and one or more identigens per word, and outputting the matched elements 412 to includes an identifier of each matched element.

The element grouping module 402 analyzes the matched elements 412 in accordance with element rules 318. The element rules 318 further include word Boolean structure rules. The element grouping module 402 produces identified element information 340 when a favorable word grouping is associated with the matched elements 412 in accordance with element rules 318. The element grouping module 402 produces interim Boolean information 970 (e.g., identity of valid words of the Boolean expressions based on lists and rules, permutations of possible Boolean meanings based on one or more of a predicted domain, an intermediate grouping, an adjective skipping rule, a source topic, a pending question, etc.). The analyzing further includes comparing the matched elements 412 with Boolean structure rules of the element rules 318, extracting possible Boolean meanings from the element rules 318, and identifying the words of the Boolean expression and identigens for each word.

The grouping matching module 404 analyzes the identified element information 340 and the interim Boolean information 970 in accordance with a groupings list 334 to produce validated groupings information 416 and Boolean candidate information 972. The Boolean candidate information 972 includes a subset of possible Boolean structures and may further include an entigen for each word of the Boolean expression. The producing includes comparing a groupings aspect of the identified element information 340 in light of the interim Boolean information 970 (e.g., for each permutation of groups of elements of possible Boolean structures).

The producing further includes generating the validated groupings information 416 to include identification of valid permutations that align with the groupings list in light of the interim Boolean information 970 (e.g., eliminate invalid permutations right away that are inconsistent with one or more of domain, context, etc.). The grouping matching module 404 further produces the Boolean candidate information 972 for a minimal number of Boolean expressions that are most likely for the groupings list 334.

The grouping interpretation module 406 interprets the validated groupings information 416 and the Boolean candidate information 972 based on question information 346 (e.g., operator input, crowdsourcing input, etc.) and in accordance with interpretation rules 320 to produce interpreted information 344 (e.g., most likely interpretations, next likely interpretations, etc.) and to produce Boolean information 974. The Boolean information 974 includes words of the Boolean expression, entigens of the words, an entigen assigned to a group of entigens of an expression, interpretation information, inference information, and deduction information. The producing may be based on a plurality of possible meanings where a pruning of the plurality of possible meanings is based on the interpretation rules 320 in light of other words of the validated groupings information 416 of the word group to produce a Boolean expression meaning and may further include generation of inferences and deductions.

FIG. 18B is a logic diagram of an embodiment of a method for representing a Boolean expression within a computing system. In particular, a method is presented for use in conjunction with one or more functions and features described in conjunction with FIGS. 1-8D, 18A, and also FIG. 18B. The method includes step 990 where a processing module of one or more processing modules of one or more computing devices of the computing system interprets formatted content to produce matched elements, where the matched elements include a Boolean expression of known words. The generating includes matching a received element to an element of an element list, where the element list further includes identification of known words of Boolean expressions and one or more identigens per word. The generating further includes outputting the matched elements to include an identifier of each matched element.

The method continues at step 992 where the processing module analyzes the matched elements in accordance with Boolean structure rules to produce identified element information and interim Boolean information. The analyzing includes using the Boolean structure rules to extract possible Boolean meanings from the matched elements to produce the interim Boolean information.

The method continues at step 994 where the processing module analyzes the identified element information and the interim Boolean information in accordance with a groupings list to produce validated groupings information and Boolean candidate information, where the Boolean candidate information includes a subset of possible Boolean structures. The analyzing includes using the Boolean structure rules to extract possible Boolean meanings from the matched elements to produce the interim Boolean information and to further identify possible Boolean structures and entigens for one or more words of the Boolean expression. Alternatively, or in addition to, the processing module compares a grouping aspect of the identified element information in light of the interim Boolean information (e.g., for each permutation of groups of elements of possible Boolean structures).

The processing module generates the validated groupings information to include identification of valid permutations that align with the groupings list in light of the interim Boolean information (e.g., eliminate invalid permutations right away that are inconsistent with one or more of domain, context, etc.). The processing module may further produce the Boolean candidate information for a minimal number of Boolean expressions that are most likely in accordance with the groupings list.

The method continues at step 996 where the processing module interprets the validated groupings information and the Boolean candidate information in accordance with Boolean interpretation rules to produce interpreted information and Boolean information. The Boolean information includes one or more of words of the Boolean expression, entigens of the words, an entigen assigned to a group of entigens of the expression, interpretation information, inference information, and deduction information. For example, the processing module produces, based on the plurality of possible meanings, a pruning of a plurality of possible meanings based on the Boolean interpretation rules in light of other words of the validated groupings information of the word group to produce a Boolean expression meaning, inferences, and deductions.

The method described above in conjunction with the processing module can alternatively be performed by other modules of the computing system 10 of FIG. 1 or by other devices. In addition, at least one memory section (e.g., a computer readable memory, a non-transitory computer readable storage medium, a non-transitory computer readable memory organized into a first memory element, a second memory element, a third memory element, a fourth element section, a fifth memory element etc.) that stores operational instructions can, when executed by one or more processing modules of one or more computing devices (e.g., one or more servers, one or more user devices) of the computing system 10, cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device, the method comprises:
   determining whether a set of words are included in a word set, wherein the word set is unassociated with a single entigen that represents a valid deterministic meaning of the word set; and
   when the set of words are included in the word set:
      determining a set of identigens for each word of the word set to produce a set of sets of identigens, wherein a particular set of identigens of the set of sets of identigens represents one or more different meanings of a corresponding word of the word set, wherein a first set of identigens of the set of sets of identigens is produced for a first word of the word set,
      wherein each identigen of the first set of identigens represents a different meaning of the first word,
      interpreting, in accordance with identigen pairing rules, the set of sets of identigens to produce an entigen set, wherein the entigen set represents a most likely meaning interpretation of the word set, wherein each entigen of the entigen set corresponds to a selected identigen of a corresponding set of identigens having a selected meaning of the one or more different meanings of a corresponding word of the word set, wherein each entigen of the entigen set represents a single conceivable and perceivable thing in space and time that is independent of language, wherein the selected identigen of the corresponding set of identigens favorably pairs with at least one corresponding sequentially adjacent identigen of another set of identigens of the set of sets of identigens in accordance with the identigen pairing rules,
      assigning a single new entigen to represent the entigen set, wherein the single new entigen represents the valid deterministic meaning of the word set, and
      updating a knowledge database to include an association between the single new entigen and the entigen set.

2. The method of claim 1 further comprises:
   interpreting a query that includes the word set utilizing the single new entigen to produce a query response.

3. The method of claim 1 further comprises one or more of:
   determining a set of remaining word identigens for a remaining word of the set of words, wherein the set of remaining word identigens represents one or more different meanings of the remaining word of the set of words;
   interpreting, in accordance with the identigen pairing rules, the set of remaining word identigens and the entigen set to produce an expanded entigen set, wherein the expanded entigen set represents a most likely meaning interpretation of the set of words, wherein an entigen of the expanded entigen set corresponds to a selected identigen of the set of remaining word identigens having a selected meaning of a corresponding one or more different meanings of the remaining word of the set of words, wherein each entigen of the expanded entigen set represents a single conceivable and perceivable thing in space and time that is independent of language, wherein the selected identigen of the set of remaining word identigens favorably pairs with at least one corresponding sequentially adjacent entigen of the entigen set in accordance with the identigen pairing rules; and
   assigning a second single new entigen to represent the expanded entigen set, wherein the second single new entigen represents the most likely meaning interpretation of the set of words.

4. The method of claim 1, wherein the determining whether the set of words are included in the word set comprises:
   detecting that a first word of the set of words matches a first entry word of one or more word set entries of a word set list, wherein each word set entry of the word set list includes at least one entry word and an entry set of word set identigens that corresponds to interpretations of the at least one entry word, wherein the at least one entry word of each of the one or more word set entries includes the first entry word;

determining, for at least some of the one or more word set entries, whether remaining words of the of the set of words of the word set match remaining entry words of the at least one entry word; and when the remaining words of the of the set of words of the word set match the remaining entry words of the at least one entry word of a matching word set entry of the at least some of the one or more word set entries, indicating that the set of words of the word set are in the word set.

5. The method of claim 1, wherein the determining whether the set of words are included in the word set further comprises:

comparing the set of words to a word set entry of a word set list, wherein the word set entry of the word set list includes at least one entry word and an entry set of word set identigens that corresponds to potential interpretations of the at least one entry word; and indicating that the set of words are in the word set when the set of words compare favorably to the at least one entry word of the word set entry of the word set list.

6. The method of claim 1, wherein the assigning the single new entigen to represent the entigen set comprises:

generating a new entigen indicator, wherein the new entigen indicator uniquely identifies a combination of each entigen of the entigen set; and establishing linkage between the new entigen indicator and each entigen of the entigen set.

7. A computing device of a computing system, the computing device comprises:

an interface;

a local memory; and a processing module operably coupled to the interface and the local memory, wherein the processing module functions to:

determine whether a set of words are included in a word set, wherein the word set is unassociated with a single entigen that represents a valid deterministic meaning of the word set; and when the set of words are included in the word set:

determine a set of identigens for each word of the word set to produce a set of sets of identigens, wherein a particular set of identigens of the set of sets of identigens represents one or more different meanings of a corresponding word of the word set, wherein a first set of identigens of the set of sets of identigens is produced for a first word of the word set, wherein each identigen of the first set of identigens represents a different meaning of the first word, interpret, in accordance with identigen pairing rules, the set of sets of identigens to produce an entigen set, wherein the entigen set represents a most likely meaning interpretation of the word set, wherein each entigen of the entigen set corresponds to a selected identigen of a corresponding set of identigens having a selected meaning of the one or more different meanings of a corresponding word of the word set, wherein each entigen of the entigen set represents a single conceivable and perceivable thing in space and time that is independent of language, wherein the selected identigen of the corresponding set of identigens favorably pairs with at least one corresponding sequentially adjacent identigen of another set of identigens of the set of sets of identigens in accordance with the identigen pairing rules, assign a single new entigen to represent the entigen set, wherein the single new entigen represents the valid deterministic meaning of the word set, and update, via the interface, a knowledge database to include an association between the single new entigen and the entigen set.

8. The computing device of claim 7, wherein the processing module further functions to:

interpret a query that includes the word set utilizing the single new entigen to produce a query response.

9. The computing device of claim 7, wherein the processing module further functions to:

determine a set of remaining word identigens for a remaining word of the set of words, wherein the set of remaining word identigens represents one or more different meanings of the remaining word of the set of words;

interpret, in accordance with the identigen pairing rules, the set of remaining word identigens and the entigen set to produce an expanded entigen set, wherein the expanded entigen set represents a most likely meaning interpretation of the set of words, wherein an entigen of the expanded entigen set corresponds to a selected identigen of the set of remaining word identigens having a selected meaning of a corresponding one or more different meanings of the remaining word of the set of words, wherein each entigen of the expanded entigen set represents a single conceivable and perceivable thing in space and time that is independent of language, wherein the selected identigen of the set of remaining word identigens favorably pairs with at least one corresponding sequentially adjacent entigen of the entigen set in accordance with the identigen pairing rules; and assign a second single new entigen to represent the expanded entigen set, wherein the second single new entigen represents the most likely meaning interpretation of the set of words.

10. The computing device of claim 7, wherein the processing module functions to determine whether the set of words are included in the word set by:

detecting that a first word of the set of words matches a first entry word of one or more word set entries of a word set list, wherein each word set entry of the word set list includes at least one entry word and an entry set of word set identigens that corresponds to interpretations of the at least one entry word, wherein the at least one entry word of each of the one or more word set entries includes the first entry word;

determining, for at least some of the one or more word set entries, whether remaining words of the of the set of words of the word set match remaining entry words of the at least one entry word; and when the remaining words of the of the set of words of the word set match the remaining entry words of the at least one entry word of a matching word set entry of the at least some of the one or more word set entries, indicating that the set of words of the word set are in the word set.

11. The computing device of claim 7, wherein the processing module further functions to determine whether the set of words are included in the word set by:

comparing the set of words to a word set entry of a word set list, wherein the word set entry of the word set list includes at least one entry word and an entry set of word set identigens that corresponds to potential interpretations of the at least one entry word; and indicating that the set of words are in the word set when the set of words compare favorably to the at least one entry word of the word set entry of the word set list.

12. The computing device of claim 7, wherein the processing module functions to assign the single new entigen to represent the entigen set by:
generating a new entigen indicator, wherein the new entigen indicator uniquely identifies a combination of each entigen of the entigen set; and
establishing linkage between the new entigen indicator and each entigen of the entigen set.

13. A non-transitory computer readable memory comprises:
a first memory element that stores operational instructions that, when executed by a processing module, causes the processing module to:
determine whether a set of words are included in a word set, wherein the word set is unassociated with a single entigen that represents a valid deterministic meaning of the word set; and
a second memory element that stores operational instructions that, when executed by the processing module, causes the processing module to:
when the set of words are included in the word set:
determine a set of identigens for each word of the word set to produce a set of sets of identigens, wherein a particular set of identigens of the set of sets of identigens represents one or more different meanings of a corresponding word of the word set,
wherein a first set of identigens of the set of sets of identigens is produced for a first word of the word set, wherein each identigen of the first set of identigens represents a different meaning of the first word,
interpret, in accordance with identigen pairing rules, the set of sets of identigens to produce an entigen set, wherein the entigen set represents a most likely meaning interpretation of the word set, wherein each entigen of the entigen set corresponds to a selected identigen of a corresponding set of identigens having a selected meaning of the one or more different meanings of a corresponding word of the word set, wherein each entigen of the entigen set represents a single conceivable and perceivable thing in space and time that is independent of language, wherein the selected identigen of the corresponding set of identigens favorably pairs with at least one corresponding sequentially adjacent identigen of another set of identigens of the set of sets of identigens in accordance with the identigen pairing rules,
assign a single new entigen to represent the entigen set, wherein the single new entigen represents the valid deterministic meaning of the word set, and
update a knowledge database to include an association between the single new entigen and the entigen set.

14. The non-transitory computer readable memory of claim 13 further comprises:
a third memory element that stores operational instructions that, when executed by the processing module, causes the processing module to:
interpret a query that includes the word set utilizing the single new entigen to produce a query response.

15. The non-transitory computer readable memory of claim 13 further comprises:
a fourth memory element that stores operational instructions that, when executed by the processing module, causes the processing module to:
determine a set of remaining word identigens for a remaining word of the set of words,
wherein the set of remaining word identigens represents one or more different meanings of the remaining word of the set of words;
interpret, in accordance with the identigen pairing rules, the set of remaining word identigens and the entigen set to produce an expanded entigen set, wherein the expanded entigen set represents a most likely meaning interpretation of the set of words, wherein an entigen of the expanded entigen set corresponds to a selected identigen of the set of remaining word identigens having a selected meaning of a corresponding one or more different meanings of the remaining word of the set of words, wherein each entigen of the expanded entigen set represents a single conceivable and perceivable thing in space and time that is independent of language, wherein the selected identigen of the set of remaining word identigens favorably pairs with at least one corresponding sequentially adjacent entigen of the entigen set in accordance with the identigen pairing rules; and
assign a second single new entigen to represent the expanded entigen set, wherein the second single new entigen represents the most likely meaning interpretation of the set of words.

16. The non-transitory computer readable memory of claim 13, wherein the processing module functions to execute the operational instructions stored by the first memory element to cause the processing module to determine whether the set of words are included in the word set by:
detecting that a first word of the set of words matches a first entry word of one or more word set entries of a word set list, wherein each word set entry of the word set list includes at least one entry word and an entry set of word set identigens that corresponds to interpretations of the at least one entry word, wherein the at least one entry word of each of the one or more word set entries includes the first entry word;
determining, for at least some of the one or more word set entries, whether remaining words of the of the set of words of the word set match remaining entry words of the at least one entry word; and
when the remaining words of the of the set of words of the word set match the remaining entry words of the at least one entry word of a matching word set entry of the at least some of the one or more word set entries, indicating that the set of words of the word set are in the word set.

17. The non-transitory computer readable memory of claim 13, wherein the processing module further functions to execute the operational instructions stored by the first memory element to further cause the processing module to determine whether the set of words are included in the word set by:
comparing the set of words to a word set entry of a word set list, wherein the word set entry of the word set list includes at least one entry word and an entry set of word set identigens that corresponds to potential interpretations of the at least one entry word; and indicating that the set of words are in the word set when the set of words compare favorably to the at least one entry word of the word set entry of the word set list.

18. The non-transitory computer readable memory of claim 13, wherein the processing module functions to execute the operational instructions stored by the second memory element to cause the processing module to assign the single new entigen to represent the entigen set by:
generating a new entigen indicator, wherein the new entigen indicator uniquely identifies a combination of each entigen of the entigen set; and
establishing linkage between the new entigen indicator and each entigen of the entigen set.

* * * * *